United States Patent [19]

Elko et al.

[11] Patent Number: 5,537,574

[45] Date of Patent: Jul. 16, 1996

[54] SYSPLEX SHARED DATA COHERENCY METHOD

[75] Inventors: David A. Elko, Poughkeepsie; Jeffrey A. Frey, Fishkill; John F. Isenberg, Jr., Poughkeepsie, all of N.Y.; Chandrasekaran Mohan, San Jose; Inderpal S. Narang, Saratoga, both of Calif.; Jeffrey M. Nick, Fishkill, N.Y.; Jimmy P. Strickland, Saratoga, Calif.; Michael D. Swanson, Poughkeepsie, N.Y.

[73] Assignee: International Business Machines Corporation, Armonk, N.Y.

[21] Appl. No.: 860,805

[22] Filed: Mar. 30, 1992

Related U.S. Application Data

[63] Continuation-in-part of Ser. No. 628,211, Dec. 14, 1990, Pat. No. 5,276,835.

[51] Int. Cl.⁶ ..................................... G06F 13/00
[52] U.S. Cl. .................. 395/468; 395/474; 395/457; 395/200.08; 364/DIG. 1; 364/134; 364/228.1; 364/243.44; 364/931.46; 364/945.6
[58] Field of Search .......................... 395/425, 650, 395/445, 446, 447, 448, 457, 468, 471, 472, 473, 474, 475, 481, 485, 200.08, 650; 364/134

[56] References Cited

U.S. PATENT DOCUMENTS

| | | | |
|---|---|---|---|
| 4,399,504 | 8/1983 | Obermarck et al. | 395/650 |
| 4,445,174 | 4/1984 | Fletcher | 395/448 |
| 4,695,943 | 9/1987 | Keeley et al. | 395/467 |
| 4,965,719 | 10/1990 | Shoens et al. | 395/650 |
| 5,276,848 | 1/1994 | Gallagher et al. | 395/448 |
| 5,280,611 | 1/1994 | Mohan et al. | 395/600 |
| 5,313,609 | 5/1994 | Baylor et al. | 395/448 |
| 5,317,716 | 5/1994 | Liu | 395/471 |
| 5,357,608 | 10/1994 | Bartow et al. | 395/200.1 |
| 5,410,697 | 4/1995 | Baird et al. | 395/650 |
| 5,412,803 | 5/1995 | Bartow et al. | 395/200.01 |

*Primary Examiner*—Glenn Gossage
*Attorney, Agent, or Firm*—Bernard M. Goldman

[57] ABSTRACT

A method for controlling coherence of data elements sharable among a plurality of independently-operating CPCs (central processing complexes) in a multi-system complex (called a parallel sysplex) which contains sysplex DASDds (direct access storage devices) and a high-speed SES (shared electronic storage) facility. Sysplex shared data elements are stored in the sysplex DASD under a unique sysplex data element name, which is used for sysplex coherence control. Any CPC may copy any sysplex data element into a local cache buffers (LCB) in the CPC's main storage, where it has an associated sysplex validity bit. The copying CPC executes a sysplex coherence registration command which requests a SES processor to verify that the data element name already exists in the SES cache, and to store the name of the data element in a SES cache entry if found in the SES cache. Importantly, the registration command communicates to SES the CPC location of the validity bit for the LCB containing that data element copy. Each time another copy of the data element is stored in any CPC LCB, a registration command is executed to store the location of that copy's CPC validity bit into a local cache register (LCR) associated with its data element name. In this manner, each LCR accumulates all CPC locations for all LCB validity bits for all valid copies of the associated data element in the sysplex — for maintaining data coherency throughout the sysplex.

17 Claims, 32 Drawing Sheets

SYSPLEX SHARED DATA COHERENCY METHOD

This application claims the priority date of Dec. 14, 1990 for the matter disclosed in a prior U.S. application (Docket number SA990093) having U.S. patent application Ser. No. 07/628,211, filed Dec. 14, 1990 by C. Mohan et al and entitled "Non-Blocking Serialization for Caching Data In A Shared Cache", which is a pending unissued application at the time of the filing of this application. This application has now issued as U.S. Pat. No 5,276,835 on Jan. 4, 1994. The contents of prior U.S. application Ser. No. 07/628,211 is carried into this application which is a continuation-in-part of prior U.S. patent application Ser. No. 07/628,211; and both applications have at least one inventor in common.

CROSS REFERENCE TO RELATED APPLICATIONS

This application contains subject matter which is related to the subject matter of the following applications/patents which are assigned to the same assignee as this application:

"Configurable, Recoverable Parallel Bus" by N. G. Bartow et al, U.S. Pat. No. 5,357,608, Filed: Feb. 20, 1992; "Communications System Having A Plurality of Originator and Corresponding Recipient Buffers With Each Buffer Having Three Different Logical Areas For Transmitting Messages in Single Transfer" by N. G. Bartow et al, U.S. Pat. No. 5,412,803, Filed: Feb. 20, 1992; and "Frame-Group Transmission And Reception For Parallel/Serial Buses", by N. G. Bartow et al, U.S. Pat. No. 5,267,240, Filed: Feb. 20, 1992.

Specifications Incorporated by Reference

The entire specifications of the following listed applications are completely incorporated by reference as part of the subject application. Each of the following listed applications is owned by the same assignee as the subject application, is filed on the same day as the subject application, and has the same priority date as the subject application. They are:

"Communicating Messages Between Processors And A Coupling Facility" by D. A. Elko et al, U.S application Ser. No. 08/420,893; "Method and Apparatus For Distributed Locking of Shared Data, Employing A Central Coupling Facility" by D. A. Elko et al, U.S. Pat. No. 5,339,427 ;"Command Quiesce Function" by D. A. Elko et al, U.S. Pat. No. 5,339,405; "Software Cache Management Of A Shared Electronic Store In A Sysplex" by D. A. Elko et al, U.S. Pat. No. 5,457,793; "Management Of Data Movement From A SES Cache To DASD" by D. A. Elko et al, U.S. application Ser. No. 07/860,806; "Command Execution System For Using First and Second Commands To Reserve and Store Second Command Related Status Information In Memory Portion Respectively" by D. A. Elko et al, U.S. Pat. No. 5,392,397; "Integrity Of Data Objects Used To Maintain State Information For Shared Data At A Local Complex" by D. A. Elko et al, U.S. Pat. No. 5,331,673; "Management Of Data Objects Used To Maintain State Information For Shared Data At A Local Complex" by J. A. Frey et al, U.S. Pat. No. 5,388,266; "Recovery Of Data Objects Used To Maintain State Information For Shared Data At A Local Complex" by J A Frey et al, U.S. Pat. No. 5,394,542; "Message Path Mechanism For Managing Connections Between Processors And A Coupling Facility" by D. A. Elko et al, U.S. application Ser. No. 08/324,447; "Data Processing System and Method For Providing Notification In A Central Processor of State Changes For Shared Data Structure On External Storage" by J. A. Frey et al, U.S. Pat. No. 5,390, 328; "Method And Apparatus For Performing Conditional Operations on Externally Shared Data" by D. A. Elko et al, U.S. application Ser. No. 07/860/655; "Apparatus And Method For List Management In A Coupled Data Processing System" by J. A. Frey et al, U.S. Pat. No. 5,410,695; "Interdicting I/O And Messaging Operations From Sending Central Processing Complex To Other Central Processing Complexes And To I/O Device In A Multi-System Complex" by D. A. Elko et al, U.S. Pat. No. 5,394,554; and "Method And Apparatus For Coupling Data Processing Systems" by D. A. Elko et U.S. Pat. No. 5,317,739.

INTRODUCTION

The invention deals with maintaining data coherence in a system complex (sysplex) which comprises a plurality of central processing complexes (CPCs) having local buffers connected to a shared electronic storage (SES) device which contains electronic random access storage for containing data shared by the CPCs.

The invention concerns caching data in a cache serving a multi-system data sharing complex. In particular, the invention concerns the caching of a data page by one database system in the shared cache in view of the possibility that another system could be trying to cache a later copy of the same page. This invention concerns the technique to detect such a condition and to bar entry of the earlier copy of the page into the shared cache.

BACKGROUND

Typically, prior hardware caches in a processor comprise a storage array having fixed-size data blocks. Such storage is viewed by the hardware as a linear array of blocks. The blocks of data in the cache are managed by a cache directory, which invalidates or casts data blocks in or out of such cache based on LRU (least recently used) storage references. Well-known types of hardware caches are used in central processing units (CPUs), and in DASDs (direct access storage devices). The main storage (MS) of many computer systems is partitioned into data lines accessed wholly or partly as data blocks for a CPU cache using real or virtual addresses. Data in the cache is accessed by store, fetch, and update requests for data within the data blocks. Competing data requests to the cache directory are arbitrated by prioritizing the requests to the cache.

A DASD cache is usually partitioned in blocks equal to the DASD tracks. Data requests to the cache directory are read or write I/O operations. Competing requests are arbitrated by storage controls in the DASD control unit.

A DASD type of cache in a CPC hierarchy is described in an article "Cache-DASD Storage Design for Improving System Performance" by C. P. Grossman in the IBM Systems Journal, Vol 24. Nos. 3/4, 1985.

Multi-processors with and without caches have long had coherence controls to maintain the integrity of data in a system. The cross-interrogate and cross-invalidate (XI) operations used therein are different from those used by the subject invention herein.

The general solution of the data coherence problem is well-known to require the invalidation of all copies but the currently changed copy. A number of adverse side affects commonly occur during such invalidation operations including significant performance degradation to system operation. More specific causes of performance degradation include:

1. Significant delays to the transactions changing the records, due to waiting for the other copies to be checked and invalidated before the change process can complete;

2. Lengthy overhead processing by processors performing invalidation of other copies; and 3. Performing invalidations beyond the transaction changing the record to disturb other transactions and their resources not involved with any copy which should have been invalidated.

In a database system wherein a plurality of independently-operating computer systems share data, global locking is required to maintain coherency of data in the different systems. A.J. van de Goor, in COMPUTER ARCHITECTURE AND DESIGN, Addison Wesley, 1989, discusses the data coherency problem as one in which sharing data among a proliferation of processors raises the possibility that multiple, inconsistent copies of data may exist because of multiple paths to the data and because of opportunities to locally modify the data.

Solutions to the data coherency problem have been proposed. All are based essentially on the existence of a global lock on data retrieved from a central location. Assuming pagination of data, one computer system of a multi-computer system which shares data stored on a disk acquires a global lock on a page of data and obtains and updates the page. The lock signifies to the other computer systems that the page has been acquired for updating. Prior to releasing the lock on the page, the computer system holding the lock writes the page to the disk, after which it generates and sends a message to the other computer systems to invalidate any copies of the page which may be held in their local cache. The lock on the page is not released until acknowledgement is received from every other computer system having access to the page. This solution is described in detail in U.S. Pat. Nos. 4,399,504 and 4,965,719, which are assigned to the assignee of this patent application, and which are incorporated herein by reference. A commercial product available from the assignee of this application and which incorporates this solution is the IMS/VS system with the data sharing feature.

The prior art global locking system provides great advantage in maintaining data coherency. However, the overhead penalties inherent in it include the requirement for performing an I/O procedure when a page is updated and undertaking message exchange after the I/O procedure in order to notify the other systems and release the lock.

When used in a non-data-shared single system case, the global-locking prior art still incurs extra overhead in maintaining data coherency (consistency) between transactions by implementing a commit policy requiring each transaction which updates data to write the modified data, together with log records, to storage before the transaction is fully committed. This requires one I/O procedure per page for each modifying transaction, which increases overhead costs.

In contrast, the IBM DB2 in the single system non-data-sharing case follows a policy which does not require an I/O process to write an updated page back to storage in order to commit a transaction. If the protocol described above is used in a data-sharing situation where a plurality of computer systems access one or more data storage sites, the performance could degrade significantly because of the required write back to storage and message delay. In this regard, see C.J. Date's discussion of concurrency at pages 593–595 in Vol. I of AN INTRODUCTION TO DATABASE SYSTEMS, Addison-Wessley, 1986.

In a multi-computer, data-sharing system which includes multiple levels of storage, it is contemplated that a first level of storage would consist of one or more direct access storage devices (DASD's) which are shared by independently-operating computer systems. Typical nomenclature for hierarchally-arranged storage systems classify DASD and other such storage facilities as "secondary" storage. In this regard, secondary storage includes all facilities from which data must be moved to "primary" storage before it can be directly referenced by a CPU. See Detiel, OPERATING SYSTEMS, Second Edition, 1990, by Addison Wesley. It is further contemplated that caching techniques would be useful to provide a high-speed, frequently-accessed storage for shared data. For various reasons, data would be entered into the shared cache by the database systems after acquisition from DASD's. In this regard, a shared cache would be included in a primary level of storage for a multi-computer, data-sharing system.

In such a structure, a potential hazard would exist if one computer system obtained a block of data from DASD for the purpose of caching it after the same block of data had been obtained, modified by another computer system and cached, but not yet returned to DASD. In this situation, the outdated block obtained from DASD is referred to as a "down-level" version of the updated block in cache. The challenge is to prevent the overwriting of the updated block by the down-level version without incurring the expense of locking the DASD version.

Typically, global locking protocols are used by a database system to serialize access to the record of interest in the data sharing case. The inventors contemplate that serializing would still be used. Also typically, there would be global locking on a page to serialize updates to the page from different database systems. The avoidance of serialization described in this invention is for inserting a down level page from the secondary storage into the shared cache by different database systems.

A global locking protocol is described in an IBM TDB article published March 1986 on pages 4642 to 4650, entitled "Integrated Concurrency and Shared Buffer Coherency Control for Multi-System". This article provides a controller (processor) called a centralized concurrency & coherency controller, which maintains multiple states for each data item written in one or more system local buffers and/or the shared memory. The subject invention does not use a centralized controller for coherency control, but distributes the coherency control to the systems having the local buffers containing the data needing coherency control, with the distributed locations being listed in a cache directory entry accessible to all systems.

SUMMARY OF THE INVENTION

A primary object of this invention is to provide a method and structure in a shared data, multi-computer system which guarantees that any page of data in a shared cache (aka SES) will not be overwritten by an earlier version of that page obtained from any other shared data storage resource.

A significant advantage of the invention is that it tolerates the retention of known methods and structures for DASD access, while maintaining the integrity of data obtained from a DASD and cached in a memory (aka SES) shared by a plurality of computer systems.

An important object of this invention is to provide a method for operating a multi-system, data-sharing complex in which data is cached in a shared electronic storage (aka SES).

This invention involves a sysplex using a plurality of operating systems (OSs). Any CPC in the sysplex may have its resources logically partitioned among a plurality of different OSs to provide a multiplicity of independent OSs within a single CPC, such as by the IBM processor resource/ system management (PR/SM) system. Thus a sysplex may have any mix of OSs running on its different CPCs, some CPCs each having one OS, and other CPCs each having a plurality of OSs running independently of each other. One or more subsystems may be running under any OS in any CPC, including the IBM DB2, DFP, IMS, VSAM, etc. subsystems.

Different copies of the same data base subsystem program may be running simultaneously and independently in the different CPCs. With this invention, these different programs may be accessing the same or different data elements or records in the data base, which may simultaneously be in MS/ES local caches (LCs) of the different CPCs.

It is a primary object of this invention to provide coherence information and invalidation request control for copies of data records residing in any CPC local cache in a sysplex, without significantly degradating the sysplex performance by:

1. avoiding coherence control delay to a transaction accessing data in a CPC local cache;
2. using little processing in the CPC(s) for coherence control;
3. restricting the scope of coherence control to only those CPC local cache buffers in a sysplex which may require coherence control;
4. allowing any CPC to perform a coherence control operation requested by SES when a reference to a local cache buffer is requested. This avoids any interruption in CPC processing while doing work unrelated to the requested coherence operation.

In a multi-system, data-sharing complex, a database system executing on a first computer system could be caching an updated page in a shared cache while another database system could be trying to cache a copy of the same page obtained from a DASD. The invention detects such a condition and, without a serialization mechanism such as locking, bars entry of the copy obtained from the DASD.

Local Cache Structure

The executing program in any CPC uses one or more allocated local cache buffers (LCBs) in the local caches (107A, 107B, and 107C) of the CPC's MS/ES to contain the data elements and records in recent use that have been generated, backed-up, retrieved and/or stored-in by the CPC. A CPC in the sysplex may have more than one type of program (for example DB2 and IMS) currently executing on the central processors and I/O processors of that CPC. Then, these plural executing programs in a CPC may have their own LCBs allocated in the CPC's MS/ES which contain their most recently accessed data elements and records. Hence, a complexity of different LCBs may be used by different types of programs, and they may simultaneously exist in the MS/ES of any one or more CPCs in a sysplex. The term "local cache" (LC) is used herein to refer to a collection of LCBs set up and used by a CPC programming subsystem.

The allocation and size of each LCB is dependent on the respective program being used in the CPC. The LCBs may have different sizes and different numbers in the different LCs. Any local cache buffer may be changed to a different size during program execution.

A local cache attached to a SES is identified in the SES by a local cache identifier (LCID) which the operating system assigns uniquely to the LCs when they are logically attached to the SES. The LCID is saved in local cache controls (105) at the SES cache. Local cache controls are used by SES to maintain information regarding each attached local cache.

The invention provides invalidation signalling controls in SES to request the coherence of data shared among the MS/ES buffers in the different CPCs, so that each CPC may determine the validity of local cache buffers when access to the data contained in a buffer is requested by programming. During initialization of a local cache, operating system services are invoked to authorize access of the program to the SES cache. These operating system services assign a local cache identifier to be used to uniquely identify the local cache and its attachment to the SES cache.

The operating system services also invoke a CPU instruction (define vector DV) to cause a bit vector (termed a coherence vector (V)) to be created (108A, 108B, and 108C) in the Hardware System Area (HSA) in FIG 1. Completion of the instruction to define this coherency bit vector returns a local cache token (LCT). A new entry for each new coherence vector bit is placed in an HSA table T (209) (shown as table T in HSA 205 in FIG. 2) to represent the locations of the new coherence vector bits in the HSA associated with a particular LC in the CPC. The LCT and LCID are provided to SES by the operating system when a local cache is attached to the SES cache and stored in the local cache controls (105).

The CPC can change the size of any vector in its HSA to any required size, and this is done whenever the CPC changes the size of the associated LC in the CPC's programmable memory.

A local cache is managed in its CPC by a local cache directory (LCD) comprised of a plurality of entries which contain pointers (addresses) to respective LCBs accessed through the respective LCD entries. Any CPC is able to store a data element in each LCB and assign a unique name to the data element; the name is put into the LCD entry associated with the LCB. This data element name is used to communicate with SES as the address of the data element when it is registered in SES, regardless of the size of the data element. The operating system service invoked to interface with the SES uses a CPU instruction (set vector entry SVE) to set the coherence vector bit when the name of a data item is successfully registered at the SES cache.

When a local cache buffer contains a data element shared among the CPCs in the sysplex, programming associates a bit in the coherency vector with the LCB. The entry within the coherency vector is termed the local cache entry number (LCEN). Each LCD entry has a respective local cache entry number (LCEN) which is used by the CPC and SES to distinguish between the LCBs of a local cache. Each LCD entry indicates the valid/invalid state of its LCB contents.

The CPC is physically connected to a SES through a storage controller (not shown) to its MS 204 and HSA 205. This storage controller has microcode addressability to HSA 205 for accessing a vector bit position in HSA by LCT and LCEN values being signalled by the channel (208 in FIG. 2 and 106-1 thru 106-M in FIG. 1) from the attached SES. A table (T in FIG. 2 at 209) in the HSA 205 translates the LCT/LCEN values received from the channel into a corresponding coherence vector bit position in HSA.

Local Cache Coherency

The invention prevents multiple-version contamination of sysplex data when plural copies of a data element concurrently exist in different LCBs in the CPCs. Multiple copies of a record are allowed in different LCBs as long as all CPCs are only reading the records. Contamination occurs when a data element is changed in any LCB when a second copy is allowed to concurrently exist unchanged in any other LCB, since then the two different versions exist for the same data element. Then, any changes made to the second copy will not be cumulative with the changes made to the first copy, making all copies incorrect, including the copy in the common DASD which is not updated until one of the new versions is committed by being stored back to DASD.

This multiple-version data contamination can be avoided if all LCB copies are invalidated except for one LCB copy which is changed. Then, the one remaining copy receives all changes and represents the latest version of the data element existing in any CPC, since only it can receive any changes and only it can be stored back to the common DASD to represent the latest copy of the record in the system.

The avoidance of multiple-version contamination is herein called "maintaining data coherence". Invalidation of all outstanding copies of a record except the copy being changed is the generally accepted solution for preventing multiple-version contamination in a record.

To prevent multiple-version contamination, the invention requires that any CPC, wanting to access (read or write) a record in the sysplex common DASD, must first register the record in a SES directory, and preferably read the record from the SES cache if it exists there.

The program in each CPC operates to maintain the coherency of data handled solely within the CPC, in any manner designed into the program, which may have been previously provided in the program independent of this invention. Hence, the data coherence controls provided by this invention in a sysplex are in addition to data coherence controls which may have previously existed in each CPC. Hence, the invention operates additional data coherence controls.

An important feature in each CPC, insofar as this invention is concerned, is the relationship between its local caches (LC) and its coherency vectors (V). In FIG. 1, CPC-1 is shown with local caches LC-1 and LC-2, which have associated coherency vectors V1 and V2, respectively. Note that LC-1 has N number of buffer entries (i.e. LCB-0 through LCB-N), which are respectively associated with coherency vector V1 bits 0–N. And that LC-2 has K number of entries (i.e. LCB-0 through LCB-K), which are associated with V2 bits 0–K. CPC-M is shown with a single LC(1), having LCBs 0–L associated with V(1) coherency bits 0–L.

Different versions may exist of the same record among these multiple copies in their different locations. The latest version exists in SES (if a copy is written in SES), and in the CPC making the last change in the record. Generally, the DASD copy is the most out-of-date version, because this copy is the last to be updated due to the slow nature of accessing the electro-mechanical DASD.

SES can only set these vector bits to an invalid state through a communication channel between SES and the CPC. When SES sets any coherence vector bit to the invalid state in a CPC's HSA, the CPC programming is not disturbed by such setting when it happens. The CPC programming continues without interruption due to the SES setting of any coherence vector bit. It is up to the CPC to determine when it will test the state of the vector bits to determine if any invalidation has been indicated. This manner of operation even gives the CPC the option of not using the sysplex coherence controls if the CPC has a situation in which coherence is not needed.

When programming determines that data in a local cache buffer is to be used, the CPC uses a "test vector entry" (TVE) CPU instruction to test the current state of the data coherence bit for that LCB in the CPC. The TVE instruction operates to invoke microcode which based on the specified LCT and LCEN locates the bit in the HSA memory area and test its state. The TVE microcode then records the result of the instruction execution in a condition code (CC) of the instruction for use by subsequent executing instructions in the CPC program that can conform the state of the corresponding LCB valid/invalid state.

The CPC operating system can set the state of a vector bit to either an valid or invalid setting at any time by means of a CPC instruction (set vector entry SVE) which activates microcode/hardware to perform the bit setting.

Non-Blocking Serialization for Caching Data in SES

A shared cache in a multi-system data-sharing complex does not require high-level locking to guarantee consistency when inserting a block of data into the cache. A "conditional write" procedure is used to insert blocks of data into the cache and a cache directory that begins to track "ownership" of a block of data at the time that a first read request issued against the block of data results in a cache miss. At the time of the first cache miss, a cache directory is updated to include the requested block of data and the requesting computer system is identified as having the current copy of the block. Upon receiving a cache miss indication in response to a read request, the requesting computer system fetches the block of data from DASD for placement into the cache. Placement in the cache of a block of data obtained from the DASD is done by way of the conditional write operation. In the conditional write operation, the cache directory is checked for the computer system holding the page obtained from the DASD and, if that computer system is still recorded in the cache directory as having the current copy of the page, the conditional write operation is accepted and the page inserted into the cache. The ability of a computer system issuing a conditional write request to have the request satisfied can be invalidated only by a write operation from another computer system which places an updated version of the identified block of data into the cache, or by the directory entry having been appropriated and re-used.

SES Structure

The SES cache is a structure in SES consisting of a collection of data-area elements, a directory, a local cache register, and local cache controls. A SES cache structure is created at the request of programs accessing data shared among CPCs where those programs require coherency and integrity for locally cached copies of data items.

SES Directory

A SES cache directory is an essential component of a SES device for obtaining SES coherency control. Having a SES data area with a SES cache enhances sysplex performance, but is optional. Without a SES data area, the data records in the sysplex would be accessible only from the sysplex DASD. The data base software operations would lose the performance provided by fast access to shared records in a SES data area. The SES local cache registers (associated with SES directory entries) would still identify which CPC LCBs in the sysplex have copy(s) of a shared data data element.

SES Local Cache Register

Entries in the local cache register identify the attached local caches which contain copies of the data element identified by the associated directory entry. Each entry in the local cache register provides sufficient information to locate the cache coherency vector associated with the local cache and the local cache entry within the coherency vector used to represent the validity of locally cached copies of the data element.

SES Command Processing

SES commands, including read and register and write and register cause registration of a locally cached copy of a data element in the SES directory. At the completion of successful registration, the local cache register contains sufficient information to locate locally cached copies of a data element, provide the CPC information regarding the location of the coherency vector associated with the local cache, and provide identification of the bit within the coherency vector being used by the program to represent the validity of the local cache buffer.

SES command processing may cause invalidation of the bit within the coherency vector being used by the program to represent the validity of a locally cached data item. The write when registered, write and register, invalidate complement copies, and invalidate name commands cause cross invalidation processing to be performed.

Processing Flow Overview

The data element name is used by SES to control data coherence for the data element regardless of whether the data element is stored in the SES. The data element name must be assigned to the cache directory in SES and each local copy of the data element must be registered in the local cache register (LCR) associated with the directory entry for SES to provide data coherence for the data element in the sysplex. It is not necessary to store the data element itself in SES for SES to provide data coherence, but it is necessary that each local copy of the data be registered by the CPC.

For a CPC to know if the data element is cached in SES or not and to register its local copy, the CPC can use a "read and register" (RAR) command. RAR command checks the SES directory for an existing assignment of the requested record name, and registers the local copy in the associated local cache register. SES reports back to the requesting CPC on whether the data element is cached or not in SES, and when cached, returns the data element.

If a RAR command finds the SES cache does not have the name of the data element assigned, SES may assign a directory entry and register the local copy in the associated local-cache register. SES reports back to the requesting CPC that the data element was not cached. Then the CPC can issue a read command to the sysplex DASD to read its archived copy to the CPC designated LCB.

If a CPC is generating a new record, the CPC can use a "write and register" (WAR) command to both register the local copy in the local-cache register and write the data element into the directory entry's data area.

If a CPC is changing (updating) an old data element, the CPC should use a "write when registered" (WWR) command. WWR checks in the SES directory for an existing registration of a local copy of the data element for the CPC. Only if the registration is found is the data element written into the entry's corresponding SES cache location. SES sets the directory change bit equal to the CPC specified change indication.

Each RAR or WAR command received by SES causes SES to register the requesting CPC local cache entry number (LCEN) in a local-cache register associated with the respective SES cache directory entry accessed by the command. The SES LCR records the LCENs of all LCs which accessed the data element in SES. SES uses this LCR data to invalidate any or all copies of a data element in the LCs having the data element. Recording which specific local caches contain a copy of the data element enables SES to avoid sending an invalidation request signal to any local cache not containing a copy of the data element.

SES makes an invalidation request to any attached LC by sending a "cross invalidate command" on the channel to the CPC by specifying the LCT and LCEN values identifying the vector and its bit to be set to invalid state. The transmitted LCT/LCEN values result from information retrieved from the local cache controls (105) and local cache register.

When a data element is stored in the SES cache, and the write requests indicates that the data element is changed from the current copy of the data element registered in SES, SES performs invalidation processing.

An "invalidate complement copies" (ICC) command to SES causes SES to look up in its local cache register the location of all local caches currently having copies of the referenced data element(s) and send invalidation requests to those CPCs. The ICC command is particularly useful when records are not stored in SES, but are only stored in DASD, where the ICC command is used after committing (storing) the changed data element in the DASD.

Another command used to maintain SES usage and coherence is an "invalidate name" (IN) command, which is sent to SES with a data element name by any CPC that wants to purge a data element from the SES. SES looks up the data element name in its directory and finds the location of all local caches currently having a copy of the data element. Then SES sends invalidation requests to those CPCs having an LCB containing a copy. When responses are received from all requested CPCs, SES deletes that data element name from its directory and deregisters the local copies from the LCR.

The following example of local cache controls uses the LCID value as an index from the beginning of the table to look up the LCT associated with the LC and the identification of the system on which the local cache exists and therefore the set of channel paths over which "cross invalidate" commands must be issued.

In the example shown in FIG. 6, data element with name "A" has been registered at the SES cache. Three instances of the data manager controlling access to data element "A" have attached a local cache to the SES cache. The operating system has assigned LCID 1 to the instance of the data manager executing on CPC1, LCID 2 to the instances of the data manager executing on CPC2, and LCID 3 to the instance of the data manager executing on CPC3. Date element "A" exists: in the local cache of the data manager instance with LCID 1 and has been assigned an LCEN value of 1 (601A and 602A); in the local cache of the data manager instance with LCID 2 and has been assigned an LCEN value of 5 (601B and 602B); in the local cache of data manager instance with LCID 3 and has been assigned an LCEN value of 3 (601C and 602C). The LCEN values and valid fields are seen in the local cache register (LCR) at (603) It is also seen that, as the result of the operating system service which attached the local cache to the SES cache and the use of the define vector (DV) CPU instruction, local cache tokens (LCTs) have been assigned to the local caches and have been communicated to the SES when the local caches were attached (604). LCID1 on CPC1 has LCT5 assigned; LCID2 on CPC2 has LCT1 assigned, LCID3 on CPC3 has LCT3 assigned. This is a simple example. There is no requirement that there be only one local cache on each CPC nor that there is any correlation between operating system assigned LCID values and CPCs on which local caches exist with those assigned LCID values.

In the example, the data manager controlling local cache with LCID2 has issued a write when registered command (WWR) for data element named "A" with the change indicator set. As part of the execution of the WWR command, SES performs invalidation processing for complement copies because the data element is changed. SES generates "cross invalidate" (XI) commands and sends those commands to locally attached caches. An XI command is sent to CPC1 with LCT5 and LCEN1 identified. An XI command is sent to CPC3 with LCT3 and LCEN3 identified. These commands may execute concurrently with each other and concurrently with other SES cache processing. However, the XI commands must complete the invalidation of the local cache copies before the WWR command completes.

As a result of the XI processing, the coherency vector for the local cache identified by LCID1 and LCID3 will be updated. Subsequently, if a request is made to the data manager assigned LCID1 or LCID3 for data element "A", a test of the associated coherency bit vector will be made. For example, in CPC1, a test of LCT5/LCEN1 will be made with the test vector entry CPU instruction. This test will indicate the copy of the data element in the local cache is not valid. The data manager will then issue the read and register command to retrieve the most current copy of the data element "A" from the SES cache.

CPC commands which may result in SES invalidation requests to other CPCs include: write and register (WAR), write when registered (WWR), invalidate complementary copies (ICC) and invalidate name (IN). For WAR and WWR one name is specified. For ICC and IN multiple names may be specified by requesting a match on only portions of the name field.

DETAILED DESCRIPTION OF THE PREFERRED EMBODIMENT

Sysplex Hardware Structure

Figure 1:
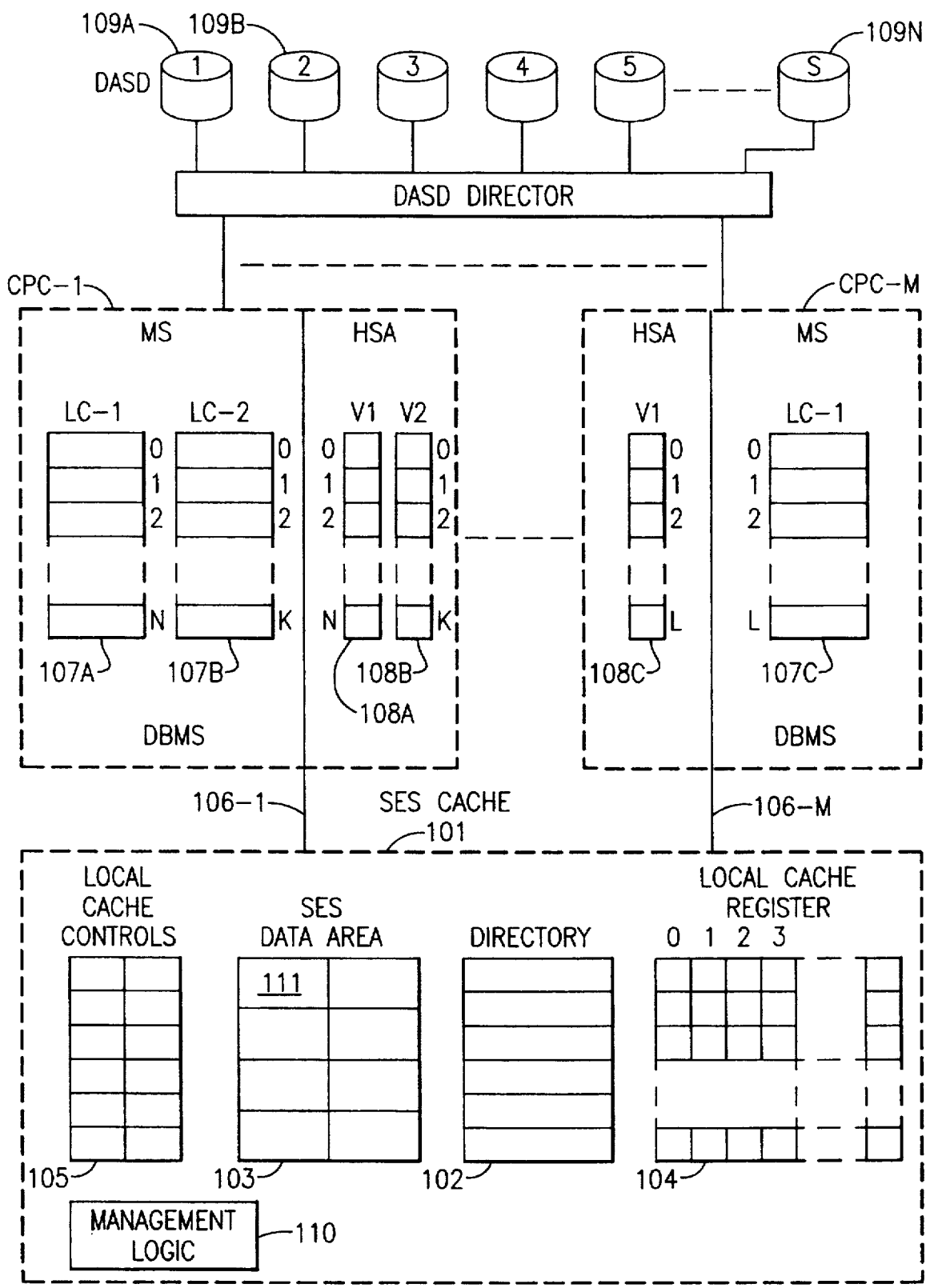
FIG. 1 represents a sysplex system with a plurality of CPCs and a SES device.

FIG. 1 shows a representation of a sysplex system. It contains a plurality of computer processing complexes (CPCs) from CPC-1 to CPC-M which represent any number of CPCs from one to a large number, all being connected to one or more SES (shared electronic storage) device (of which one SES device 101 is shown in FIG. 1).

Figure 2:
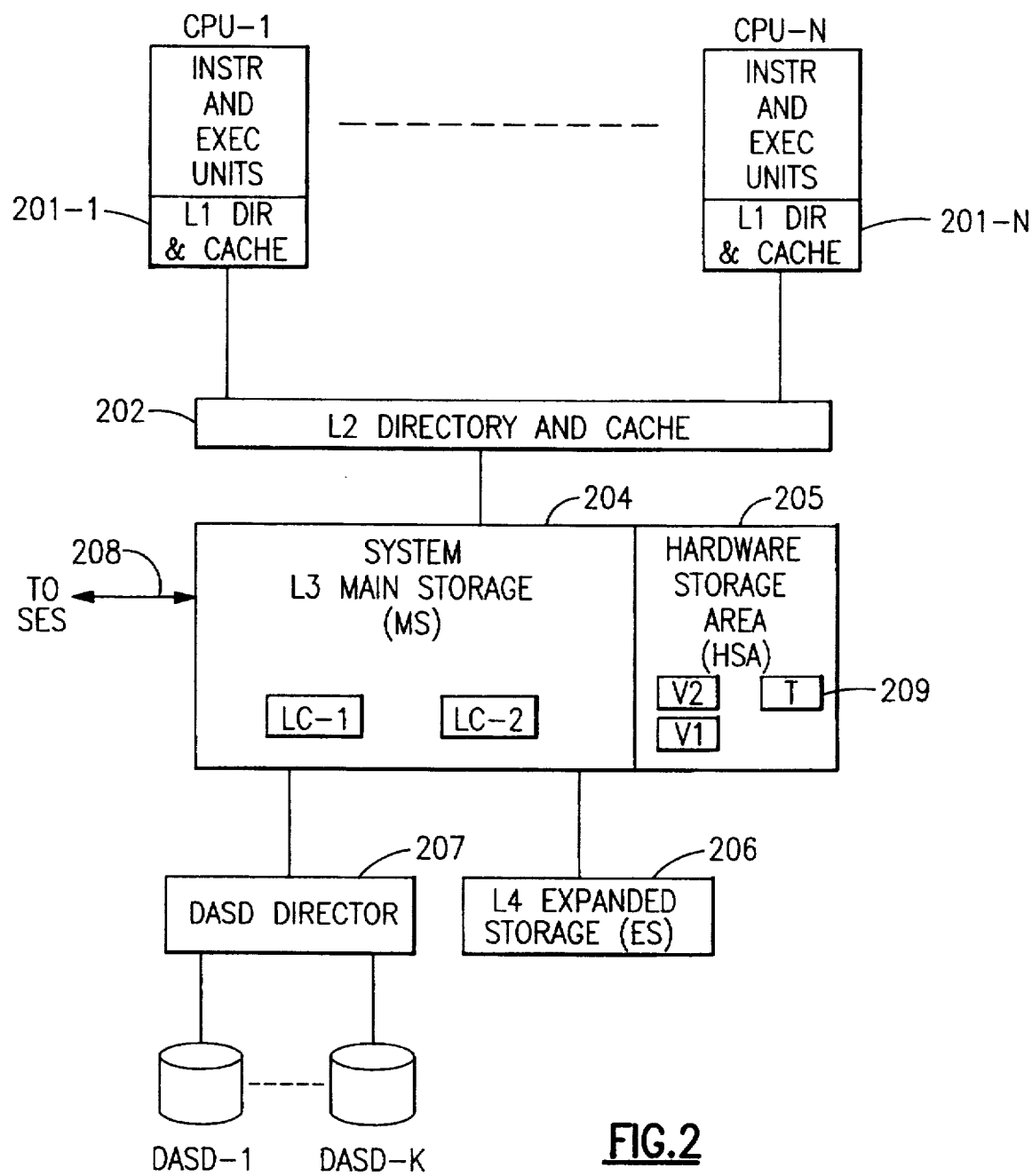
FIG. 2 represents a single CPC (computer processor complex) as may found in the prior art.

Each CPC is of the type shown in FIG. 2, which may be a multiprocessor like the presently commercial IBM ES/9000 model 900 which is designed according to the IBM ESA/390 architecture specified in the Enterprise Systems Architecture (ESA)/390) Principles of Operations (POP), which is orderable from IBM by form number SA22-7201-00, and is incorporated herein by reference in its entirety. Each CPC has one or more operating systems. If any CPC has more than one operating system, its resources are logically partitioned among plural operating systems in using the IBM PR/SM feature. Inter-system channels (ISCs) are connected between SES (101) and CPCs 1 through M. An ISC (106-1 thru 106-M) connecting to a CPC communicates signals to/from microcode/hardware in the CPC.

Each CPC in the sysplex operates with a storage hierarchy, which for example may include a private high-speed, hardware cache in each CPU (201-1 and 201-N) of a CPC, a shared hardware cache accessible to all of the private processor caches (202), a main storage (termed central storage in other literature) (MS) shared by all processors in the CPC (204), a hardware storage area (HSA) (205) associated with MS but not having MS addressability. However, the DASDs are grouped by DASD controls that allow any CPC in the sysplex to access any DASD in the group, which is referenced herein by the term "sysplex DASD".

Insofar as this invention is concerned, the MS/ES storage combination may be considered as a single random access storage unit internal to the CPC. This is because a concept is used in which pages (4 kilobyte units) in MS are backed by ES and DASD pages, which can be swapped by programs using instructions, such as "pagein/pageout" or "move page" to quickly move pages back and forth between MS and ES to eliminate the need to distinguish between records in ES or MS when they belong to the same user operation, and they may be viewed as being in the same CPC cache.

An expanded storage (ES) 206 is connected to the MS 204, and stores data which is addressed in 4 KiloByte page units. A DASD director 207 is connected to the MS (204) for controlling the storing of data on disk storage devices, DASD-1 through DASD-K. The DASD directory 207 controls the data flows between all CPCs in the sysplex and all the DASDs in the illustrated bank of DASDs, so that any CPC can access any record on any DASD, including records written by other CPCs in the sysplex. Each of these storages has a speed/capacity characteristic which places it at the position shown in the illustrated storage hierarchy.

The CPC/SES physical connection (208) may be provided by a respective channels bus connected at one end to an MS controller in a respective CPC, and connected at its other end to a SES device. The respective channel bus may be made of a serial optical fibers. The bus may be a single fiber, but it may be made of a plurality of fibers operating in parallel by "striping" (interleaving) data among them.

In a hardware sense, a SES may be considered to be a large random access memory that may be used in common by all CPCs connected to the SES. The connected CPCs may use the SES to store shared data records and files on a temporary or semi-permanent basis. Hence, SES may be considered to be a component of the storage hierarchy in the system, having a hierarchy level common to all CPCs attached to the SES, and roughly corresponding to the ES level in the CPCs.

In a sysplex using this invention, one or more SES entities may be physically connected to the MS/ES in every CPC in the sysplex. It is not required that all CPCs in a sysplex be connected to a SES. For example, a SES may be attached only to a subset of CPCs operating the same programming subsystem. Different subsets of CPCs may be connected to different SESs in a sysplex for running different programming subsystems.

A fundamental feature in this invention is using SES as a high-speed cache for data normally stored in the sysplex common DASD, although the CPC/SES/DASD physical connections may not be in a direct hierarchical path. Any CPC in the sysplex can access a record much faster from SES than it can from the common DASD storage. That is, a data element or record can be quickly accessed in SES without the electro-mechanical delays found with DASD, such as waiting for head movement between tracks and waiting for track spin to reach a requested DASD record.

SES includes one or more processors, or micro-processors, which execute all operations in SES, under the control of parameters received in messages provided by CPC commands sent to SES. Programs, or micro-programs, contained in SES are executed to provide the inventive processes described as being performed by SES.

Special commands are provided to allocate the SES cache. Also, a plurality of caches may be allocated within the same SES, such as having a respective cache handle the data shared by attached subsets of CPCs using different programs.

Referring again to FIG. 1, each SES cache includes a directory (102), data area (103), local cache register (104), and cache controls (105). If the data area part of the cache is not going to be used, it may be made zero in size. Each valid directory entry in a SES cache contains a name of a data element registered in SES by any of its attached CPCs. SES may or may not contain a copy of the data in the registered element. The SES registered name is also the name of one or more copies of the data element in one or more CPCs in the sysplex. Furthermore, this directory name also identifies a copy of the data element stored in (or about to be stored in) one of the DASDs 1-K in the bank of DASDs connected to DASD director 207.

The data element name is used by SES to control data coherence for the data element regardless of whether the data element is stored in the SES. The data element name must be registered in SES for SES to provide data coherence for the data element in the sysplex. It is not necessary to store the data element itself in SES for SES to provide data coherence.

The invention uses a cache approach having program controlled caches (buffers) in the memories of different central processing complexes (CPCs) and in one or more shared electronic storage (SES) entities. The size of any of these caches may be different from each other and may be changed without changing the hardware structures of the entities containing the caches. Data coherence is maintained among these caches. Moreover, the set of caches may reside on all or a subset of CPCs with connections to a SES cache. Data coherence is maintained among all local caches that have attached to the SES cache via an explicit attach-local-cache command executed for each local cache when the local cache is created and continues until the local cache is detached. The number of local caches may change over time.

Overview

The invention provides the structure of a multi-system data sharing complex including a shared cache in the form of a non-volatile electronic memory (aka SES) and a method for operating the cache for sharing data resources while maintaining coherency among several, possibly different, versions of the data.

If a data coherency policy in a multi-computer, data-sharing system requires writing of an updated page, an architecture with certain significant characteristics can be used. Such an architecture is illustrated in FIG. 1 and includes a plurality of independently-operating computer systems or computer processing complexes CPC-1 through CPC-M, which share data stored on direct access storage devices (DASD) 109A, 109B, through 109N. The DASD's 109A, 109B, through 190N can comprise, for example, multi-disk disk drives. The architecture includes M computer systems, CPC-1 through CPC-M, each including a database management system (DBMS) which controls creation, organization, and modification of a database comprehending data on the DASD's and which controls access to the data in the database. Also provided in the system is a high-speed non-volatile electronic memory (SES at 101) which functions as a cache shared by the computer systems. The memory (101) is attached with high-speed links 106-1 through 106-M to the computer systems CPC-1 through CPC-M. Hereinafter, the memory 101 is referred to as either "the memory" or "NV-store", or "SES".

When comparing access to the memory 101 with access to DASD's 109A through 109N, it is asserted that the memory 101 is a relatively high-speed semi-conductor memory. Further, the attachment of the memory 101 to the computer systems is by way of, for example, fiber optics communication channels which provide very high speed data transfer. Relatively speaking, an I/O operation is conducted at the relatively high-speed memory 101 while, as is known, I/O with relatively lower-speed DASD can take tens of milliseconds.

The memory 101 includes management logic 110, preferably in the form of a processor which manages all memory storage operations. The management logic 110 can comprise, for example, a high performance processor with a local program store and memory, rendering a management logic device capable of engaging in message-based memory access transactions with the computer systems CPC-1 through CPC-M.

Respecting the computer systems CPC-1 through CPC-M, these entities can comprise, for example, IBM/3090 Systems, each including a multi-processor architecture with a private cache, and each capable of supporting a database management system of the IMS/VS or DB2 type.

Substantially, the invention is practiced in the data sharing complex illustrated in FIG. 1 and described above. In the memory 101, are found a semi-conductor memory designated as a shared cache 103. The shared cache 103 can comprise conventional, multi-port, high-speed, random access memory which is preferably non-volatile. The shared cache 103 is used for storage of blocks of data. For example, the shared cache 103 can be used to store pages of data, where one such page is indicated by 111.

The management logic 110 has memory resources for storage and maintenance of local cache controls 105 and a directory 102. The local cache controls (105) and directory (105) are accessed conventionally by the management logic 110. For example, well-known hashing lookup mechanisms can be used for accessing these data structures. The local cache controls 105 is a data structure containing a plurality of entries, each entry identifying a computer system which has connected operationally to the memory 101. Assuming, for example, that the computer systems CPC-1, . . . CPC-M have connected, they will be listed in the local cache controls 105.

The shared cache 103 is operated as a "store-in" cache, as opposed to a "store-through" cache. In this regard, a "store-in" cache is one into which updated data elements (e.g. pages) can be written without the requirement that those data elements be written simultaneously into ("stored-through to") secondary storage.

A SES cache is a component of a three-level storage hierarchy in a network of attached processors. The lowest level of the hierarchy is DASD, the intermediate level is the SES-cache and the highest level is the local cache in processor storage. The DASD and SES cache are shared by the processors and are accessed by I/O operations and message operations, respectively. Local cache(s) may be defined in each processor and is accessed using CPU instructions.

Data that moves through the storage hierarchy is named. The data sizes are variable with the range of variability between 1 and 16 times the data-area element size. The data-area element sizes are fixed for each SES cache and are powers of 2 with a minimum size of 256 bytes. The names are 16-byte values assigned by a programming protocol. The data is permanently resident in the DASD storage.

Copies or new versions of the data may also reside in any combination of SES-cache storage or local-cache storage. In particular, a data object may reside in SES-cache storage, but not in any local cache, it may reside in SES-cache storage and a subset of local caches or it may reside in a subset of local caches but not in the SES-cache storage.

Figure 4:
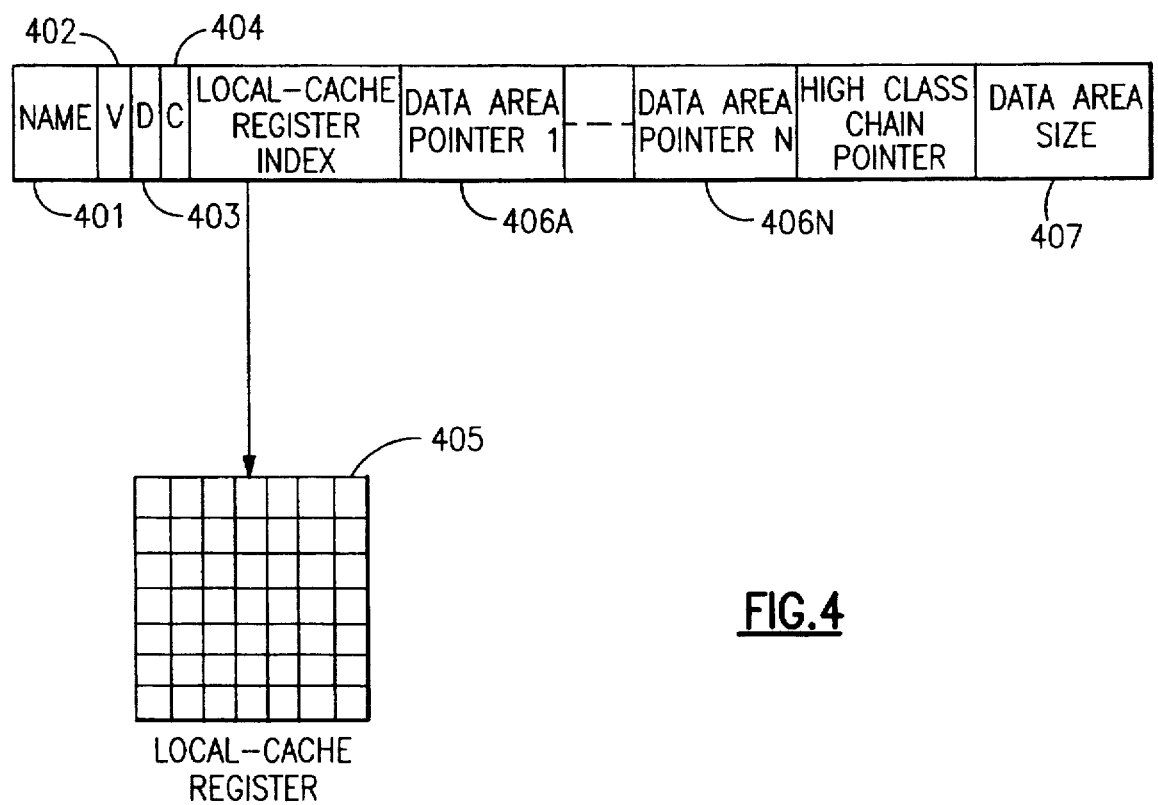
FIG. 4 represents a preferred form of an entry in the SES directory.

As an example, assume data elements being referenced in the storage hierarchy are pages. Then, a page cached in the shared cache 111 is identified by a software-assigned name. Therefore, any requests for reading or writing in the shared cache 111 are required to specify the name of the page which is the object of a request. The directory 102 is conventionally indexed by the names of pages which are objects of READ or WRITE commands. A representative entry in the directory 102 is shown in FIG. 4. In respect of the invention being described, the fields of the directory which are relevant are shown in FIG. 4. These include a name field 401, a data bit (D) field 403, a data area pointer field 406A through 406N, a change bit (C) field 404, a valid bit (V) field 402, a data area size field 407, and a local cache register index providing access to a local cache register shown in FIG. 5. The local cache register contains identification of a local cache attached to the SES cache (502A through 502C), the local cache entry number associated with an attached local cache (503A through 503C) and valid bits (501A through 501C).

Continuing the example, the page name field 401 is the field by which the management logic 110 indexes into the directory 102. Assume that the management logic 110 receives a READ or WRITE command, either of which would be accompanied by a value for a parameter P identifying the page. Management logic 110 subjects the value for P to a hashing process which generates a value used by the logic to access the directory quickly via the page name, if it already exists. Once the page name field has been located, the page address field 406 is used to point to the address in the shared cache of the identified page.

The management logic 110 creates, manages, and deletes directory entries as necessary. These activities are conducted using known mechanisms, although the precise structure of entries in the directory 102 is unique to this invention. The management logic 110 is also conventionally structured to obtain data from, and enter data into, the shared cache 111, although according to read and write operations which are unique to this invention. The management logic 110 also includes the usual cache management capability to generate "cache miss" and "cache hit" responses. These responses are generated in response to commands submitted by the computer systems connected to the shared cache 111. A "cache miss" indicates that an identified data element (eg. page) does not reside in the shared cache 111, while a "cache hit" indicates that an identified data element (eg. page) is in the cache 111.

Commands are generated by the computer systems in the multi-system complex of FIG. 1. These commands elicit responses from the management logic 110. The inventors contemplate that commands and responses are exchanged between a computer system and the management logic by a message protocol. Further, the inventors contemplate that access to the shared cache 101 may be synchronous in that any computer issuing a command may maintain a delay until a response is received from the management logic 110. The speed of the semi-conductor memory forming the shared cache 101 reduces the delay inherent in a synchronous message passing structure.

The inventors also contemplate that the computer systems of the multi-system data sharing complex in FIG. 1 obtain access to DASD's using conventional means, for example, the shared disk capability of an IBM IMS-like system. As is known, such access is asynchronous in that a computer system will not delay while a READ or WRITE command is dispatched to a DASD.

As FIG. 1 illustrates, each computer system includes an identified buffer which is used to stage data exchanged between the computer system and the NV-store 101. For example, the computer system CPC-1 includes a buffer 107A, while buffer 107C is provided in the computer system CPC-M. It is asserted that all computer systems of the data sharing complex possess such private buffers. Further, whenever one of the computer systems provides a READ or WRITE command to the management logic 110, it sends an address in its private buffer where the requested data is to be entered or obtained.

The invention concerns the movement of data into the shared cache from DASD, and the updating of data so moved. Relatedly, a data element (e.g. page) which is obtained by a computer system from a DASD for entry into the shared cache is referred to hereinbelow as a "down-level" page when the directory entry for the page has the change bit set to 1. When the change and data bits in the directory entry for a page obtained from DASD are set to 0, the page is referred to as a "clean page". In this regard, the DASD version of the page is the same as a version of the page in the shared cache 101.

The invention depends upon a set of unique commands and the registration in affected directory entries of changes resulting from execution of those commands.

Local Cache

A local cache is defined to the SES-support facility on the CPC containing the local cache as described in U.S. Pat. No. 5,388,266. CPU instructions initialize controls in the SES-support facility and assign a local-cache token. The sizes of the local caches may vary between systems.

SES Cache

The SES cache is a structure in SES consisting of a collection of data-area elements and a directory. It is designated by a structure identifier. The SES cache is created by an allocate-cache-structure command. The command is issued by an initialization procedure at a processor which determines the attributes of the SES cache: size and number of data-area elements, number of directory entries, number of storage classes, and number of castout classes.

A local cache is attached to the SES cache by the attach-local-cache command that initializes controls in the SES facility and builds a set of paths over which the SES cache issues generated commands to the SES-support facility. A local cache is attached to a SES cache so that it may participate in the storage hierarchy. Coherency of copies of the data in the local caches and in the SES cache is maintained by controls in the SES cache and enforced by cross-invalidate commands issued as generated commands to the various SES-support facilities.

SES-Cache Directory

The SES-cache directory is a collection of directory entries arranged as a fully associative array. The directory entries are partitioned into storage classes. The subset of changed directory entries is partitioned into castout classes. Whenever a named data object is placed in the higher two levels of the hierarchy, its state and location is registered by the SES-cache directory. State information indicates whether the data is changed, unchanged, or locked for castout. Location information includes whether the data is resident in the SES-cache storage and which local caches contain a copy. The record (located in the SES cache data area by pointer in locations 406A–406N) is herein referred to by any of several different terms: record, data element, data item, block, page, etc. Certain SES-read and SES-write commands register the local-cache copy in the SES-cache directory. SES-write and SES-invalidate commands remove the registration of local copies.

Local-Cache-Entry Valid State

When the data is located in the local cache, the state of the data is either valid or invalid. The valid state of local cache entries is maintained by controls in the SES-support facility. The data is validated by CPU instructions and is invalidated by the invalidation process associated with SES-write and SES-invalidate operations. The valid state of the data is tested by a CPU instruction. A valid named data object must be registered in the SES-cache directory. Local-cache coherency is maintained by the invalidation process.

Castout Process

The SES-cache storage is normally smaller than the DASD storage. Thus periodically the changed data must be transferred from the SES cache to the backing DASD. This process, called castout, is controlled by the program and involves the following operations:

A SES-read for castout operation is issued that sets the castout serialization and copies the data block to main storage.

An I/O operation is executed that copies the data block to DASD.

A SES-unlock operation is issued that releases the castout serialization.

Related data objects are maintained in castout classes by the SES cache. Castout classes are used to improve the efficiency of the castout process by enabling the program to batch data transfers to DASD in a single I/O operation. The processes which perform the movement of data between DASD and the SES cache are described in U.S. patent application Ser. No. 07/860,806.

Reclaiming Process

The least recently used unchanged data and directory resources are reclaimed by the SES cache when needed to meet new requests. The data objects are mapped into one of several storage classes by the program. Each storage class has a reclaiming vector that controls the reclaiming process. This allows the allotment of SES storage among the storage classes to be dynamically adjusted to account for changes in workload characteristics. The reclaiming vector is initialized by the program.

Instrumentation

Instrumentation information is provided to the program to assist in both the allocation of data across storage classes and in the castout process.

SES-Support Facility

The component of the SES configuration responsible for execution of SES functions in the central-processing complex (CPC) is known as the SES-support facility. It includes the following items:

CPU Instructions

Define Vector (DV)

Set Vector Entry (SVE)

Test Vector Entry (TVE)

Commands

Cross-invalidate

Data Objects

Local-Cache Vector

Message Path State

The preceding items are a required part of the SES configuration. Cross-invalidate command execution is performed by the SES-support facility. The SES configuration consists of a SES facility and a SES-support facility resident on each CPC attached to the SES facility.

Storage Model

Data objects defined for the SES-support facility are not placed in addressable storage and may be manipulated only by the CPU instructions and commands of the SES-support facility. References to these data objects follow the same rules that apply to references to addressable main storage.

Vector Tokens

A vector token is a 64 bit value used to uniquely identify a particular local-cache vector. A token is provided when a vector is defined and persists until the vector is released.

Local-Cache Vector

The local-cache vector (a.k.a. coherence vector) is created by the DEFINE VECTOR instruction. The sizes of the local-cache vectors may vary among different cache users. The local-cache vector is attached to the SES cache structure through use of the attach-local-cache command. Each entry in a local-cache vector indicates the valid or invalid state of a locally cached data element. A locally cached copy is said to be invalid when it is no longer current with respect to the shared copy registered at the SES facility. The TEST VECTOR ENTRY instruction is provided to interrogate the state of a locally cached data copy represented in the local-cache vector.

A local-cache vector entry is 1 when the associated locally cached data item is current with respect to the shared copy registered at the SES facility. A local-cache vector entry is 0 when the associated locally cached data item is not current with respect to the shared copy registered at the SES facility.

Message-Path States

The SES-support facility communicates with the SES facility by means of message paths, each comprised of an intersystem link and an intersystem channel used to transmit and receive messages over the link. The state of a message path, as registered at the SES facility and designated by a message-path identifier, is either active or inactive.

Storage Model for Local Cache Vectors

The local cache vectors occupy processor storage locations not addressable by the program by means of virtual, absolute or real storage addresses. Specific CPU instructions are defined to provide access to one or more entries within a local cache vector. The effective address of the byte of processor storage containing the vector entry being accessed is provided to these instructions.

For the purposes of this definition, the term "effective address" is used to denote the byte of processor storage containing the vector entry being accessed before translation, if any, occurs by the machine. Effective addresses of local cache vector entries are assigned by the DV instruction. Unlike virtual storage addresses, the byte of processor storage containing a vector entry is accessed with at most one effective address. There is a 1:1 mapping of vector entry effective address to processor storage location.

Protection of Coherence Vectors

It is critical that integrity be maintained for the coherence vector bits and their settings, because the validity of the data in the sysplex depends on their correct operation. Thus, the vector bit locations and their settings must be protected from any possible corrupting manipulation by all CPC programming. An improper program operation in a CPC (intentional, or unintentional) could corrupt the coherence bits. For example, if the coherence vector bits were in MS (where they would be addressable by CPC programs), an unintentional wild store by any CPC program could have disastrous consequences on the CPC operation by changing the setting of a vector bit to invalidate good data in an LCB or to falsely indicate data in an LCB is valid when it is invalid, either of which corrupts the CPCs data which could then be improperly promulgated by the CPC to SES and DASD to corrupt the data for other CPCs in the sysplex. A wild store to table T could wipe out the recognizable existence of any vector bit.

To protect the data coherence vectors from being improperly affected by CPC programming, the vectors are not put in the CPC's programmable storage (i.e. main memory-MS). Instead, they must be put in a special place isolated from the CPC programming, such as in hardware. But hardware is inflexible once constructed, while the size of the invalidation vectors must be flexible in size due to the probability that the number of LCBs may vary in the associated LC. Accordingly, the preferred embodiment of this invention locates the LC in main storage (MS) which is addressable by CPC programming, but locates the vector bits in a part of system memory which is not addressable by CPC programming.

In the preferred embodiment, the coherence-request vectors are located in the CPC's "hardware storage area (HSA)" which is only addressable by the CPC hardware and microcode executing in any CPU in the CPC. In IBM mainframes, the HSA is physically structured as an extension of MS but is not part of the address space in MS, and is addressed only by CPU microcode/hardware. Hence, the HSA cannot be addressed by operating system or user instructions in any program executing on any CPU of the CPC. By putting the vector bits into the HSA, their locations and state settings can be controlled by special privileged instructions used only by special operating system programs.

CPU INSTRUCTIONS

Define Vector

A bit vector of specified size (N) consisting of entries 0 through N-1 is established on the CPC, released, cleared to zeroes, expanded, or contracted and the result is indicated in the condition code.

The first register operand designates the even-numbered register of an even-odd pair of general registers. The second register operand designates a single general register.

General register one contains an unsigned binary integer which indicates how the operation of DEFINE VECTOR proceeds and how the contents of the designated general registers are interpreted. The designated general registers may contain one or more of the following:

A local-cache token (LCT) currently assigned due to the execution of a preceding DEFINE VECTOR instruction.

An unsigned binary integer indicating the number of bit vector entries (NBVE). The NBVE cannot be zero.

One of the following operations is performed by DEFINE VECTOR depending on the contents of general register 1.

Define local-cache vector

Release vector

Clear vector

Modify vector size

Local-cache tokens are uniquely assigned. Once a token has been first assigned and then released, that token may not be reused.

Define Local-cache Vector

If a local-cache vector is to be defined, then the second register contains the number of local-cache bit vector entries to be defined.

A local-cache token is assigned to identify the local-cache bit vector being defined to the CPC. The LCT replaces the contents of the register pair designated by the register one field.

A bit vector is established which consists of one bit for each local-cache bit vector entry requested. The leftmost bit of the bit vector is identified as bit zero. The rightmost bit is specified by one less than the number of local-cache bit vector entries. When a bit vector is established, all local-cache bit vector entries are zero. The LCT identifies the local-cache bit vector.

Release Vector

If a vector is to be released, then the first register pair contains a LCT to be released.

The local-cache-token is released and the bits of the bit vector existing for that token are made available for reuse. The bit vector is said to no longer exist, and becomes undefined to the CPC. The bit-vector bits are not assigned for reuse until every bit has been cleared to zero.

Clear Vector

If a vector is to be cleared, then the first register pair contains a LCT which designates a bit vector to be cleared to zeroes.

All entries in the designated bit vector are cleared to zeroes.

Modify Vector Size

If the size of a vector is to be modified, then the first register pair contains a LCT which designates a bit vector to be modified.

The general register designated by the second register field contains a unsigned binary integer indicating the number of bit vector entries (NBVE). The NBVE cannot be zero and is not to exceed the maximum number of bit vector entries supported by the CPC.

A new number of bit vector entries is established for the bit vector identified by the LCT. The bit vector is redefined to the CPC. The LCT token remains the same. The bit vector, established by the preceding DEFINE VECTOR instruction which assigned the LCT, is expanded or contracted from its rightmost bit position to reflect the new number of bit vector entries.

If the bit vector is expanded, then the state of the bit vector entries reflected in the portion of the bit vector that existed prior to expansion remains unchanged, and the the bit vector entries reflected in the newly established portion of the bit vector are set to zeroes.

If the bit vector is contracted, then the state of the bit vector entries reflected by the remaining portion of the bit vector is unchanged, and the portion of the bit vector no longer needed may be reused after each bit is cleared to zero.

Set Vector Entry

The value of the selected bit vector entry is set to one or reset to zero and the result is indicated in the condition code.

The first register operand designates the even-numbered register of an even-odd pair of general registers. The second register operand designates a single general register.

General register one contains an unsigned binary integer which indicates how the operation of SET VECTOR ENTRY proceeds. One of two operations is performed by SVE depending on the contents of the first general register.

Set vector entry to one

Reset vector entry to zero

The pair of general registers designated by the first register operand field contains a local-cache token (LCT) currently assigned due to the execution of a preceding DEFINE VECTOR instruction. The LCT identifies a local-cache bit vector.

The general register designated by the second general register field contains an unsigned binary integer, called the local-cache-entry number (LCEN) which selects an entry in the bit vector. The first entry in the bit vector is selected by a LCEN of value zero. The last entry in the bit vector is selected by a LCEN that is one less than the number of bit vector entries associated with this bit vector. The number of entries for this bit vector was established by a preceding DEFINE VECTOR instruction.

The high performance cache cross-interrogate function provided through the use of a local-cache vector is achieved by means of the SES-cache cross-invalidation process and the appropriate manipulation of the local-cache vector by programming before and after the execution of specific SES cache commands.

Many SES cache commands provide programming the ability to register interest in a named SES-cache data entry so that a local copy of the data may be kept in processor storage. Keeping a local copy of the data improves performance by reducing the number of accesses to the SES facility. The locally cached copy is said to be valid until it is no longer current with respect to the shared copy registered in SES. The locally cached copy is made invalid by means of a cross-invalidate command.

Local-cache registration is required to enable the cross-invalidation process. Local-cache registration is performed at the SES facility and consists of recording the local-cache identifier, local-cache token, and local-cache entry number associated with the locally cached copy of the data. Programming is responsible for indicating the validity of the locally cached data element in the local-cache vector at the time interest in the locally cached copy is registered at the SES facility. The SET VECTOR ENTRY (SVE) instruction is used for this purpose.

Because it is possible for a SES-support facility to receive and execute a cross-invalidate command against a designated local cache vector entry after interest in the data element has been registered at the SES but before the response to the command under which the registration took place is received, the update to the local-cache vector entry by the program must be serialized with execution of the SES command. The program must ensure the local-cache vector entry is not set to one after it is set to zero by an intervening cross-invalidate command. Otherwise, invalidation of a locally cached data page may go undetected and result in the loss of data integrity.

Programming will use the SVE instruction to optimistically set the local-cache vector entry to one before initiation of a SES cache command which designates the entry for purposes of local-cache registration. If command failure is either indicated or presumed, the SVE instruction should be used to zero the local-cache vector entry.

Test Vector Entry

The state of the selected bit vector entry is tested, and the result is indicated in the condition code.

The first register operand designates the even-numbered register of an even-odd pair of general registers. The second register operand designates a single general register.

The pair of general registers designated by the first register operand field contains a local-cache token (LCT) currently assigned due to the execution of a preceding DEFINE VECTOR instruction. The LCT identifies a local-cache bit vector.

The general register designated by the second general register field contains an unsigned binary integer, called the local-cache-entry number (LCEN) which selects an entry in the bit vector. The first entry in the bit vector is selected by a LCEN of value zero. The last entry in the bit vector is selected by a LCEN that is one less than the number of bit vector entries associated with this bit vector. The number of entries for this bit vector was established by a preceding DEFINE VECTOR instruction.

Use of TVE provides a high performance means to determine the validity of a locally cached SES-cache data entry. To ensure updates to the shared data copy registered in the SES do not occur after TVE indicates validity of the locally cached copy and before the locally cached copy is processed by the program, serialization against modification of the SES resident copy must be held across the TVE execution and subsequent use of the data.

A local-cache vector entry is 1 when the associated locally cached data item is current with respect to the shared copy registered at the SES facility. A local-cache vector entry is 0 when the associated locally cached data item is not current with respect to the shared copy registered at the SES facility.

SES-SUPPORT FACILITY COMMANDS

Cross-Invalidate

The reception of a cross-invalidate command by the SES-support facility results in a cross-invalidate operation. The cross-invalidate command contains a local-cache token (LCT) and a local-cache-entry number (LCEN). The cross-invalidate operation includes invalidating the local-cache entry selected by the local-cache-entry number in the local-cache designated by the local-cache token by setting the selected local-cache bit vector entry to zero and indicating by a response to the SES facility that the cross-invalidate operation occurred.

The selected local-cache entry is invalidated by setting the selected local-cache bit vector entry to zero unless the local-cache-entry number is greater than or equal to the number of local-cache entries associated with this local-cache or unless the designated local-cache token is not in the assigned state. These conditions can occur if the size of the local-cache is modified or a local-cache token is released while a SES-cache-directory entry indicates validity for this local-cache entry.

When the cross-invalidate operation completes, the invalid state of the local-cache entry selected by the cross-invalidate operation is visible to any CPU in the configuration.

Message-Path Object

In general, several processors issue SES commands, and several links connect each processor to the SES facility. The SES facility assigns message-path identifiers that distinguish among the different sources of commands.

The message-path objects are summarized in the following:

Message-path identifier (MI)

Message-path state (MPS)

Message-path status vector

Path group

System identifier (SI)

Message-Path Identifier (MI)

Eight-byte values that are used to identify message paths at the SES facility. There is a unique message-path identifier for each source of commands.

Message-Path State (MPS)

A one-byte hex value that specifies the state of the message path. A value of X'00' indicates the path is in the inactive state, and a value of X'01' indicates the path is in the active state.

Message-Path Status Vector

The message-path-status-vector object contains state information for each message path in the SES facility. The message-path status vector includes objects for each message path:

The message-path state (MPS)

The system identifier (SI)

Path Group

The set of message paths with the same system-identifier (SI) value is the path group for the system.

System Identifier (SI)

An eight-byte value that is designated by the program when the message path is activated. The control program specifies the same system-identifier value for all paths that are activated between the system and the SES facility.

Cache Structure

A set of cache-structure objects is established for each SES-cache structure. The cache-structue objects consist of:

Cache controls

Local-cache controls

Directory

Local cache register

Data areas

CACHE CONTROLS

Data-Area-Element Characteristic (DAEX)

A one-byte unsigned binary integer that specifies the number of bytes in each data-area element. The size of the data-area element in bytes is the product of 256 and 2 raised to the power of the value specified in the data-area-elenent characteristic. Valid sizes in bytes are 256 to the maximum data-area-element size.

LCID Vector (LCIDV)

A bit string with an initial value of zero. The bit positions start at 0 and increase sequentially. The bit at position (i) in the string is set to one when a local cache is attached with an LCID value of (i). When the bit is one, the local-cache identifier is assigned. The bit at position (i) is reset to zero when the local cache is detached and LCID unassignment is requested or when the cache structure is deallocated. When the bit is zero, the local-cache identifier is not assigned.

Maximum Data-Area Size (MDAS)

A five-bit unsigned binary integer that specifies the maximum allowable size of a data area as an integral multiple of the data-area-element size. The maximum data-area size is set by the program when the cache is allocated.

Structure Size (SS)

A four-byte unsigned binary integer that specifies the number of 4K-byte units of SES storage allocated for the cache.

Total-Data-Area-Element Count (TDAEC)

A four-byte unsigned binary integer that specifies the number of data-area elements allocated for the cache.

Total-Directory-Entry Count (TDEC)

A 4-byte unsigned binary integer that specifies the number of directory entries allocated for the cache.

Local-Cache Controls

The local-cache controls are initialized when a local cache is attached to the SES cache and are deleted when the the local-cache identifier is unassigned. The local-cache controls are valid when the local-cache identifier is assigned.

The local-cache controls are summarized in the following:

Detachment restart token (DRT)

Local-cache token (LCT)

System identifier (SI)

Detachment Restart Token (DRT)

An eight-byte value used to control the detachment process. The initial value is zero.

Local-Cache Token (LCT)

An eight-byte value used to identify the local cache on the CPC.

System Identifier (SI)

An eight-byte value specified by the program when a message path is activated. The system identifier is maintained in the message-path status vector, and copied into the local cache controls when an attach-local-cache command is communicated over the message path. The local-cache token is provided on cross-invalidate commands and is checked by the SES support facility.

Directory

The directory is the repository of state and location information for the SES and attached local cache(s). Each named data block that appears in the SES cache storage has an associated directory entry. The directory entries are arranged as a fully associative array and are accessed by using the value of the name field.

The directory-entry fields (FIG. 4) are summarized as follows

Change bit

Data bit

Data area size

Local-cache register & index

Name

Valid bit

Change Bit (C) ( 404 )

A one-bit value which indicates the changed state of the data. When the change bit is one, the data is cached as changed. When the change bit is zero the data is either not cached, or is cached but not changed. Whenever the data is in the changed state, the most recent version of the data resides in the cache. When the change bit is one, the data bit must also be one.

Data Bit (D) (403)

A one-bit value which indicates whether the data is located in the SES cache. When the data bit is one, the data is cached. When the data bit is zero, the data is not cached.

Data-Area Size (DAS) (407)

A five-bit unsigned binary integer that specifies the size of the data area as an integral multiple of the data-area-element size. The initial value is zero when the directory entry is assigned and is zero until the data bit is set to one.

Data-Area Storage (406)

Each directory entry also has k number of data area element pointers 1 through n, which respectively contain a pointer to different block areas in the cache data area (406A thru 406N). Each of these pointers may address a data-area-element anywhere in the SES memory. Thus a record referenced by a directory entry may be contained in up to N number of data-area-elements that may be scattered anywhere in the SES memory.

Figure 5A:
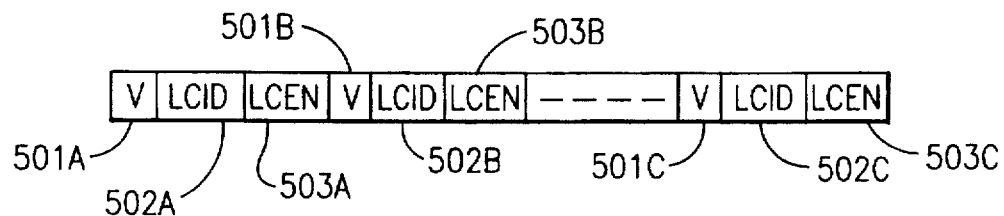
FIG. 5a and 5b represent a preferred form of an entry in a SES local cache register (LCR).
Figure 5B:
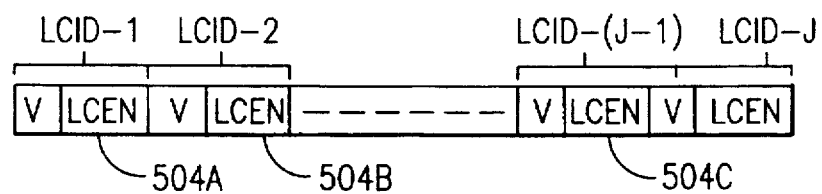

Local-Cache Register (LCR) (FIG. 5)

The local-cache register is a table containing information on the location of the locally cached copies of the data block. Each row in the table corresponds to a directory entry. The columns contain the local-cache identifier (502A, 502B, 502C), the local-cache-entry number (503A, 503B, 503C), and a valid bit (501A, 501B, 501C) for the local-cache-entry number.

A valid local-cache-entry number is registered in the local-cache register when a registration process is executed for the specified name and local cache. A local-cache-entry number is invalidated when a local cache is detached, or when an invalidate-local-copies process or an invalidate-complement-copies process is executed for the specified name and the local cache is a member of the set of local caches being invalidated.

FIG. 5, example B, illustrates one embodiment for the local cache register (LCR) structure. The entry includes j number of LCID fields, in which j is the maximum number of local caches which can attache to the SES cache in the sysplex. Each entry in the LCR contains a valid bit (v) and an LCEN value (504A, 504B, and 504C). The v bit is set to one if the field represents an LCID. If v is zero, the field does not represent any LCID value.

The LCID values are assigned by operating system software when a request is made to connect a local cache to the SES cache. Entries in the LCR are ordered by LCID value. Valid and LCEN fields for LCID 1 are in the first LCR entry location, valid and LCENfields for LCID 2 are in the second LCR entry location, and so forth through valid and LCEN fields for LCID j.

Name (N) (401)

The name contains a 16-byte value specified by the program when the named data object is registered in the cache.

Valid Bit (V) ( 402 )

A one-bit field which indicates the valid state of the directory entry. The two possible values are: 0 invalid; 1 valid. The directory entry is initialized to the invalid state. When in the invalid state the directory entry is available for assignment to a name. The valid state indicates that the name is assigned and the remaining fields in the directory entry are valid.

Hash Accessing of SES Directory Entries

Figure 3:
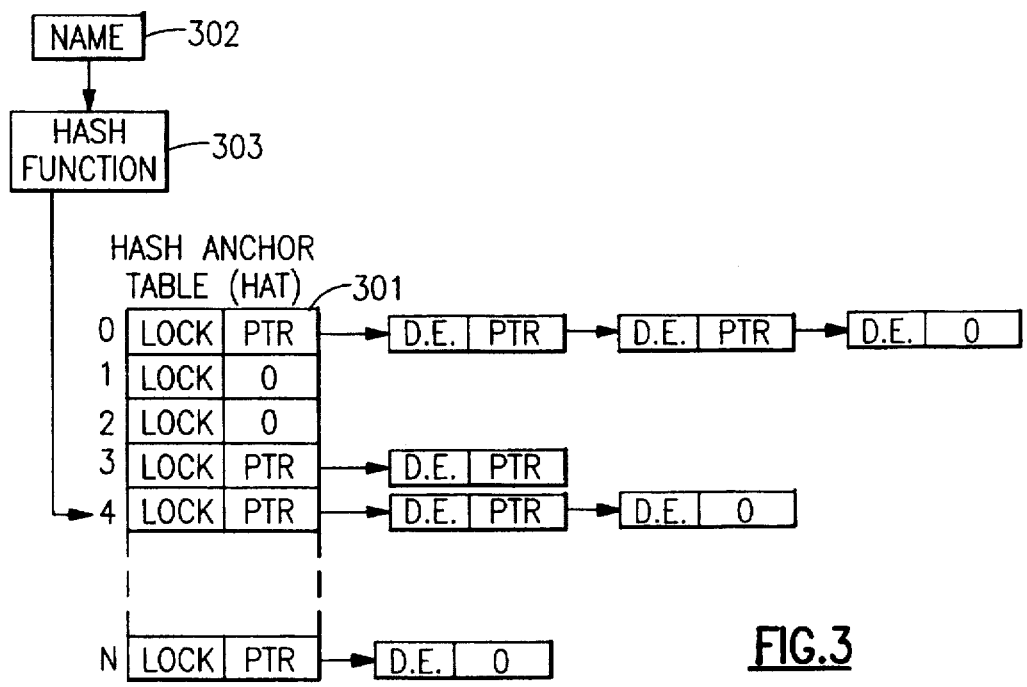
FIG. 3 generally represents a SES hash anchor table for an associated SES directory.

FIG. 3 indicates the way the SES directory operates in the preferred embodiment. Directory entries are searched using the name of a record.

A hash table 301 enables a search operation to quickly find a required directory entry. The search operation hashes a data name received in a CPC command (302), using any hashing algorithm (303), of which many are well-known in the art. For example, the hash operation may be an exclusive-OR operation upon the bytes in the received name to be searched. The hash operation generates a hash-table address for an entry within a hash anchor table. Any hash table address may be generated by a name, as long as different names generate addresses that disperse to different entry locations within the table. Each hash-table entry contains an address to a cache directory entry.

Each hash-table entry contains a lock field and a pointer field. The lock field uses any well-known locking software protocol, such as putting therein an indicator representing a requestor currently holding the lock, and setting the lock field to a common value for indicating when it is not locked and available for accessing by any requestor. Each hash-table entry also contains a pointer field which is initially set to zero, which means it does not contain a pointer address.

When at least one cache directory entry (D.E.) exists in the class of a hash-table entry, its pointer field is set with the address to any entry in its class. When a next D.E. exists in the same class, the hash-class pointer field in the first D.E. is set with the address to the second D.E., and so on as each next D.E. is added to the directory, with the last D.E. having a zero in its hash-class pointer field.

Data Area

The data area is a storage object containing the contents of a single named data object. A data area is associated with a directory entry when the named data object is initially written into the cache and remains associated until either a reclaim operation occurs or the name is invalidated. The data area consists of from one to 16 data-area elements. The data area size is determined when the named data object is written.

Cache Structure States

The cache structure has two types of states associated with it. They are:

Local-cache states

Local-cache identifier states

Local-Cache States

A cache-structure local cache exists when the associated local-cache identifier is assigned. A local cache is placed in the attached state by the attach-local-cache command. A local cache is placed in the detached state by the detach-local-cache command when the detachment process is complete.

Local-Cache-Identifier States

A local-cache identifier is in the assigned state when the associated assigned bit in the local-cache-identifier vector is one. A local-cache identifier is placed in the assigned state by the attach-local-cache command. A local-cache identifier is in the unassigned state when the associated assigned bit in the local-cache-identifier vector is zero. A local-cache identifier is placed in the unassigned state by the detach-local-cache command, depending on LCID-unassignment control.

CACHE-STRUCTURE OPERANDS

The cache-structure operands related to SES cache coherency are summarized in the following:

Assignment Control (AC)

The assignment control is a one bit value that controls the name-assignment process. The two possible values are: 0 suppress assignment; 1 assign when required Attachment Information (AI)

A value set by the program when the local cache is attached.

Change Control (CHGC)

The change control is a one-bit value that selects which process is used for writing the data. The two possible values are: 0 write data unchanged; 1 write data changed.

Data-Area Size (DAS)

A five-bit binary value that specifies the size of the data area as an integral multiple of the data-area-element size. Valid values range from 0 to the maximum data-area size.

Data-Block Size (DBS)

A five-bit binary value that specifies the size of the data block as an integral multiple of 4096-byte units.

Target Directory-to-Data Ratio (TDTDR)

A two-byte field consisting of two one-byte unsigned binary integers that specify the relative number of directory entries to data-area elements. The integer specified in the first byte divided by the sum of the two numbers represents the fraction of the total count of directory and data area elements associated with the directory entries. The integer specified by the second byte divided by the sum of the two numbers represents the fraction of the total count consisting of data area elements.

Invalidated Local-Cache-Entry Number (ILCEN)

A four-byte unsigned binary integer that specifies the local-cache-entry number replaced by the local-cache-entry registration process.

ILCEN Validity Indicator (ILCENV)

A one-bit value that, when one, indicates the validity of the invalidated-local-cache-entry-number response operand.

LCID-Unassignment Control (LUC)

A one-bit value that controls the unassignment of the local-cache identifier. When the value is B'1', the local-cache identifier is unassigned, and the local-cache controls are reset. The LCID value is available for assignment. When the value is B'0', the LCID vector and the local-cache controls are not updated.

Local-Cache-Entry Number (LCEN)

A four-byte unsigned binary integer that specifies a local-cache entry.

Local-Cache-Entry-Registration Control (LCERC)

A one-bit value that controls the local-cache-entry-registration process.

Local-Cache Identifier (LCID)

A one-byte unsigned binary integer that identifies a local-cache.

Local-Cache Token (LCT)

An eight-byte value that identifies a local cache in a CPC. The value of the local-cache token must identify a defined local cache.

Maximum Data-Area Size (MDAS)

A five-bit binary value that specifies the maximum allowable size of a data area as an integral multiple of the data-area-element size.

Name (N)

A 16-byte value that identifies a data block in the storage hierarchy.

Name Mask (NM)

A two-byte value that determines the bytes used for name comparison.

Name-Replacement Control (NRC)

A one-bit value that controls the name-replacement process: 0 suppress replacement; 1 replace name.

Replacement Name (RN)

A 16-byte value that identifies a data block being replaced in a local cache.

Restart Token (RT)

An eight-byte value that controls the processing of an operation against the directory that spans multiple commands.

Structure Size (SS)

A four-byte value that specifies the number of 4096-byte units of SES storage allocated for the cache structure.

Total-Data-Area-Element Count (TDAEC)

A four-byte unsigned binary integer that specifies the number of data-area elements allocated for the cache.

Total-Directory-Entry Count (TDEC)

A four-byte unsigned binary integer that specifies the number of directory entries allocated for the cache.

Cache-Structure Processes

The following processes are invoked by various cache-structure commands. The set of processes invoked by a command are listed in the command description.

Allocating a Cache Structure

A cache structure is created on the first successful invocation of the allocate-cache-structure command for a structure that does not already exist. A cache structure is initially allocated after one or more successful invocations of the allocate-cache-structure command. These operations are referred to generically as cache-allocation processes.

An allocate-cache-structure command is successful when response code 0 or 1 is returned.

Checkpointing a Cache-Allocation Process

After a cache structure is created, an allocate-cache-structure command is always checkpointed when a response code of 0 or 1 is returned. After a cache structure is created, an allocation process may be checkpointed anytime during the execution of a successful allocate-cache-structure command or when background processing continues as a result of a successful allocate-cache-structure command. Background processing of a successful allocate-cache-structure command stops when a response code of zero is returned.

When a cache-allocation process is checkpointed the structure-size, total-directory-entry-count, and total-data-area-element-count cache objects are updated, and the free-space and free-control-space global objects are updated.

Completing a Cache-Allocation Process

When a response code of zero is returned, all requested cache-allocation processes are complete.

Creating a Cache Structure

When the cache structure is created, the target directory-to-data ratio and the adjunct-assignment indicator determine the attributes of the created structure. When the second byte of the target directory-to-data ratio is zero, no data area elements or adjunct area elements are created and the cache is a directory-only cache. When the second byte of the target directory-to-data ratio is nonzero and the adjunct-assignment indicator is one, an adjunct area is assigned to the directory entry when data is initially cached in the data area. When the second byte of the target-directory-to-data ratio is nonzero and the adjunct-assignment indicator is zero, no adjunct areas are created.

When a cache-structure is created, (1) the created bit in the structure-identifier vector associated with the SID value is set to one; and (2) the cache-structure controls are initialized. This includes the following:

Initializing the LCID vector to zero.

Placing the USC operand in the user-structure control,

Setting the adjunct-assignment indicator equal to the value of the AAI operand,

Placing the DAEX operand in the data-area element-characteristic object,

Placing the MDAS operand in the maximum-data-area size object,

Updating the structure-size

When a cache structure is created, (1) the structure-size object is initialized to the largest storage size available that is equal to or smaller than the target-structure-size request operand, (2) the ratio of the new total-directory-entry-count object to the total-data-area-element-count object is within the range of zero to the directory to data ratio.

Change-Signal Processing

A change signal is processed for a specified data area. As part of change signal processing, the change bit is set in the directory entry indicating the data is cached as changed. The setting of the change bit in the directory entry must be done before the command is completed.

Data-Area-Element Assignment

Data-area-element assignment is processed for the specified name, storage class, and data-area size by obtaining an ordered collection of available data-area elements, attaching them to the directory entry, setting the data bit to one, and setting the data-area-size object to the value of the DAS operand. When insufficient data-area elements are available, data areas are reclaimed to satisfy the request. Each reclaimed data area is cleared, the data-area elements are attached to the directory entry, and any remaining data-area elements are placed on the free list of data-area elements.

Directory and Data-Area Element Creation

The available storage assigned to the cache structure is apportioned to create directory entries and data-area elements. The number of each that is created is a function of the amount of available storage, the specified directory-to-data ratio, the data-area-element characteristic, and the specified structure size. The resulting number of directory entries and data-area elements are placed in the total-directory-entry-count (TDEC) and total-data-area-element-count (TDAEC) control fields, respectively.

Once the total-directory-entry count is established, the total storage available for the creation of data-area elements is determined by subtracting the directory storage. The storage required for data-area elements is determined by the data-area-element characteristic, and the directory-to-data ratio.

Directory and Data-Area Reclaiming

Figure 33:
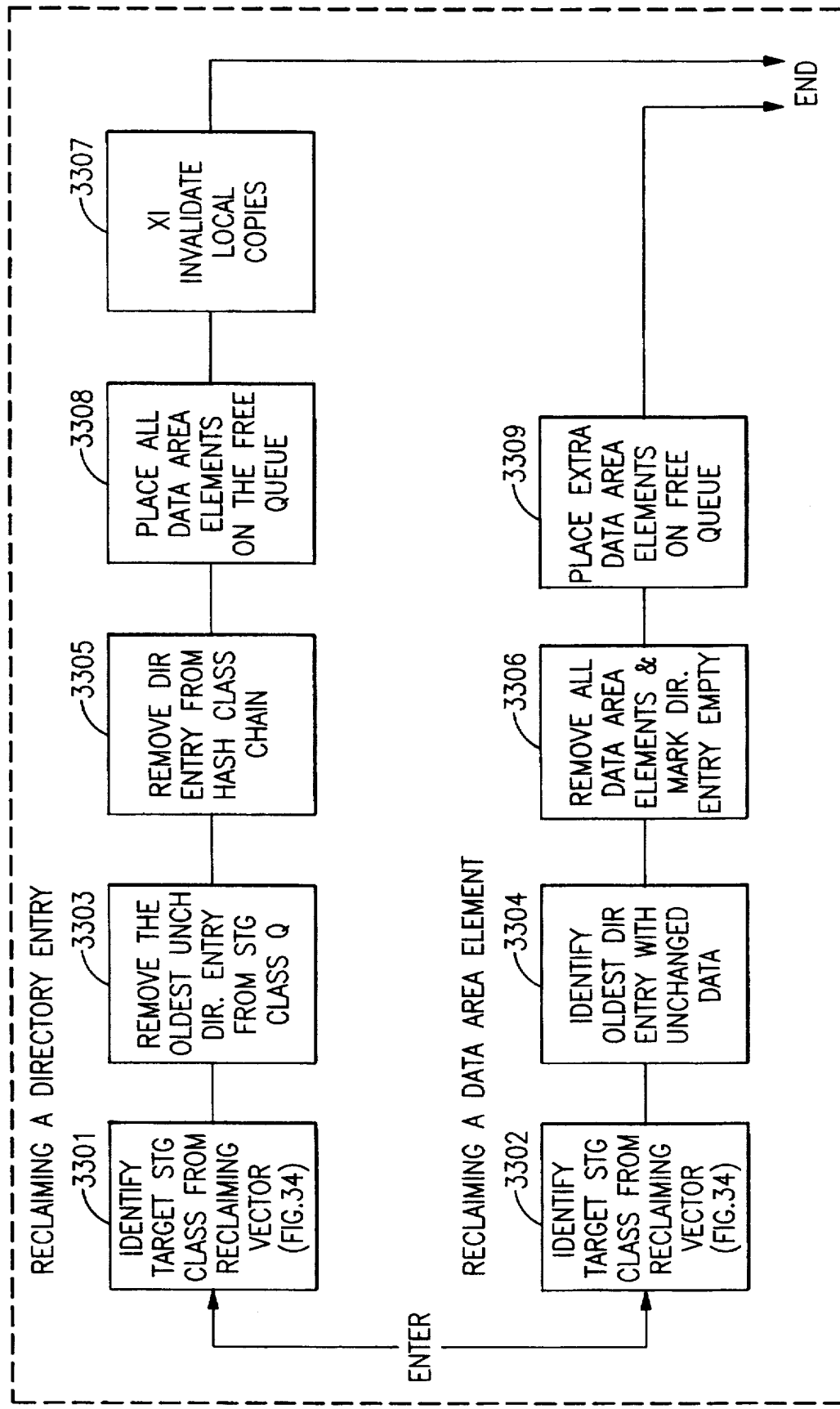
FIG. 33 is a process flow diagram for the directory and data area reclaiming process.

FIG. 33 is a process flow diagram for the directory and data area reclaiming process. Data-areas and directory entries are reclaimed for a specified storage class. The reclaiming process involves identifying a target storage class (3301 and 3302), locating the oldest unchanged directory entry (3303) or data area (3304) in the target class, and detaching the directory entry or data area from the directory (3305 and 3306).

When a directory entry is detached from the directory, the directory entry is marked invalid. The local-cache register is scanned, all valid local copies are invalidated with a cross-invalidate command, and the entry is invalidated (3307).

When a directory entry with an assigned data area is reclaimed, the data area is released and the data-area elements are placed on the free list (3308).

Figure 34:
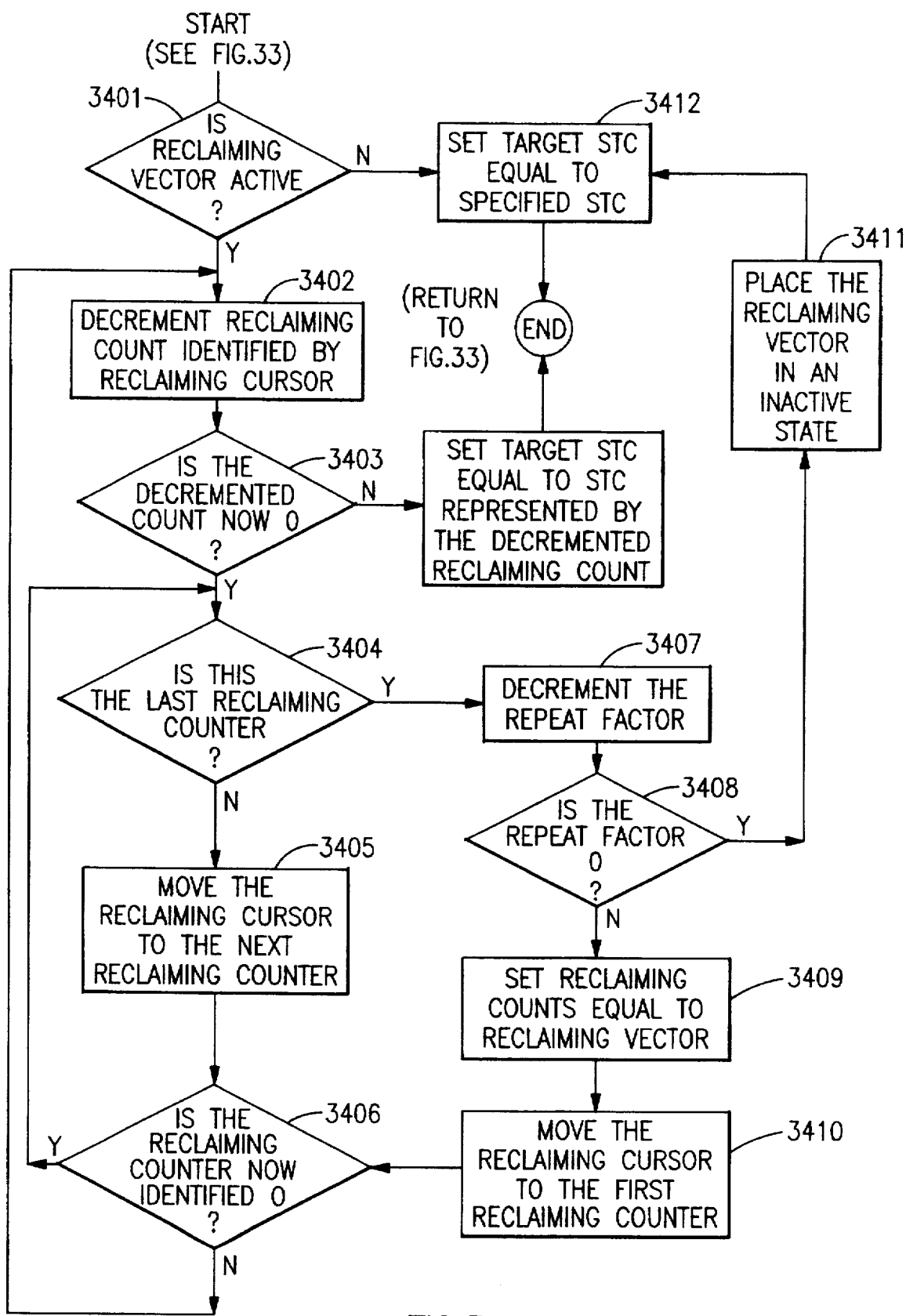
FIG. 34 is a process flow diagram representing the operation of the reclaiming vector and the reclaiming counters.

The target storage class is identified by the reclaiming-vector cursor when the reclaiming vector is active. FIG. 34 is a flow diagram for target storage class identification. When referenced, the reclaiming vector is updated as follows:

The reclaiming count for the current array element is decremented (3402).

When the count reaches zero (Y path from 3403) the reclaiming-vector cursor is moved to the next array element (3405) with a nonzero reclaiming count (N path from 3406).

When the reclaiming-vector cursor points to the last array element in the vector and the count in this element is zero (Y path from 3404), the repeat factor is decremented (3407), the reclaiming counts are refreshed to their initial values (3409) and the cursor is moved to the array element which has the smallest index (3410) and contains a nonzero count (N path from 3406).

When the repeat factor reaches zero (Y path from 3408), the reclaiming vector is placed in the inactive state (3411); otherwise, the reclaiming vector remains active.

When the reclaiming vector for the specified storage class is inactive (N path from 3401), the specified storage class is the default target class (3412).

SES cache storage management processes uphold the data integrity maintained through processes described in patent application Ser. No. (PO992003) by D. A. Elko et al and assigned to the same assignee as this invention. Issuing cross-invalidate signals when a directory entry is reclaimed prevents the following from occurring:

1. The directory entry with name X is reclaimed. Local copies remain valid, but their registration is no longer tracked by SES.
2. The name X is registered in a different directory entry and changed. Since the valid local copies are not registered in the new directory entry, no XI signals are issued, and the local buffers lose coherency.

Local-Cache-Entry Deregistration

A local-cache entry is deregistered by providing the specification of the entry and providing a replacement-name value. The local-cache entry is removed from the local-cache register for the name by setting the row corresponding to the local-cache identifier to the invalid state. The program does not serialize on the replacement name, but rather on the local-cache-entry number. Thus, the SES must test the value of the local-cache-entry number in the local-cache register for the replacement name prior to setting the row invalid. If the contents do not match the value of the local-cache-entry number, no action is taken. The replacement name has been registered in a different local-cache entry by a separate process.

Local-Cache-Entry Invalidation

Figure 14A:
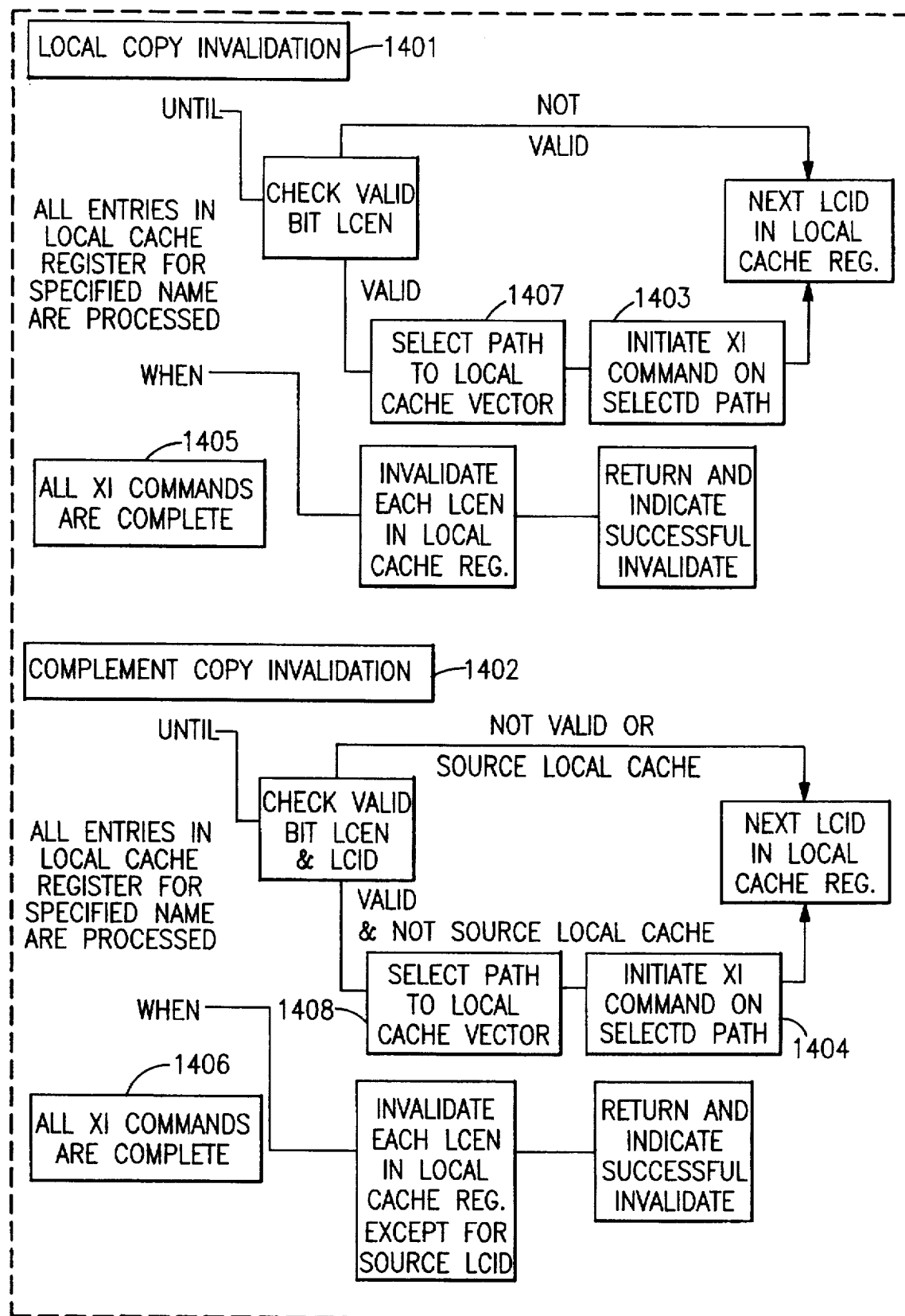
FIGS. 14A and 14B provides a flow diagram that represents a local cache entry invalidation.
Figure 14B:
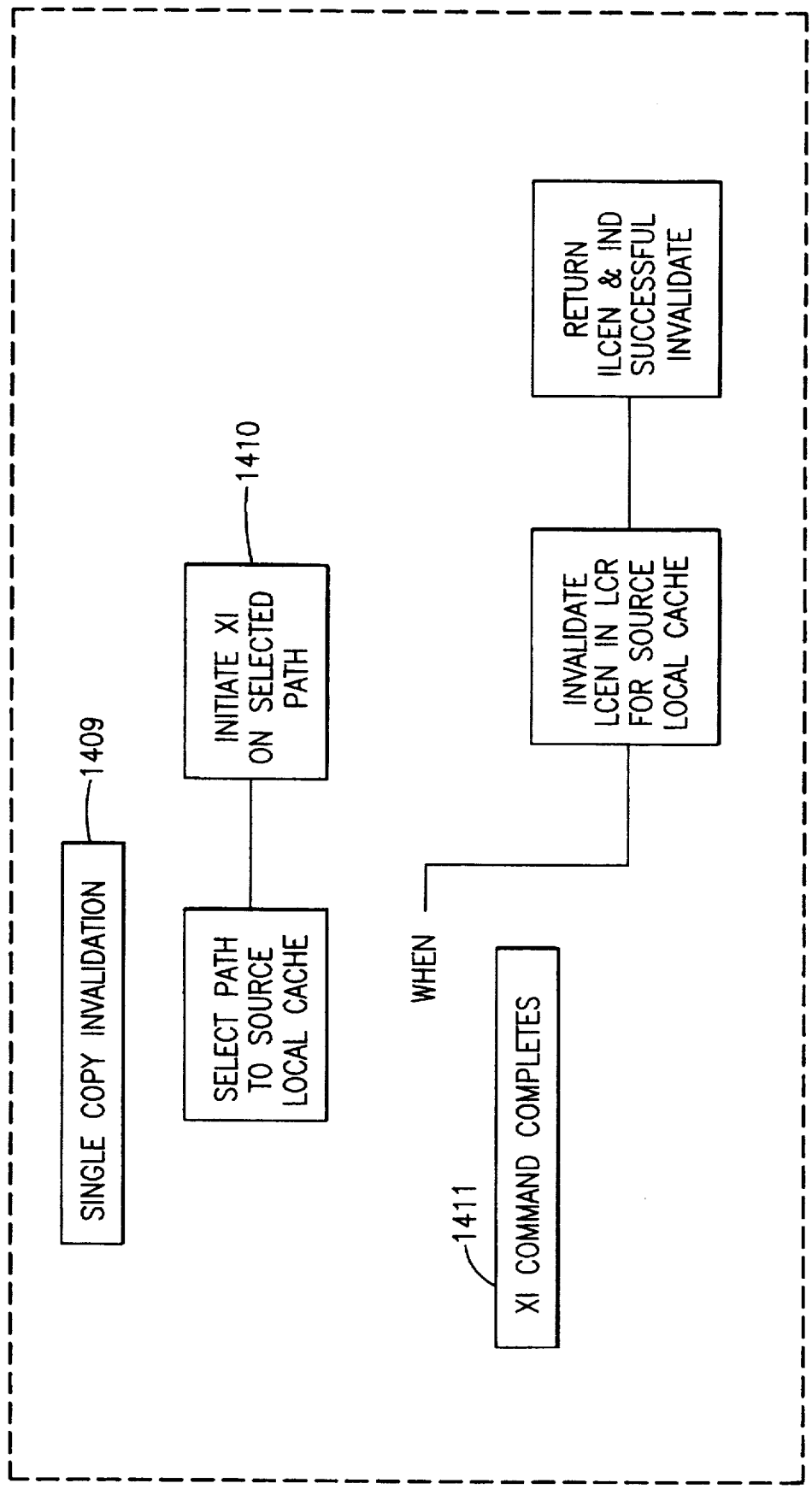

Three separate processes invalidate local-cache entries for a specified name as shown in FIGS. 14A and 14B. Local-copy invalidation invalidates all local copies of the specified named data block (1401) Complement-copy invalidation invalidates all the local copies of the specified named data block with the exception of the local cache identified by the LCID request operand (1402). Single-copy invalidation invalidates one local copy for a specified local cache (1409).

The first two processes invalidate a list of local-cache entries, with at most one entry invalidated in a particular local cache. The last process invalidates a list containing only one local-cache entry. Each local-cache entry on the list is invalidated by invalidating the local-cache-entry number in the local-cache register and generating a cross-invalidate command (1403, 1404, and 1410) for the system containing the local cache. When all the local-cache-entry numbers have been invalidated and when all the generated cross-invalidate commands are completed (1405, 1406, and 1411), the process is completed. The local-copy-invalidation process, the complement-copy-invalidation process, and the single copy invalidation process must be completed prior to command completion.

Processing of a generated cross-invalidate command consists of message-path selection (1407 and 1408) and cross-invalidate-command processing (1403 and 1404). One or more cross-invalidate commands are initiated for each local copy of the specified named data block to be invalidated. A message path is selected from the path group designated by the system-identifier value in the local-cache controls. When the primary command completes, the generated cross-invalidate commands are completed.

When a cross-invalidate command cannot be successfully delivered to a system; that is, the message times out, the SES facility must attempt to deliver the command over each of the remaining active message paths in the path group until either a response block is received or all paths in the path group have been made marked in error in the CPC and inactive in SES.

Broadcasting the same cross-invalidate command on multiple paths in the path group will allow for faster completion of the local-cache-entry process when link errors are present. However, the broadcast protocol should be limited to situations where a link has been marked in error after an unsuccessful attempt to send a single cross-invalidate command for the local-cache entry. Broadcasting in non-error situations could add significant load to the link and should be avoided.

When the path group is empty at the time of path selection, or when all paths in the path group are inactive, the generated cross-invalidate command completes without initiating a link operation.

The local-cache token is assigned by the CPC as a result of the DEFINE VECTOR instruction. The user provides the local-cache token on the attach-local-cache command. The SES facility returns the local-cache token on each cross-invalidate command. The CPC uses the local-cache token to determine the location of the local-cache vector in processor storage.

The direct command that generates cross-invalidate commands may be allowed to time out because all the cross-invalidate commands are not complete within the message-facility timeout period. It is therefore not necessary to broadcast the same cross-invalidate command on multiple paths in the path group when link errors are present.

When the operating system detects the interface-control check, it will re-drive the direct command after re-validating the path. When the message-processor timeout procedure is invoked, the cross-invalidate command is completed or the path is marked inactive after a model-dependent number of retries. So, the re-driven command should make progress, since inactive paths are removed from the path group.

Local-Cache-Entry Registration

Figure 28:
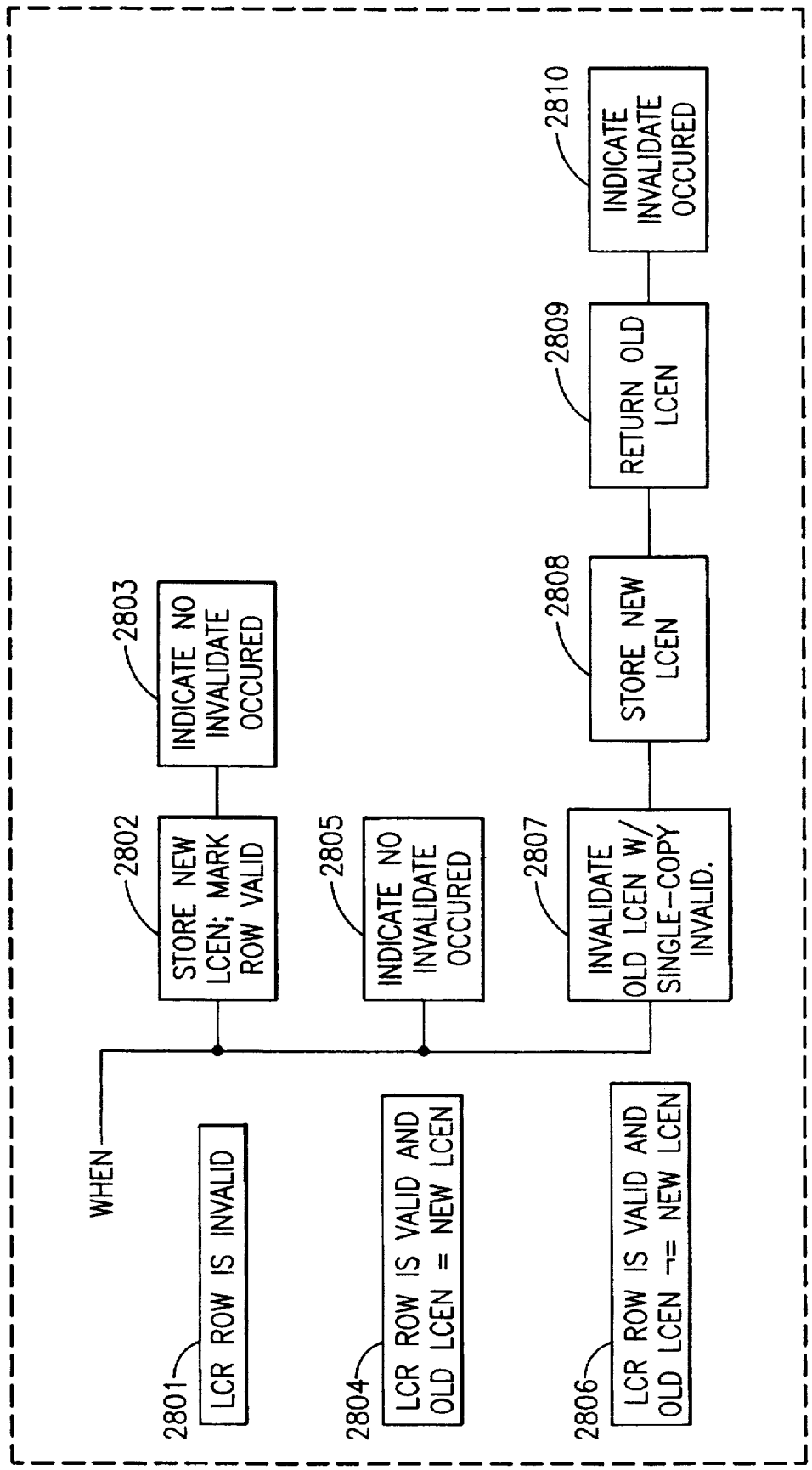
FIG. 28 provides a flow diagram that represents a local cache entry registration.

A local-cache entry is registered by providing the specification of the entry and providing a name as shown in FIG. 28. A local-cache entry is specified by a local-cache-entry number and a local-cache identifier. The local-cache entry is added to the local-cache register for the name by updating the local-cache-entry-number field in the row corresponding to the local-cache identifier.

When the local-cache-register row is in the invalid state (2801), the specified LCEN is stored in the local-cache-entry-number field and the row is marked valid (2802). The ILCEN-validity-indicator response operand is set to zero (2803).

When the local-cache-register row is in the valid state, the specified LCEN is compared with the value of the local-cache-entry field. When the compare is equal (2804), no change is made to the local-cache register and the ILCEN-validity-indicator response operand is set to zero (2805). When the compare is not equal the following occurs (2806):

The registered local-cache-entry number is invalidated by the single-copy invalidation process ( 2807 ).

The specified local-cache-entry number is stored in the local-cache-entry field and the row is marked valid (2808).

The value of the invalidated local-cache-entry number is placed in the ILCEN response operand (2809) and the ILCEN validity indicator is set to one.

The local-cache-registration process is completed with an LCEN-replacement performed condition (2810).

Name Assignment

A name assignment is processed for the specified name by obtaining an invalid directory entry, marking it valid, initializing the name and attaching the directory entry to the directory.

When no invalid directory entries are available, a valid directory entry may be reclaimed by the SES, cleared of its current contents, and attached to the directory. The oldest unchanged directory entry is reclaimed. The directory entry reclaim may result in cross-invalidate signals.

Name Comparison

The name comparison is a byte-level comparison and is controlled by the mask field. The 16 bits, left to right, in the mask field correspond one for one with the 16 bytes, left to right, of the name field. The comparison proceeds left to right, byte by byte. When the corresponding bit in the mask is one, the bytes are compared; otherwise, the comparison is not made and the operation continues with the next byte.

Reference-Signal Processing

A reference signal is processed for a specified name and storage class. The storage class is stored in the directory entry and the directory entry is added to the bottom of the storage-class queue. This may be the initial placement in a storage class, may represent a change of storage-class specification, or may be a reference to the data within the storage class.

Writing the Data Changed

A change control value of one indicates that the data is written in a changed state from the local cache specified by the LCID value to the SES-cache. The change of the data area is synchronized with the remaining local caches by invalidating the complement copies. The remainder of the operation includes storing the data area as changed and processing a change signal.

The data is stored into the assigned ordered collection of data-area elements. If the write process is to an existing data area and if the data-area-size operand is smaller than the data-area-size object, the data block is written into the lowest ordered data-area elements, the remaining data-area elements are placed on the free list of data-area elements, and the data-area-size object in the directory entry is updated with the value of the data-area-size operand.

If the write process is to an existing data area and if the data-area-size operand is larger than the data-area-size object, additional data-area elements are assigned to the directory entry, the data block is stored in the data area, and the data-area-size object in the directory entry is updated with the value of the data-area-size operand.

Writing the Data Unchanged

A change control value of zero indicates that the data is written unchanged to the SES-cache. This includes storing the data area as unchanged. The data is stored into the assigned ordered collection of data-area elements. If the write process is to an existing data area and if the data-area-size operand is smaller than the data-area-size object, the data is written into the lowest ordered data-area elements, the remaining data-area elements are placed on the free list of data-area elements, and the data-area-size object in the directory entry is updated with the value of the data-area-size operand. If the write process is to an existing data area and if the data-area-size operand is larger than the data-area-size object, additional data-area elements are assigned to the directory entry, the data block is stored in the data area, and the data-area-size object in the directory entry is updated with the value of the data-area-size operand.

Figure 7:
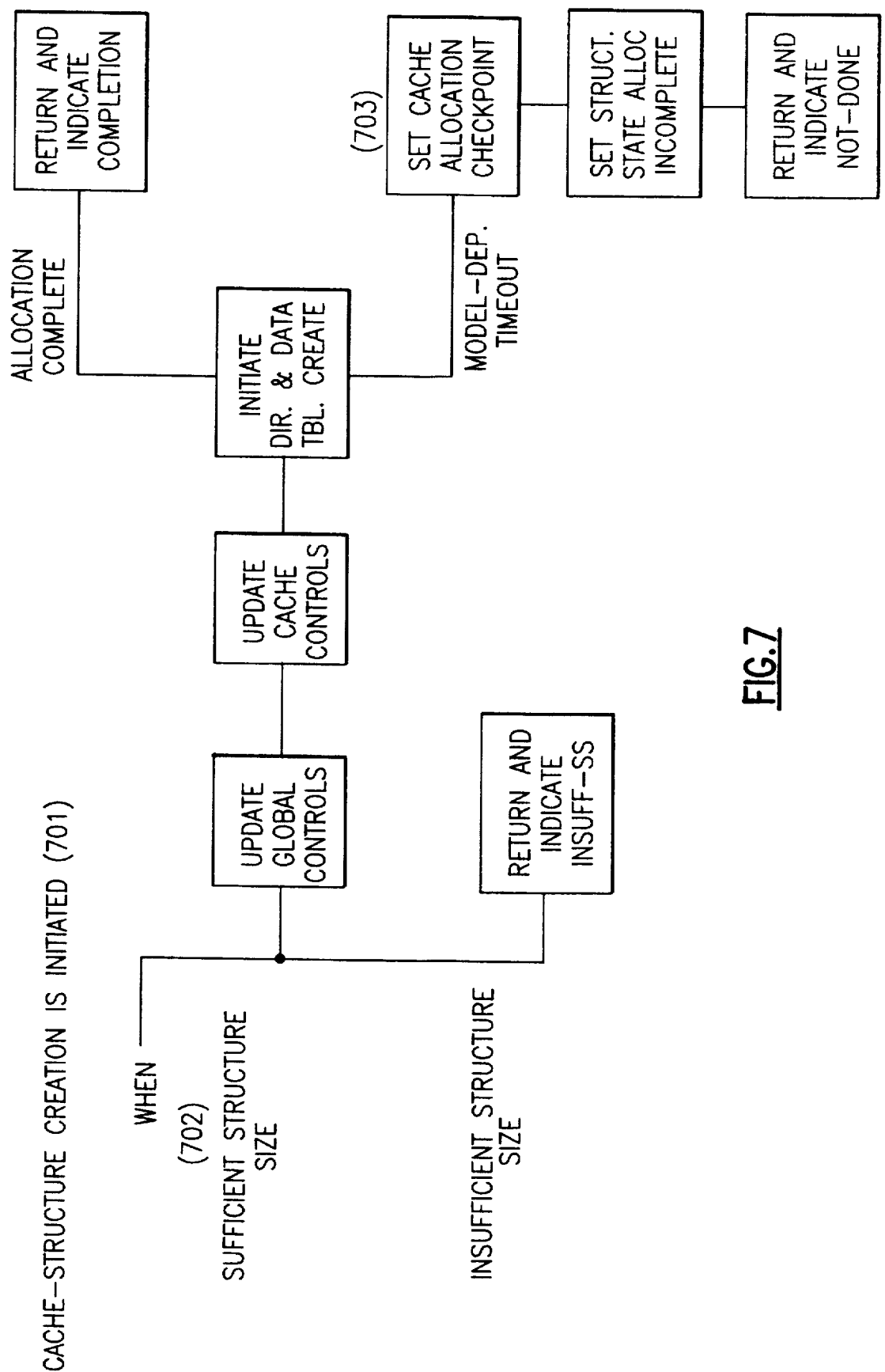
FIG. 7 and FIG. 8 provide a flow diagram that represents an allocate cache structure command.
Figure 8:
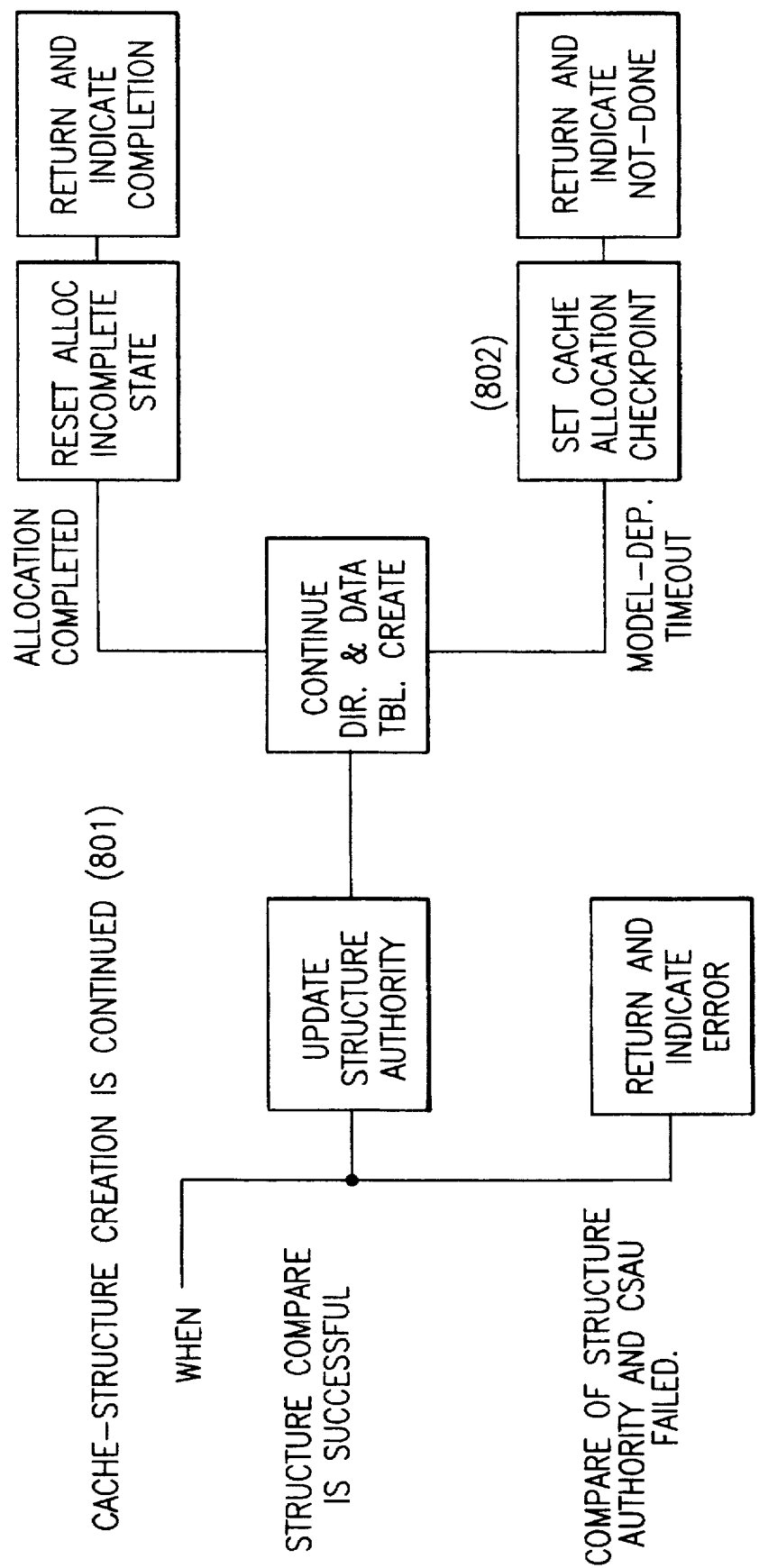

Cache-Structure Commands The following commands are described in reference to actions taken at the SES and against SES objects as shown in the process flow diagrams for:

Allocate Cache Structure—FIGS. 7 and 8

Figure 9:
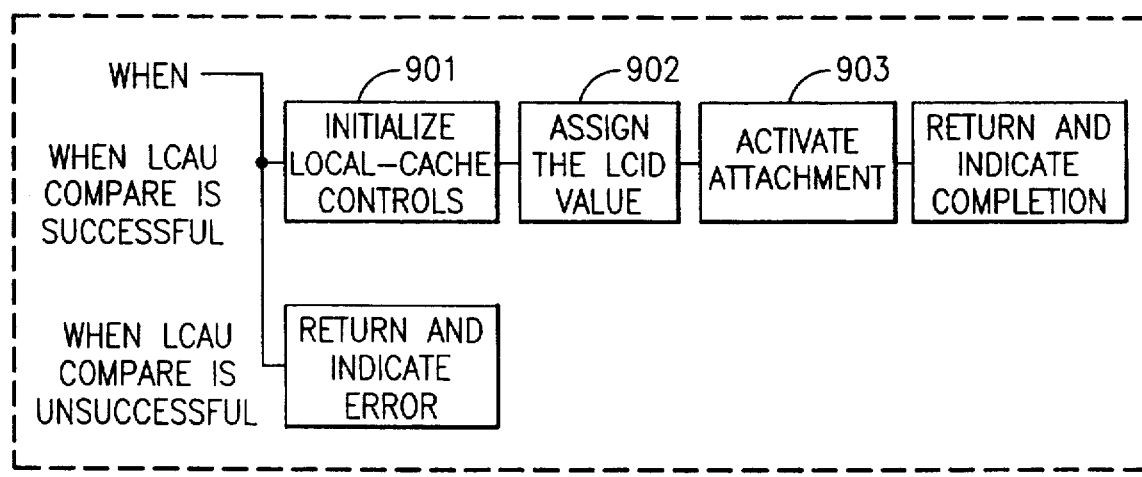
FIG. 9 provides a flow diagram that represents an attach local cache command.
Figure 6:
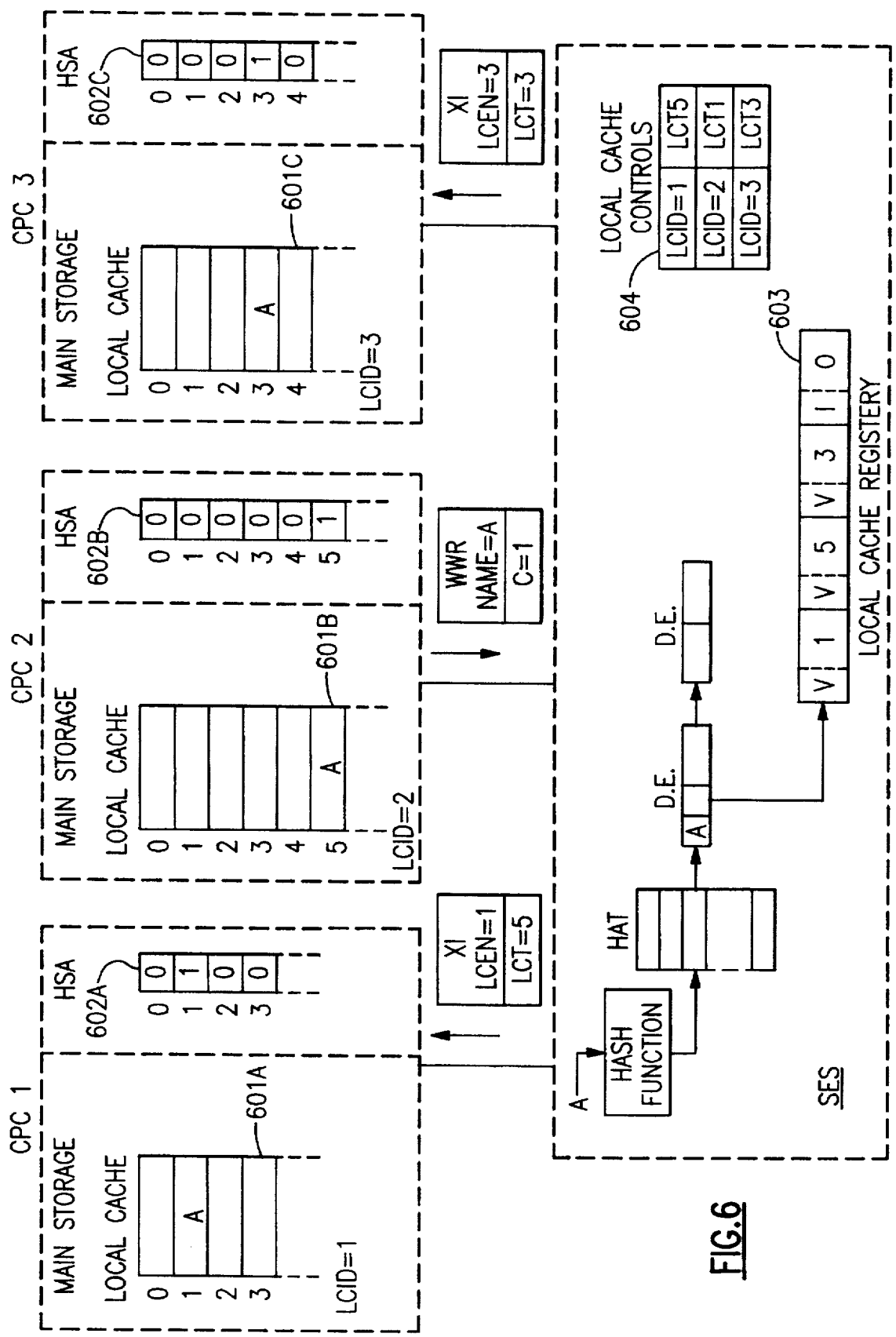
FIG. 6 is a flow diagram generally representing a SES invalidation command to one or more CPCs in a sysplex.

Attach Local Cache—FIG. 9

Figure 10:
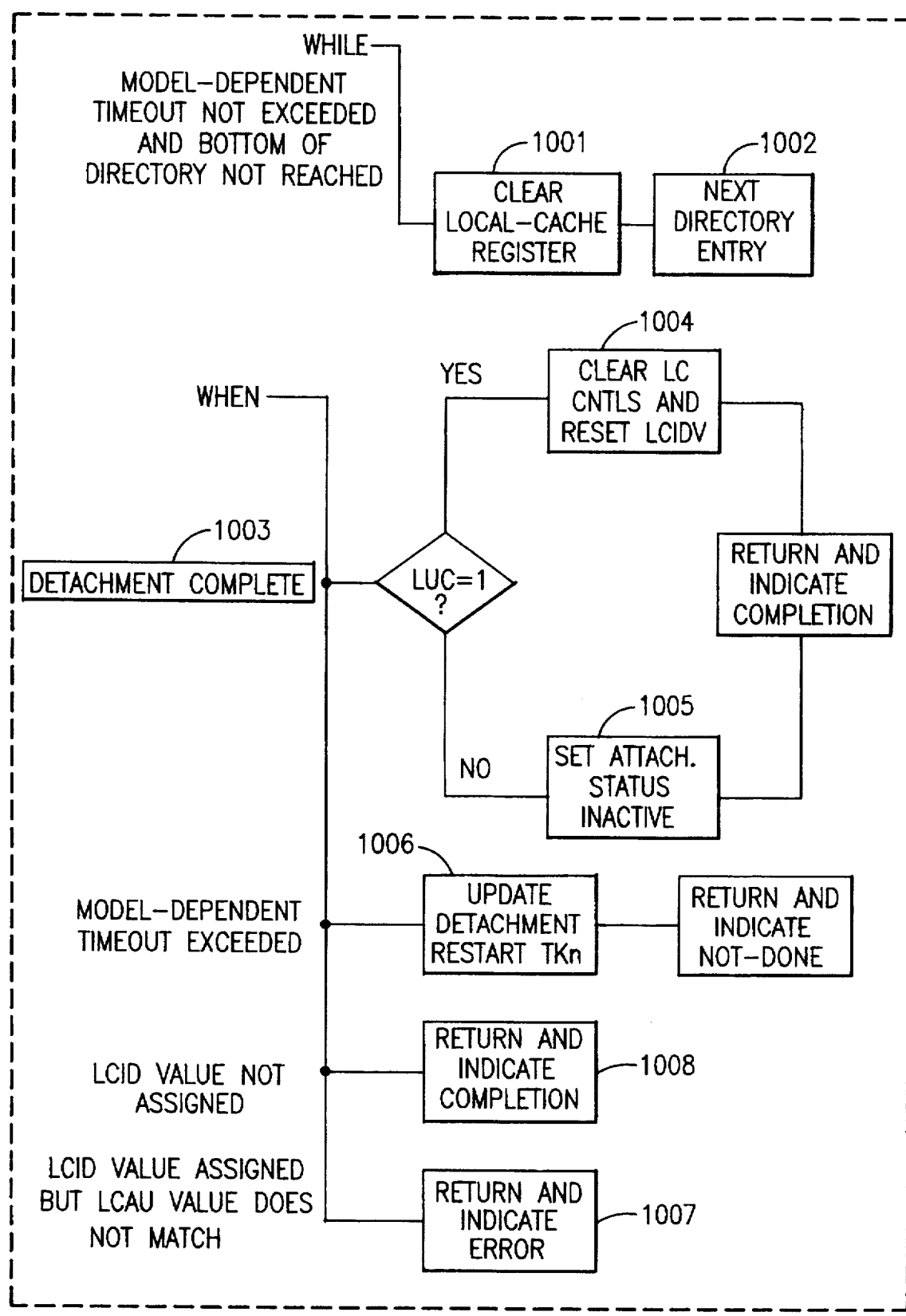
FIG. 10 provides a flow diagram that represents a detach local cache command.

Detach Local Cache—FIG. 10

Figure 11:
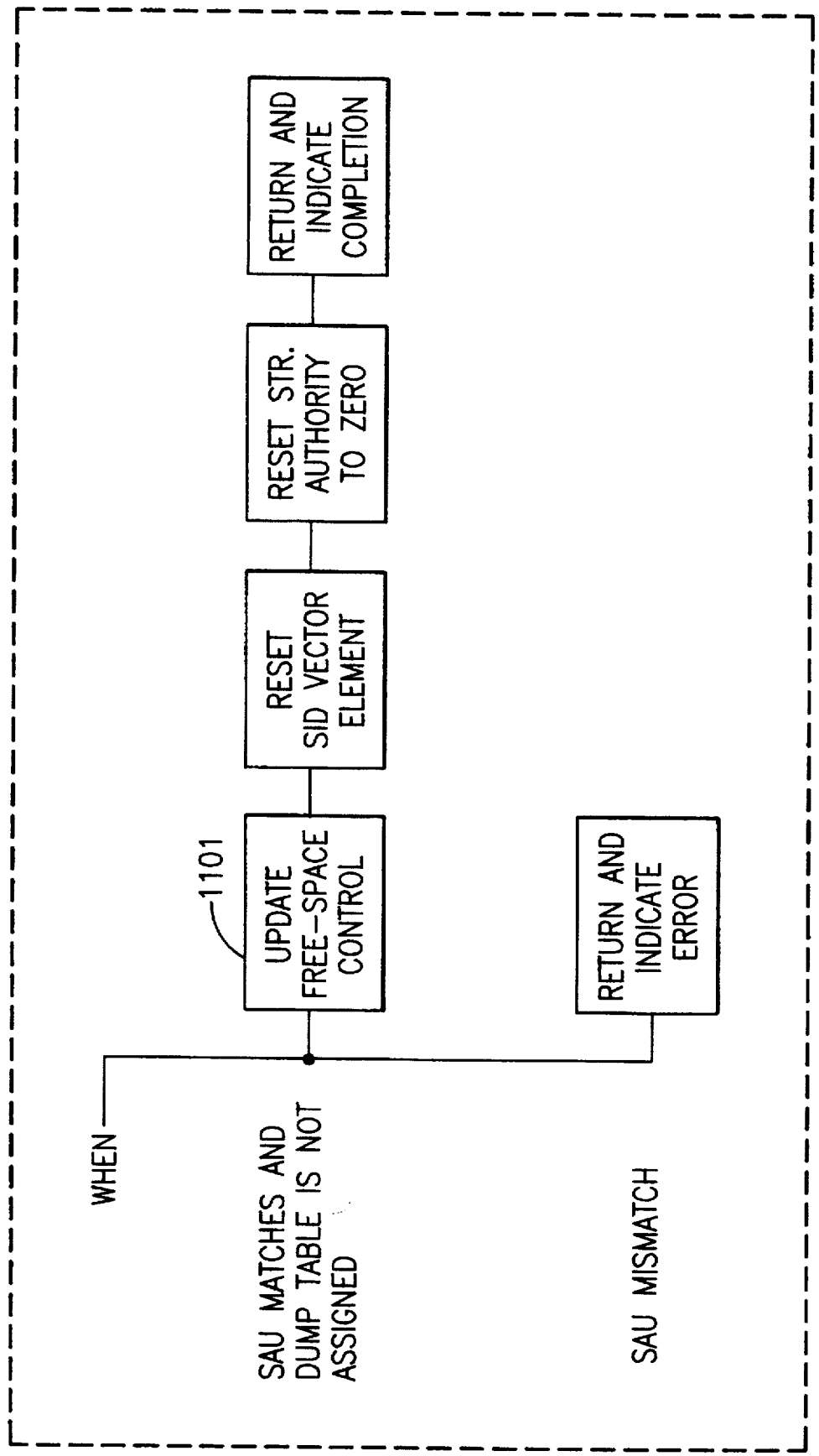
FIG. 11 provides a flow diagram that represents a deallocate cache structure command.

Deallocate Cache Structure—FIG. 11

Figure 12:
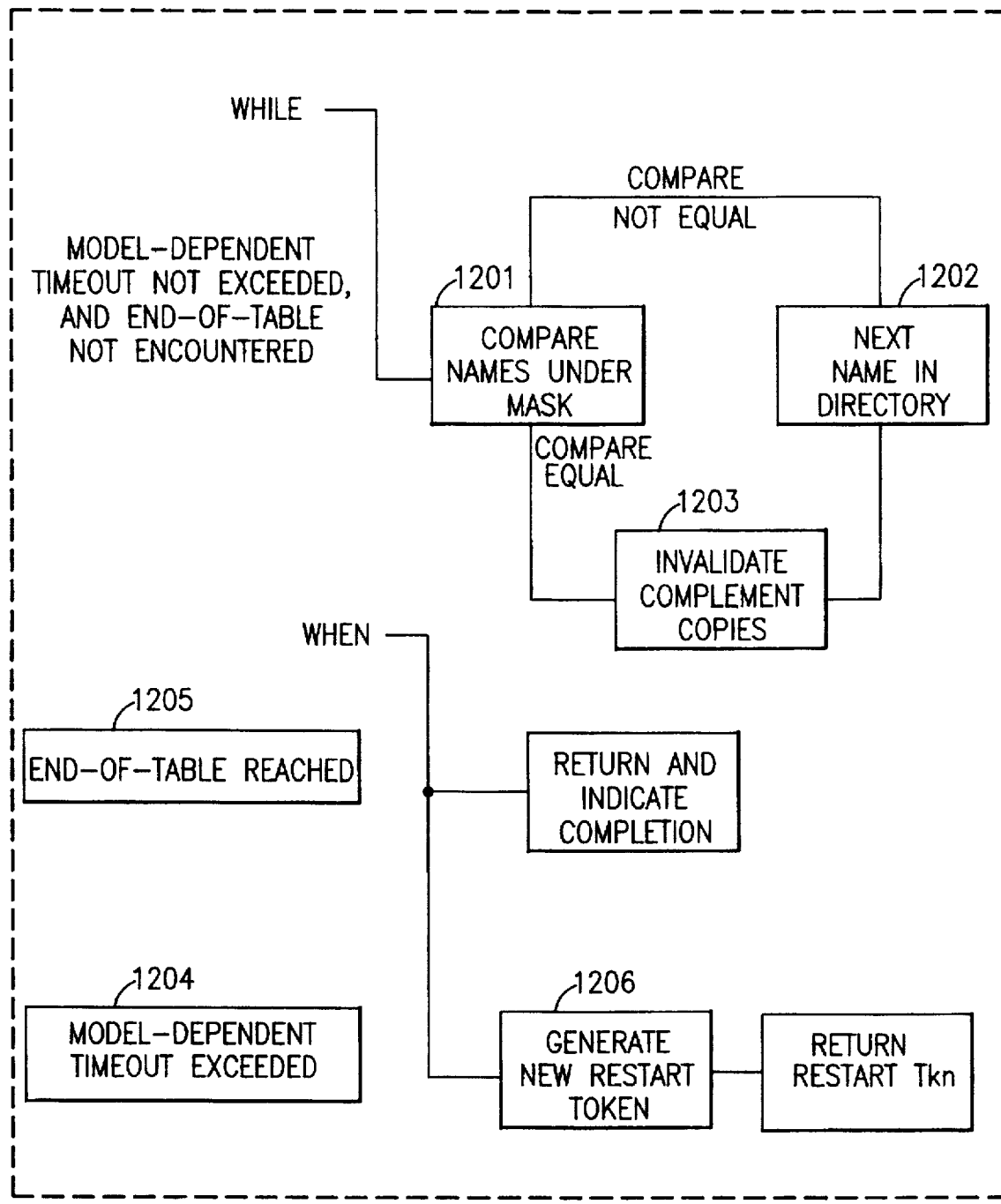
FIG. 12 provides a flow diagram that represents an invalidate complement copies command.

Invalidate Complement Copies—FIG. 12

Figure 13:
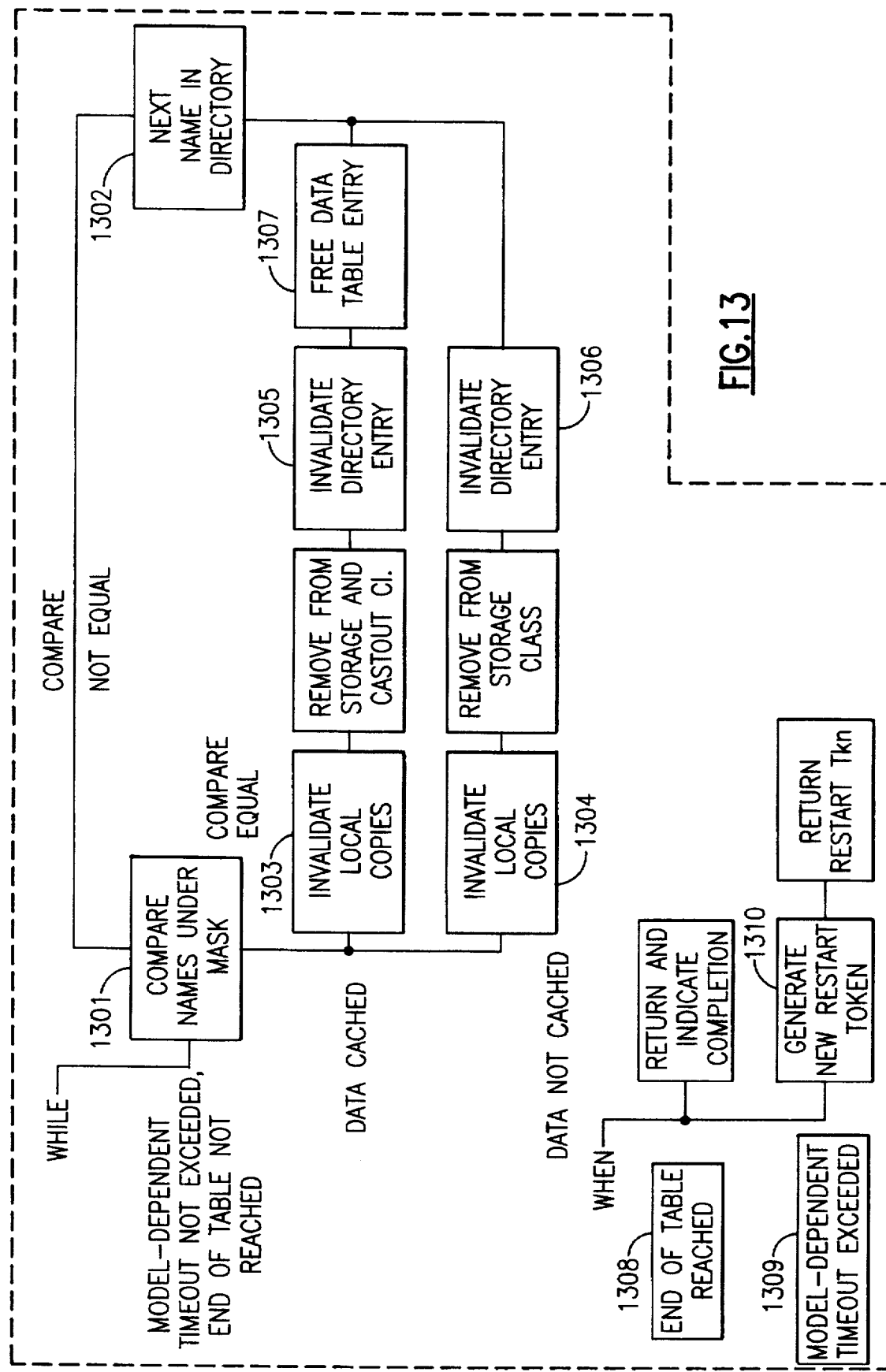
FIG. 13 provides a flow diagram that represents an invalidate name command.

Invalidate Name—FIG. 13

Figure 15:
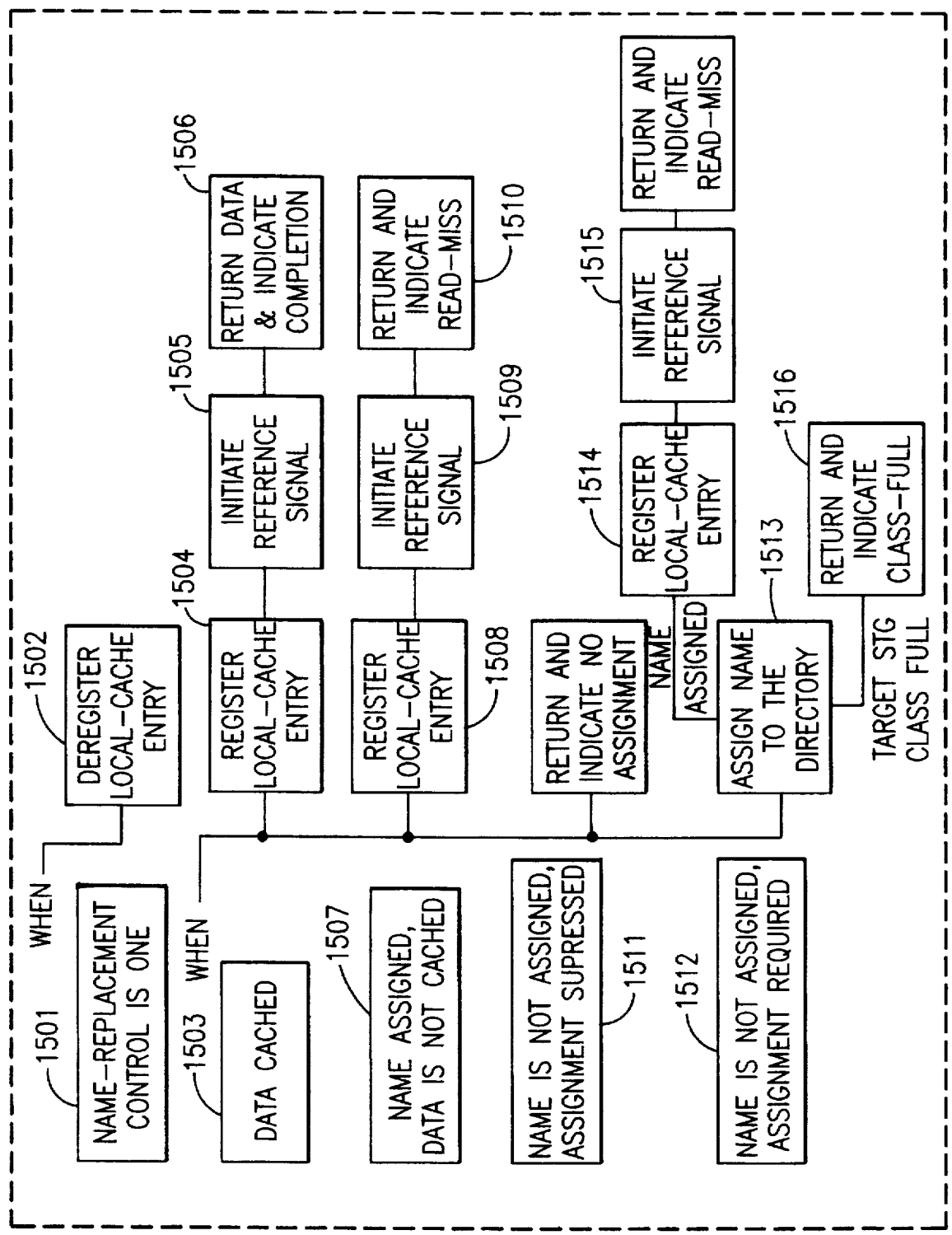
FIG. 15 provides flow diagrams that represent a read and register command.

Read and Register—FIG. 15

Figure 16:
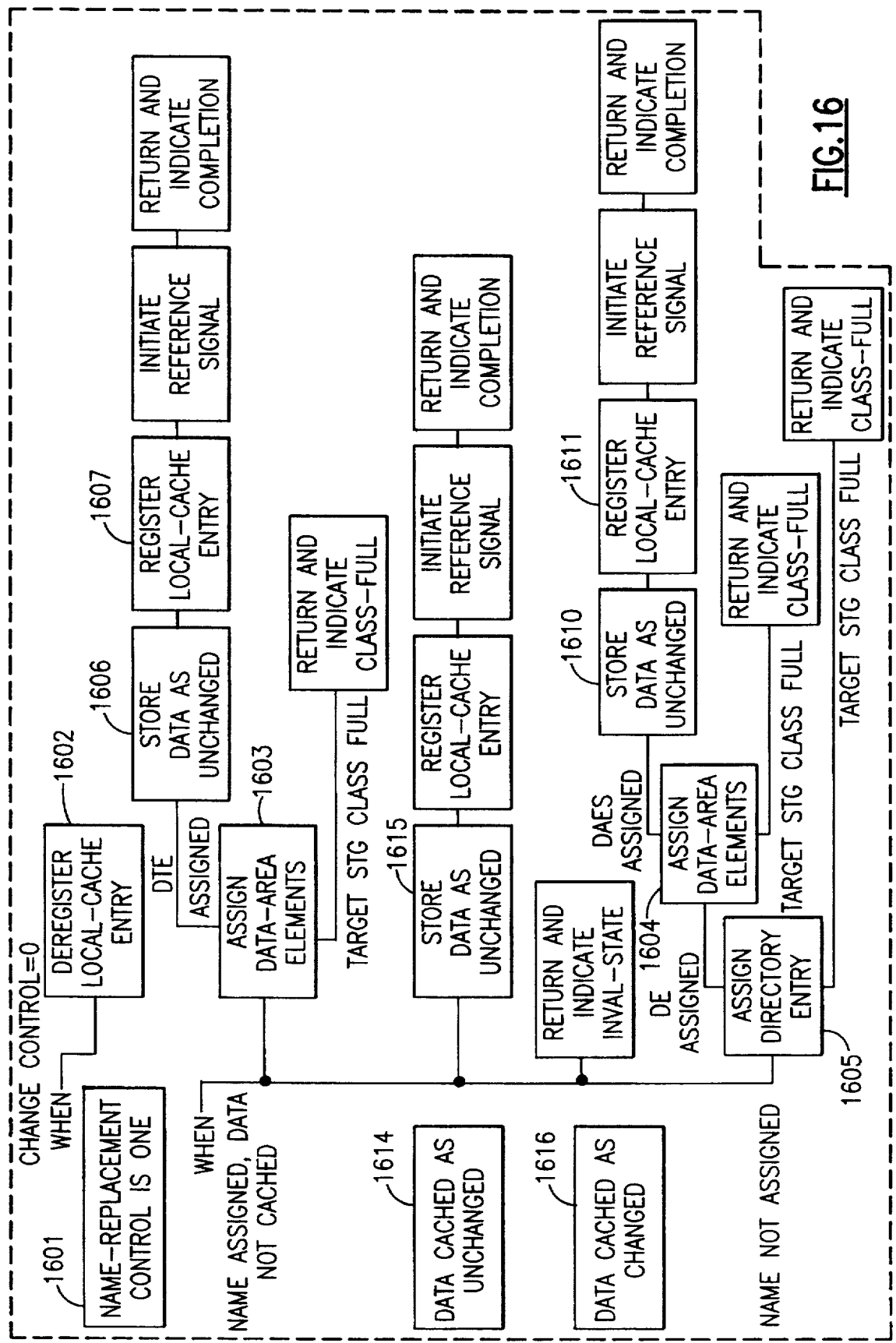
FIG. 16 provides flow diagrams that represent a write and register command when the SES change control indicates an unchanged record state.
Figure 17:
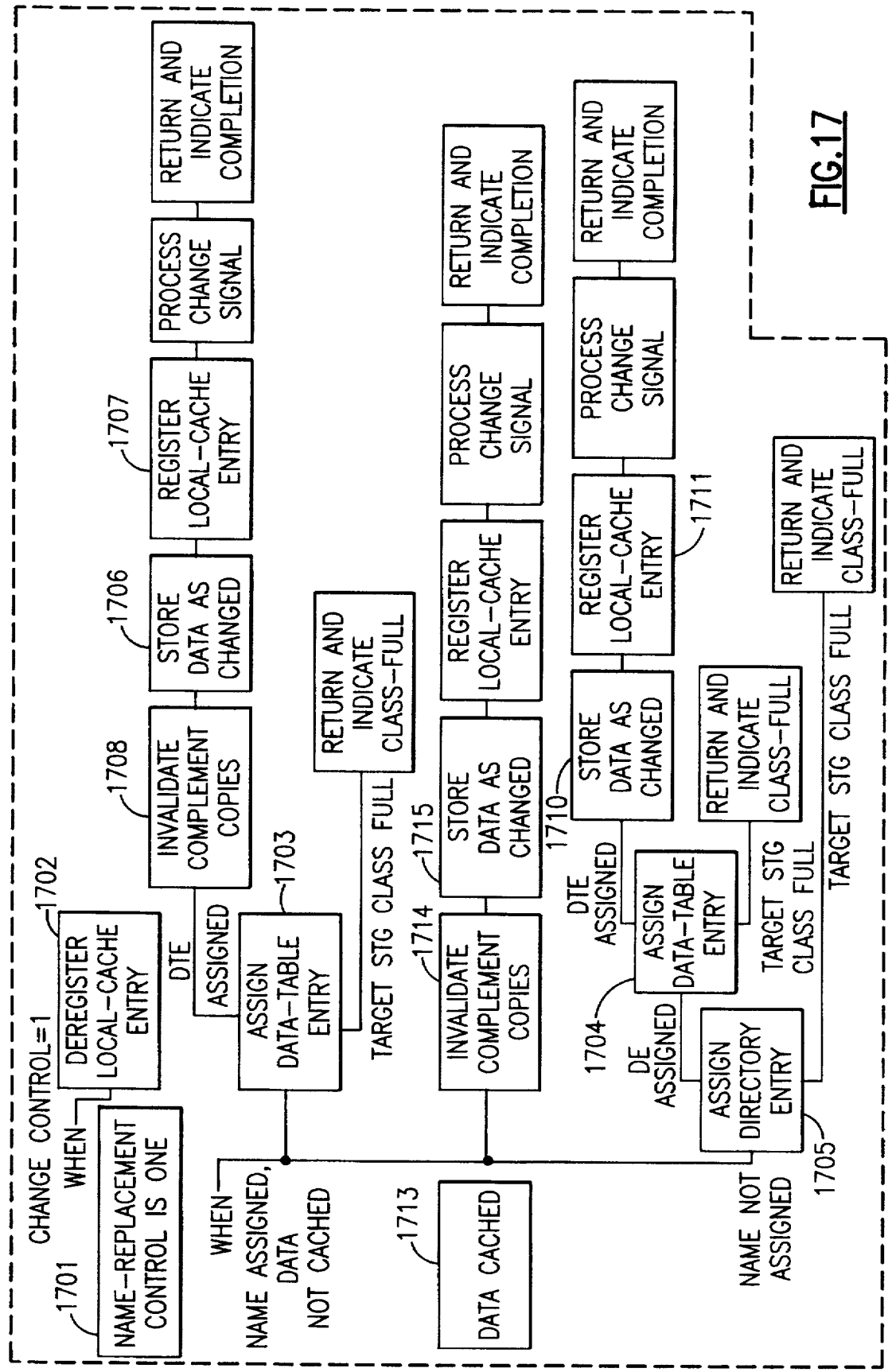
FIG. 17 provides flow diagrams that represent a write and register command when the SES change control indicates a changed record state.

Write and Register—FIGS. 16 and 17

Figure 18:
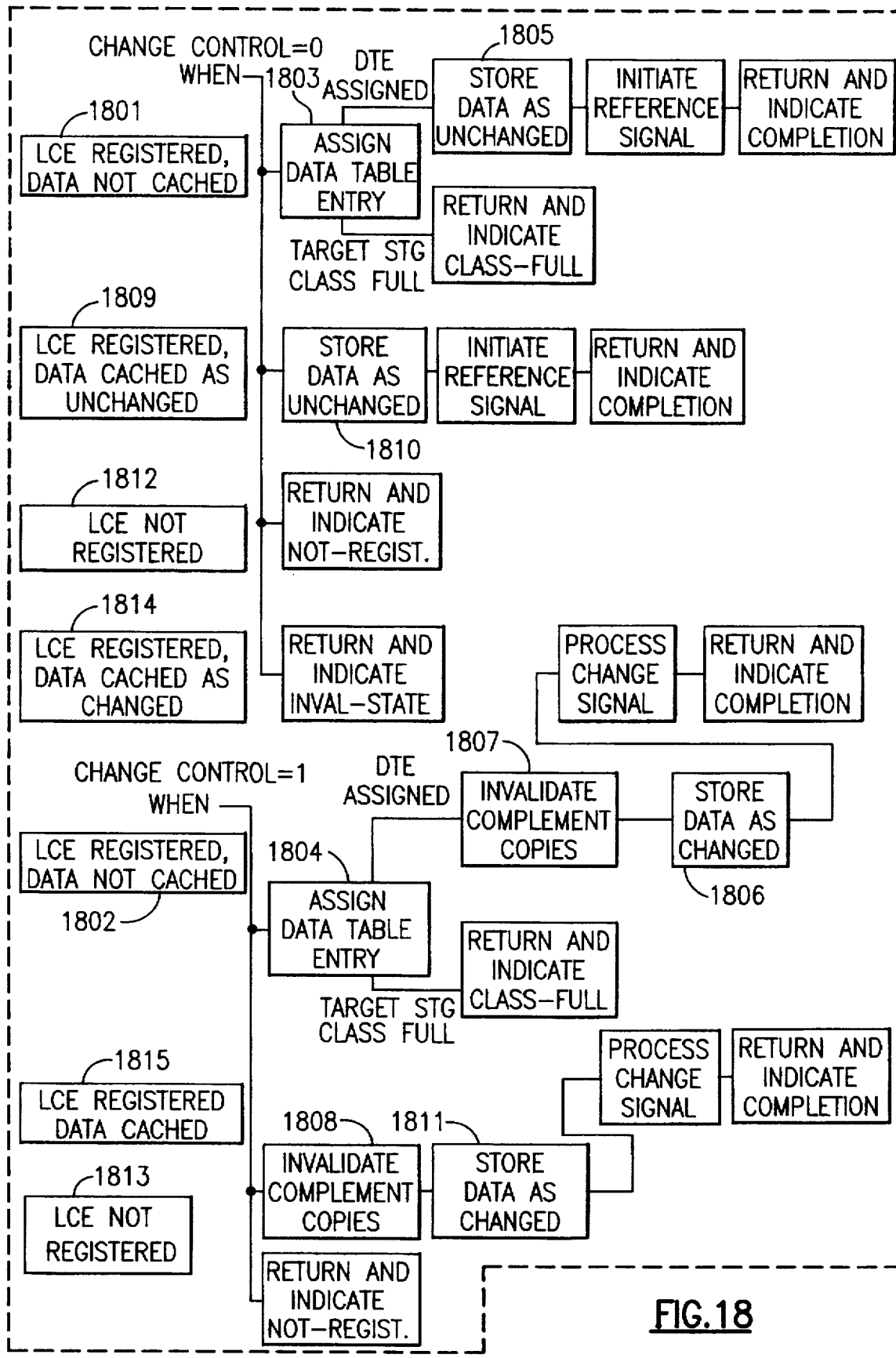
FIG. 18 provides flow diagrams that represent a write when register command.

Write When Registered—FIG. 18

Allocate Cache Structure FIGS. 7 and 8 are process flow diagrams of the Allocate Cache Structure command. The allocate-cache-structure command creates the storage resources for a cache structure.

The allocate-cache-structure command updates the user structure control with the value of the user-structure-control request operand when a cache structure is created (701), or the allocate-cache-structure command creates a cache structure (704) when:

(1) the specified created bit of the structure-identifier vector is zero, and (2) the structure size is sufficient for creating at least one directory entry and associated controls. (702)

The allocate-cache-structure command continues the initial allocation of a cache structure (801) when:

(1) the specified created bit of the structure-identifier vector is one, and (2) initial allocation of the structure has not completed.

The cache-structure processes are checkpointed and completed at the established checkpoint (703) (802) when initial allocation of the structure has completed.

When all the requested cache-structure processes are complete, the processes are checkpointed and the total-directory-entry count, total-data-area-element count, structure size, free space global control, and a completion response code are returned to the program. (709)

When a model-dependent time period has elapsed before the allocation processes are completed, the processes are checkpointed and the total-directory-entry count, total-data-area-element count, structure size, free control space global control and an exception response code are returned to the program. (711)

When the structure size specified is insufficient to allow for the creation of at least one directory entry and the associated controls, the minimum structure size required to support the request is placed in the structure-size response operand. The structure-size response operand and an exception response code are returned to the program. (713)

Attach Local Cache

FIG. 9 is a process flow diagram for the Attach Local Cache command. The attach-local-cache command identifies a local cache to an existing SES cache, initializes the local-cache controls, and assigns the specified local-cache identifier.

Attaching a local cache to a cache structure includes placing the attachment status in the active state (903), setting the local-cache controls (901), assigning the specified local-cache identifier (902) when it is not already assigned, and creating a row in the local-cache register for each directory entry. The local-cache controls include the local-cache token, the detachment-restart token, the attachment information, the attachment status, and the system identifier. The value of the system identifier is obtained from the message-path status vector for the message path used to communicate the ALC command.

Detach Local Cache

FIG. 10 is a process flow diagram for the Detach Local Cache command. The detach-local-cache command removes the identification of a local cache to a SES cache and frees the specified local-cache identifier.

The directory is searched (1002) starting with the directory entry specified by the detachment restart token in the local-cache controls. When the detachment restart token is zero, detach processing is initiated. When the detachment restart token is not zero, detach processing is resumed at the directory entry specified in the token.

For each directory entry the local-cache register is updated by clearing the row assigned to the local cache specified by the LCID request operand (1001).

When the model-dependent timeout value is exceeded, the detachment restart token is updated in the local-cache controls ( 1006 ).

When the local-cache identifier is not assigned, the command is completed with an indicative return code (1006).

Detaching a local cache may require multiple executions of the detach-local-cache command. The directory may change during the detachment process. The set of directory entries that must be processed before the detachment is complete consist of the valid directory entries that exist at the initiation of detach processing and remain valid. Directory entries that are added or deleted after the detachment is initiated do not need to be processed. A directory entry need only be processed once. Any directory entries updated after they are processed do not need to be processed a second time.

Deallocate Cache Structure

FIG. 11 is a process flow diagram of the Deallocate Cache Structure command. The deallocate-cache-structure command deletes the specified cache structure. This includes freeing the storage, updating the free-space (1101), and the free-control-space global controls.

Invalidate Complement Copies

FIG. 12 is a process flow diagram for the Invalidate Complement Copies command. The invalidate-complement-copies command invalidates the local-cache copies of each named data block whose name matches the input name under the mask condition, except for the specified local cache.

The name comparison is successful when all the unmasked bytes are equal (1201). A zero mask will cause all names to be processed. A mask of all ones identifies a single name.

The directory is scanned (1202). The complement copies of each named data block whose name matches the input name under the mask condition are invalidated (1203).

The directory scan is controlled by the restart-token request operand. A token value of zero starts the processing, and a nonzero token value restarts the processing from the place designated by the token. Processing is completed when the entire directory has been processed or when a model-dependent timeout has been exceeded (1204). When the end of the directory is reached (1205), the command is complete. When a model-dependent timeout occurs (1204) before the end of the table is reached, a restart token is generated (1206) and returned along with an indicative return code.

When a mask of all ones is specified a single name is being invalidated. Thus, a search of the directory is not warranted. Command execution time is reduced if a mask of all ones causes the name to be hashed.

Invalidate Name

FIG. 13 is a process flow diagram of the Invalidate Name command. The invalidate-name command detaches all names which match the input name under the mask condition from the SES-cache directory.

The name comparison is successful when all the unmasked bytes are equal (1301). A zero mask causes all names to be invalidated. A mask of all ones identifies a single name to be invalidated.

The directory is scanned (1302). Each name assigned to the directory that matches the input name under the mask condition is invalidated (1303 and 1304). The name is detached from the directory and marked as invalid (1305 and 1306). When the data is cached, the data-table entry is detached from the directory, the contents are cleared, and the entry is made available for reuse (1307).

The directory scan is controlled by the restart-token request operand. A token value of zero starts the processing, and a nonzero token value restarts the processing from the place designated by the token. Processing is completed when the entire directory has been processed or when a model-dependent timeout has been exceeded. When the end of the directory is reached, the command is complete (1308). When a model-dependent timeout occurs before the end of the table is reached (1309), a restart token is generated (1310).

Read and Register

FIG. 15 is a process flow diagram of the Read and Register command. The read-and-register command returns the contents of a named data area to the local cache and registers the local-cache entry. When the data is not cached, only the registration operation is performed. The read-and-register command also assigns the name to the directory when the name is not currently assigned.

When the name-replacement-control request operand (NRC) is one (1501), the local-cache entry designated by the replacement-name and local-cache-identifier request operands is deregistered (1502). When the name-replacement control is zero, no deregistration is performed.

When the data is cached (1503), the local-cache entry is registered (1504), a reference signal is initiated for the storage class (1505), and the data along with the change bit is returned (1506).

When the name is assigned to the directory but the data is not cached (1507), the local-cache entry is registered (1508) and a reference signal is initiated for the storage class (1509).

When the name is not assigned to the directory and directory assignment is not suppressed (1512), a directoryentry-assignment operation is performed (1513). If the cache is not full, a directory entry is assigned, the local-cache entry is registered (1514), and a reference signal is initiated for the storage class (1515).

When the name is not listed in the directory and assignment is suppressed (1511), the command is completed and an exception response code is returned.

The setting of the local valid bit in the processor local storage must be serialized with the execution of the command. The following scenario must be avoided:

1. The read-and-register command is sent to the SES controller, and the directory is updated for the requestor under SES serialization.
2. A response is sent, and serialization is released.
3. A write-when-registered command is processed for the name.
4. A cross-invalidate signal is generated for the local system.
5. The cross-invalidate signal arrives first and invalidates the local valid bit.
6. The read-and-register response arrives, and the program validates the local valid bit by issuing a CPU instruction.

The data now appears to be valid in the local cache, when in fact it is not. This is an integrity exposure. This is avoided when the following protocol is employed:

1. The program issues a CPU instruction to set the local valid bit.
2. The read-and-register command is sent to the SES controller, and the directory is updated for the requestor under SES serialization.
3. The read-and-register response arrives, and the program interrogates the response code. When the response code indicates successful registration, command processing is complete. Otherwise the CPU instruction is issued to reset the local valid bit.

If the above scenario occurs, the final state of the local valid bit will reset to zero, which reflects the correct state of the bit.

Write and Register

FIGS. 16 and 17 are process flow diagrams of the Write and Register command. The write-and-register command stores the contents of the data block in the data area and registers the local-cache entry when the change control is compatible with the change state of the data.

The write-and-register command also assigns a directory entry whenever the name is not currently assigned to the directory.

When the name-replacement-control request operand (NRC) is one (1601 and 1701), the local-cache entry designated by the replacement-name and local-cache-identifier request operands is deregistered (1602 and 1702). When the name-replacement control is zero, no deregistration is performed.

When the data is not cached, a data-table entry is assigned (1603, 1604, 1703, and 1704). The name may or may not be assigned to the directory. If not, then a name assignment is also made (1605 and 1705). If the assignments are successful, the data is written to the SES cache unchanged when the change control is zero (1606 and 1610) and is written changed when the change control is one (1706 and 1710), and the local-cache entry is registered (1607, 1611, 1707, 1711). If the data was cached and the change control is one, other copies of the data in other local caches is made invalid through the invalidate complement copies process (1714).

When the data is already cached as unchanged (1614), the data is written unchanged if the the change control is zero (1615), and the data is written changed if the change control is one (1715).

When the data is already cached as changed and the change control is zero (1616), the data is not written, and the local-cache entry is not registered. The change control is incompatible with the change state of the data. The command is completed and an exception response code is returned.

When the data is cached as changed and the change control is one (1713), copies of the data in other local caches is invalidated through the invalidate complement copies processing (1714), the data is written changed (1715) and a successful response code is returned.

Write When Registered

FIG. 18 is a process flow diagram of the Write When Registered command. The write-when-registered command stores the contents of the data block in the data area, provided the name is assigned in the directory, the local-cache entry is registered, and the change control is compatible with the change state of the data.

When the local-cache entry is registered and the data is not cached (1801 and 1802), a data-table entry is assigned (1803 and 1804). If the assignment is successful and the change control is zero (1805), the data is written unchanged. If the assignment is successful and the change control is one (1806), the data is written changed and all other local cache copies of the data are made invalid through the invalidate complement copies process (1807).

When the local-cache entry is registered and the data is already cached as unchanged (1809), the data is written unchanged when the change control is zero (1810), and the data is written changed when the change control is one (1811).

When the local-cache entry is not registered (1812 and 1813), the command is completed and an exception response code is returned,.

When the local-cache entry is registered, the data is already cached as changed, and the change control is zero (1814), the data is not written. The change control is incompatible with the change state of the data.

When the local-cache entry is registered, the data is cached as changed, and the change control is one (1815), the data is written changed (1811) and all other local cache copies of the data are made invalid through the invalidate complement copies process (1808).

Shared Data Coherency Usage

Overview

Figure 19:
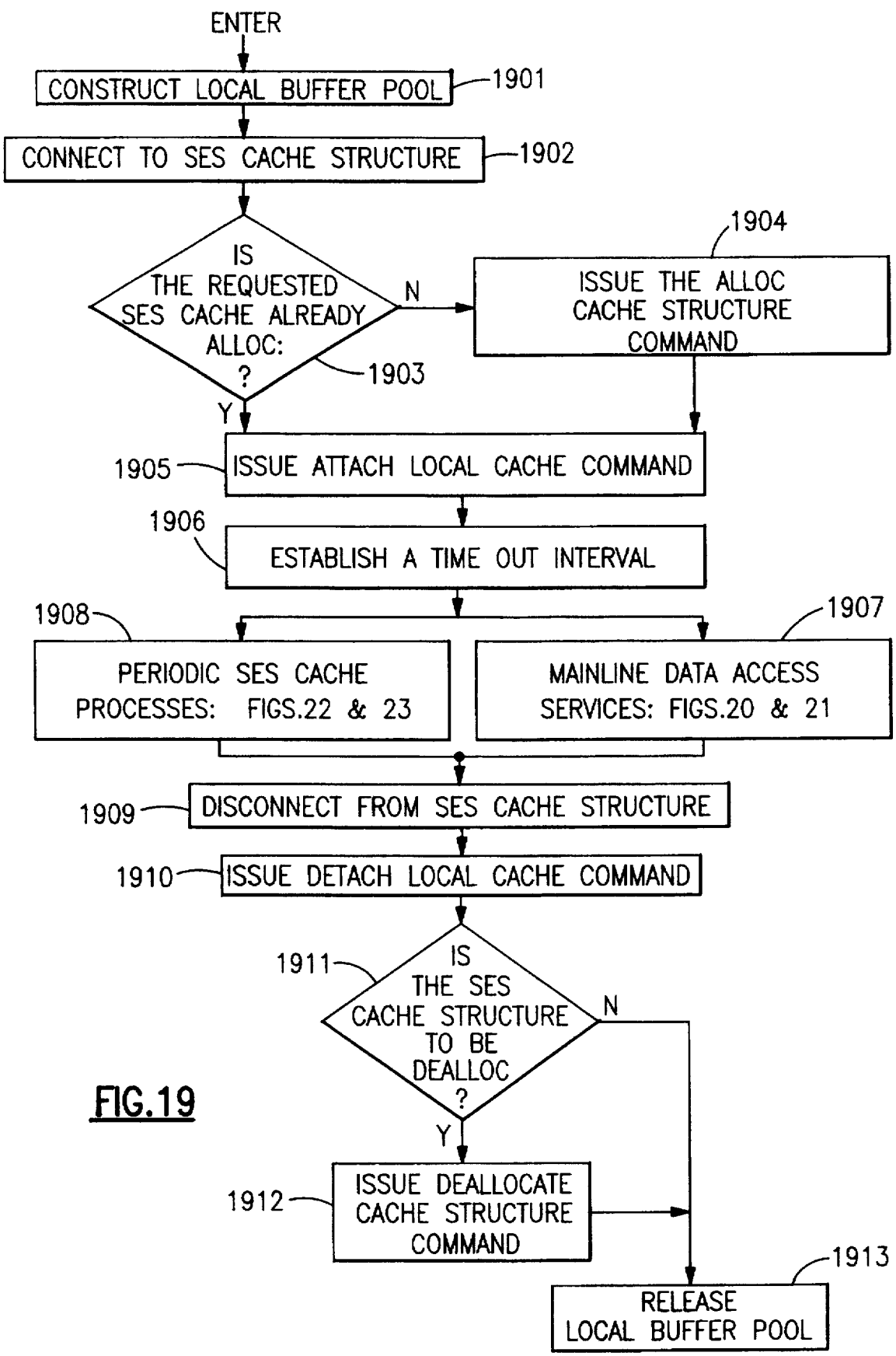
FIG. 19 is an overview of the flow for the buffer manager of a data base manager and associated use of a SES cache.

An overview of the system structure comprised of a SES cache, local data managers utilizing a SES cache, and operating system support is given in FIGS. 19, 20, 21, 2, and 23. In FIG. 19, processing performed by the buffer manager of the data base manager is summarized. When a data base to be shared among systems in a sysplex is initially accessed, a local buffer pool may be constructed (1901), operating system services which provide support for the SES cache structure may be invoked to authorize the buffer manager to access the SES cache structure (1902), and a time out interval may be set using operating system services (1906).

Operating system services which support a SES cache structure are invoked (1902) to authorize the buffer manager to access the SES cache structure. These services first determine if the SES cache structure requested has already been allocated (1903). If the SES structure has not already been allocated, the Allocate Cache Structure command is invoked to cause the SES cache structure to be created (1904). The operating system service selects a local cache identifier (LCID) and causes the cache coherency bit vector to be created by issuing the DEFINE VECTOR CPU instruction. The Attach Local Cache command is issued to associate the local cache with the SES cache (1905).

Figure 20:
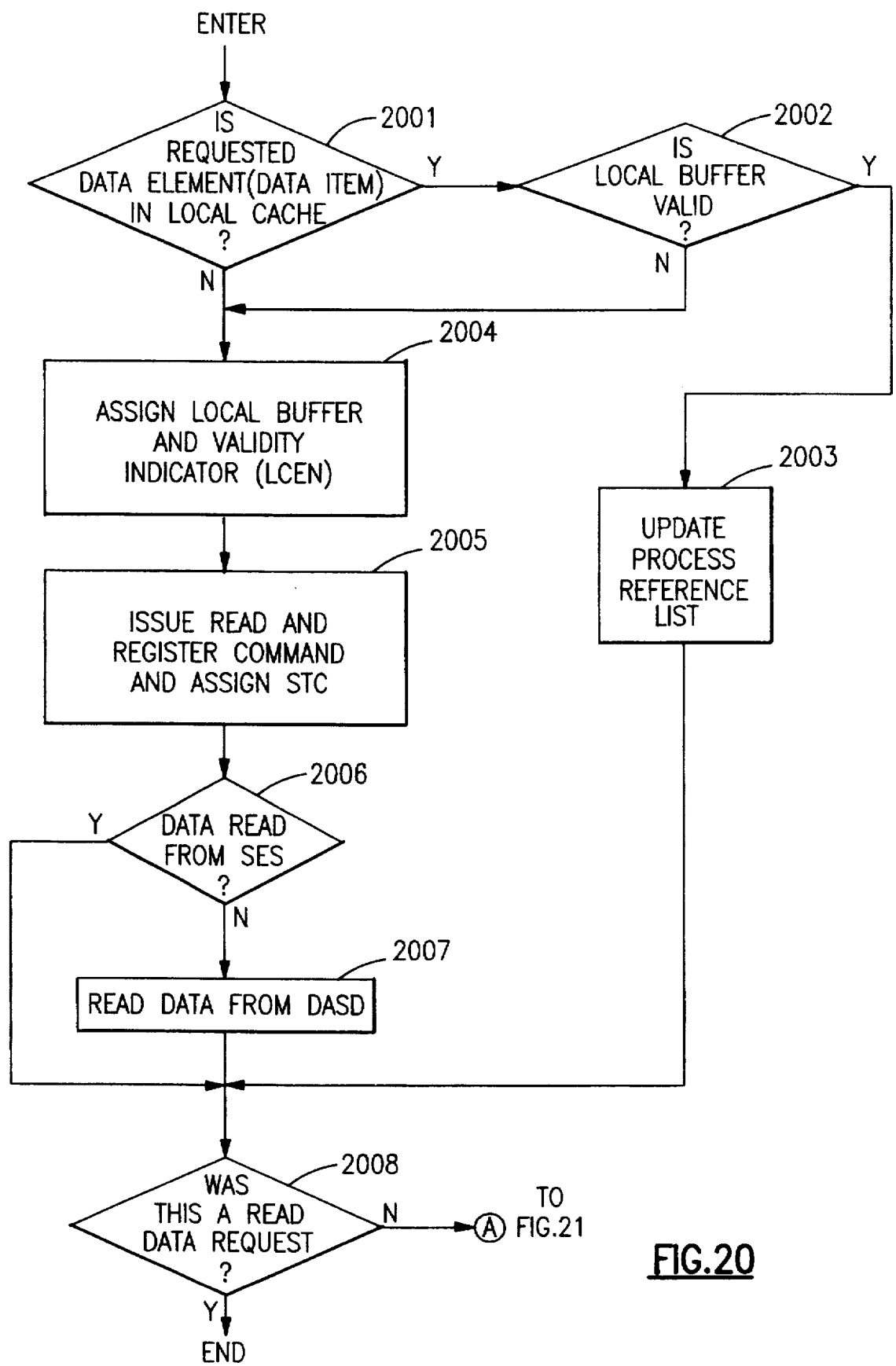
FIG. 20 is a flow diagram of buffer manager processing for a read operation.
Figure 21:
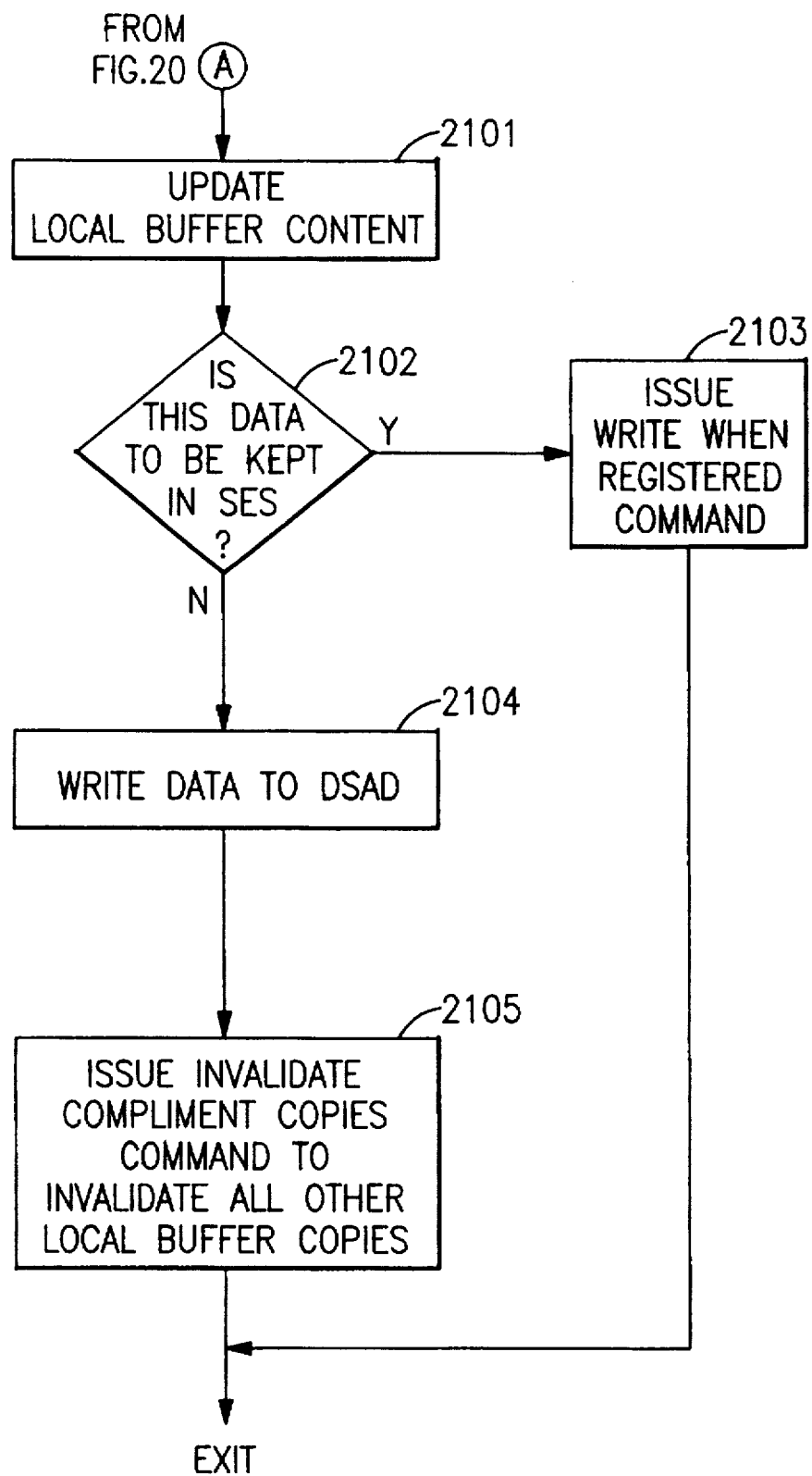
FIG. 21 is a flow program of buffer manager processing for a write operation.

During mainline operation, access to the data base is supported by the buffer manager. Many different protocols may be followed. An example of mainline usage is shown in FIG. 20 and 21 (detail of 1807).

Data may be retrieved from DASD

Stored in the SES cache

Retrieved from the SES cache

Stored to DASD

Access to data is dictated by programs which execute on the CPC and make requests of the data base manager. For example, such programs may execute as the result of requests from end users which cause transaction programs to be executed.

When a request is made of the data base buffer manager, the buffer manager determines if the requested data is already in a local buffer (2001). If the data is in a local buffer, the validity of the data is checked (2002). Data in a local buffer may become invalid due to updates performed by other instances of the data base manager (FIG. 21 at 2103 and 2105). If the data is valid in the local buffer, an entry is made in the name list used to update the SES data element references via the process reference list command (2003).

If the data is not currently valid in a local buffer, a buffer is assigned and a validity indicator is assigned (2004). The read and register command is issued to register the local buffer with the SES cache and to retrieve the data if the data is stored in the SES cache (2005). If the data is not retrieved from the SES cache (test made at 2006), the data is read from DASD (2008). A read request completes by returning the requested data to the caller.

For an update request, the buffer manager causes the local buffer content to be updated (2101). A determination is then made as to whether or not the data is to be stored in the SES cache (2102). If the data is to be stored in the SES cache, the write when registered command is issued (2103). As part of the processing performed by the write when registered command, all other copies of the data element in local buffers of other instances of the data base manager are made invalid. If the data is not to be stored in the SES cache, the data may be written to DASD (2104). When the data has been written to DASD, the invalidate complement copies command is issued to cause all other copies of the data element in local buffers of other instances of the data base manager to be made invalid (2105).

Figure 22:
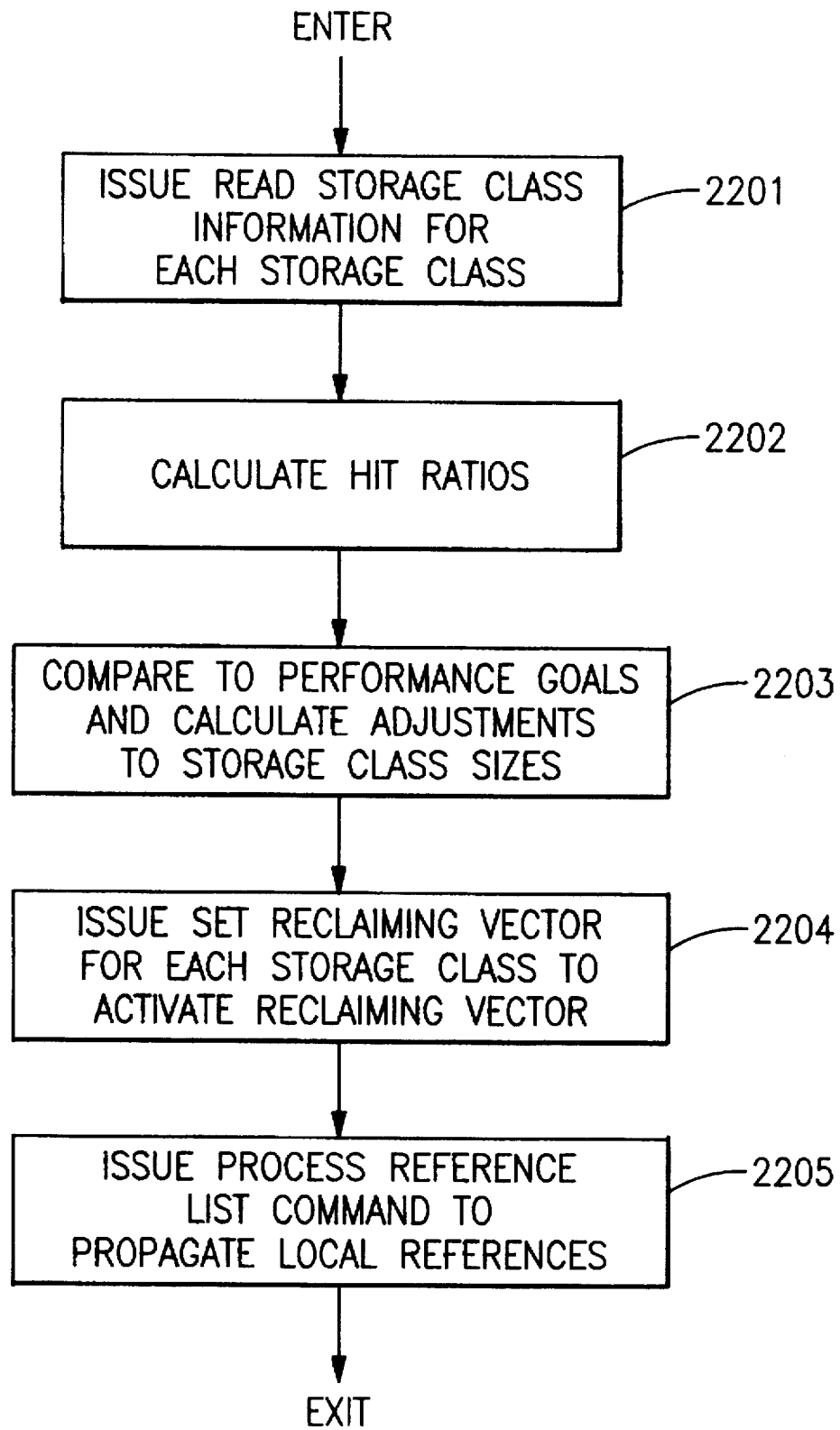
FIG. 22 is a flow diagram of SES cache storage management for a buffer manager.
Figure 23:
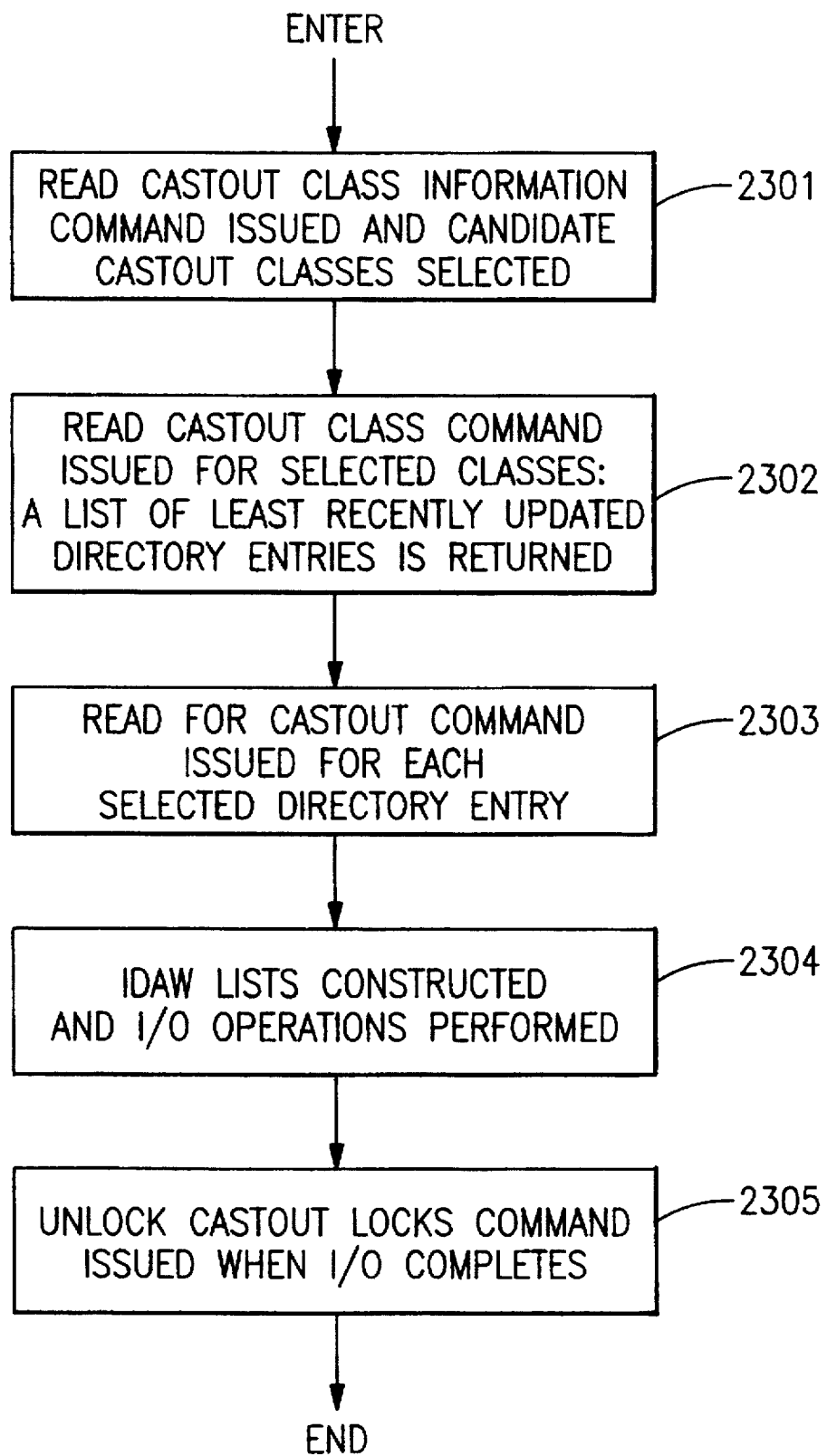
FIG. 23 is a flow diagram of migration of SES cache data to DASD by a buffer manager.

During mainline operation, the buffer manager is also responsible for managing the storage of the SES cache (1908 and detailed in FIG. 22 and 23). The buffer manager is also responsible for managing the migration of changed data elements from the SES cache to DASD. The time out interval established during initialization causes the operating system to give control to processing routines on a periodic basis for management of SES cache storage and migration of SES cache data to DASD.

An overview of one protocol for managing the storage of a SES cache is shown in FIG. 22. This processing is given control on a periodic interval established by the data base manager during initialization of use of the SES cache structure. The read storage class information command is issued for each storage class (2201). Hit ratios for each storage class are calculated (2202). The achieved hit ratios are compared to the performance goals set for each storage class and adjustments to storage class sizes are calculated (2203). For each storage class in which a change of allocated SES resources is required, the set reclaiming vector command is issued to activate the reclaiming vector (2204). The process reference list command is issued (2205) for each storage class in which local buffer references have been recorded during mainline operation (2003).

An overview of one protocol for managing the movement of data from the SES cache to DASD is shown in FIG. 23. This processing is given control on a periodic interval established by the data base manager during initialization of use of the SES cache structure. The read castout class information command is issued for each cast out class and candidate castout classes are selected (2301). The read castout class command is issued for each selected castout class (2302). A list of least recently updated directory entries is returned. The read for castout command is issued for each selected directory entry (2303). I/O requests are built to cause the data read from SES to be written to DASD (2304). When the I/O operations have completed, the unlock castout locks command is issued (2305).

When all data bases using a SES cache are no longer being accessed, the data base manager may disconnect from the SES cache (1909). The data base manager may choose to migrate all modified data elements from the SES cache to DASD or leave the modified data elements in the SES cache. If there are no remaining modified data elements in the SES cache, the SES cache structure may be deallocated or remain allocated for future use. The data base manager invokes operating system services to disconnect from the SES cache structure (1909). The Detach Local Cache command is issued to disassociate the local cache from the SES cache. If required, the operating system makes the local cache identifier (LCID) available for reassignment. The DEFINE VECTOR CPU instruction is issued to free the cache coherency vector. The operating system services determine if the SES cache structure is to be deallocated (1911). If the SES cache structure is to be deallocated, the Deallocate Cache Structure command is invoked (1912). The local buffer pool is then released by the data base manager (1913).

Local Cache Management

Figure 24:
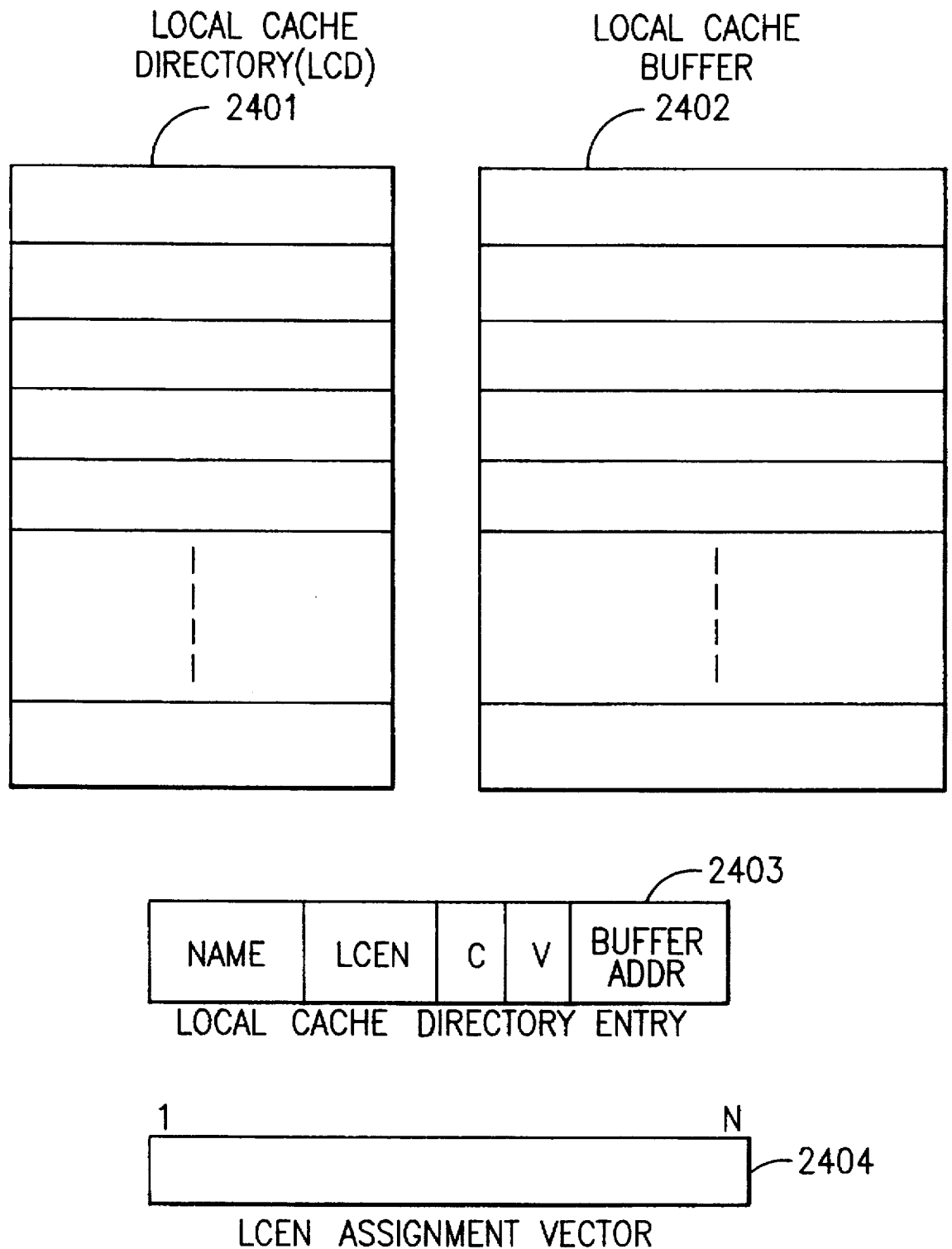
FIG. 24 is an example of a local cache directory, a directory entry and its associated local cache buffer.

Management of a local cache is performed by programming executing in CPCs attached to a SES cache structure. The objects shown in FIG. 24 are representative of the controls used by programming. A local cache directory (2401) provides an entry for each local cache buffer which may exist in a local cache at any point in time. Entries within this directory (2403) are comprised of a set of fields including: the name of the data element; the LCEN currently assigned to the data element; an valid indicator for the data element; an indication of the change state for the data element; the address of the buffer associated with the data element. The assignment of an LCEN to a directory entry is under programming control and may be dynamically established through use of the LCEN assignment vector (2404). The address of the buffer associated with a data element provides the means to locate the data element contained in the local cache buffer (2402).

In one implementation, there exists a fixed association of LCEN values to directory entries. In this implementation, the local cache buffers reside in virtual storage managed by the operating system on the CPC. During data manager initialization, the local cache buffers are established in virtual storage and a fixed association is made between LCEN values and local cache buffers. That is, buffer 1 is assigned LCEN value of 1, buffer 2 is assigned LCEN value of 2, and so forth. In a second implementation, the association of LCEN values to directory entries is dynamic. In this implementation, the local cache buffers reside in virtual storage managed by the operating system on the CPC and a second level of local cache buffers exist in the expanded storage of the CPC. A directory entry exists for each local cache buffer in the virtual and expanded pools. Movement of data between the virtual storage pool and the expanded storage pool is under the control of the program based on the frequency of reference of a given data element. The overall flow is:

1. A data element is read from DASD into a virtual buffer and a directory entry is assigned.
2. Data elements in the virtual buffer pool are maintained in least recently used (LRU) order.
3. A periodic process executes to move the least recently used data elements from the virtual buffer pool to expanded storage buffer locations.
   A. When a data element is moved from virtual to expanded, the directory entry associated with the data element changes from the directory entry for the virtual storage buffer to the directory entry for the expanded storage buffer.
   B. When a data element is moved from virtual to expanded, the virtual buffer are associated entry are made available for reassignment.
4. Data elements in the expanded buffer pool are maintained in least recently used (LRU) order.
5. A periodic process executes to make available the least recently used expanded buffer pool elements and their associated directory entries.
6. When an expanded buffer pool element is made available for reassignment, the associated LCEN is also made available for reassignment.

The assignment of LCEN values to directory entries is dynamically managed as follows. When a data element is initially placed in the virtual buffer pool, an LCEN is assigned from the LCEN assignment vector (2404). Assignment of an LCEN may be accomplished by well know programming techniques such as using compare logical character long (CLCL) instruction execution followed by setting the in use bit in the LCEN assignment vector using the test and set instruction (TS) or compare and swap instruction (CS). The selected LCEN is stored in the directory entry and remains associated with the data elements while the data element is in the virtual or expanded buffer pool. When a data element is removed from the expanded buffer pool, the LCEN is made available for reassignment.

It is seen from the above flow that the association of directory entries to buffer elements is dynamic. Further, it is seen that the virtual and expanded local cache buffers are maintained in an LRU order. Additionally, it is seen that the LCEN value represents the validity of a data element and has no relationship to the location of that data element within the local cache managed by programming in the CPC.

Figure 25:
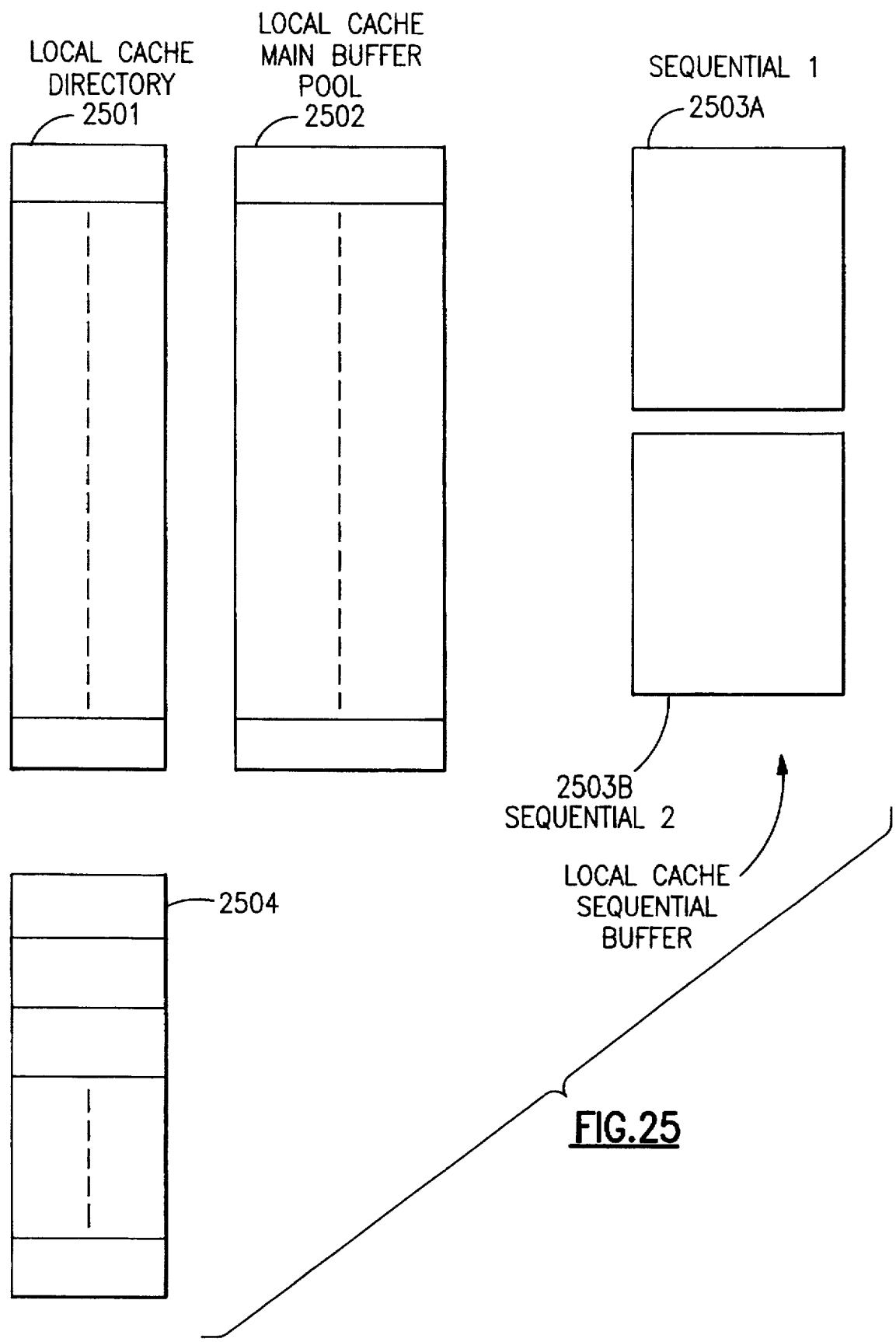
FIG. 25 is an example of a plurality of local cache directories associated with the same set of local cache buffers.

An optional feature of one implementation (FIG. 25) may provide for multiple buffer pools to be supported. These multiple buffer pools support principle, random access to data and sequential access by multiple programs. A separate sequential buffer pool (2503A and 2503B) is created in support of a given application which references data in a sequential manner and may gain a performance benefit by having that data prefetched into buffers. In this implementation, the LCEN values are grouped into segments (2504) comprised of a fixed number of values sufficient in number to support the number of buffers in a sequential buffer pool (2503A and 2503B), and a large segment of values sufficient in number to support the main buffer pool (2502). The association of LCEN values to buffer pool entries is fixed for both the main buffer pool and each sequential buffer pool. The number of sequential buffer pools is dynamic based on program execution. A sequential buffer pool is created when sequential access patterns are detected. When a sequential buffer pool is created, an available segment of LCEN values is assigned. The overall flow is:

1. Data elements are read from DASD and placed in the main buffer pool as required. When retrieved these data elements are registered at the SES cache using the RAR command and the LCEN associated with the entry in the main buffer pool.
2. When a sequential access pattern is detected by the buffer handler, a sequential buffer pool is created and an available segment of LCEN values is assigned to the newly created sequential buffer pool.
3. If data elements to be retrieved by the sequential access program do not already exist in the main buffer pool, the buffer handler retrieves those anticipated data elements from DASD and places them in the assigned sequential buffer pool with the associated LCEN value.
4. When a search for a data element is performed, it may be located in the main buffer pool or the sequential buffer pool. If the requested data element is located in a sequential buffer pool, the data element is moved from the sequential buffer pool to the main buffer pool.
5. When a data element is moved from a sequential buffer pool to the main buffer pool, the LCEN associated with the data element is changed from the LCEN value associated with the sequential buffer pool to the LCEN value associated with the main buffer pool. Changing the LCEN value associated with the data element is achieved through use of the RAR command. When the RAR command is executed at the SES cache, if the named data element is already registered and valid for the requesting user, and if the LCEN specified on the command is the same as the LCEN stored for the specified user:
   A. An invalidate command is formulated for the old LCEN value for the requesting user
   B. An indication is returned showing that an invalidate function was performed
   C. The old LCEN value is returned in the RAR command response.

It can be seen from the above that the LCEN associated with a data element is under programming control. Programming may assign differing LCEN values to represent the validity of a data element over time. Further, it may be seen that changes in the assigned LCEN value are accomplished without loss of integrity of the data element content across changes in the LCEN value while the data element remains in the local cache.

On-Line Transaction Model

The following scenarios are based on a transaction processing environment. In this environment, a transaction manager—such as the IMS or CICS transaction manager—initiates programs which are well formed in their path length and access of data. The transaction manager supports program access to data base managers which provide data sharing functions within a sysplex. These data base managers facilitate granular data sharing through use of locking services such as those described in U.S. Pat. No. 5,329,427, caching of data within local caches and in a SES cache with consistency according to the mechanisms described in this invention, and logging of transaction initiation/termination and data base changes according to well know programming practices.

In this environment, two phase locking is enforced and two phase commit protocols are enforced. Locks are acquired as data base records are referenced by transactions through the data base managers. Records in data bases are read and written as the transaction executes. When a transaction has completed processing, the transaction manager executes a two phase commit process in which each data base manager is first requested to prepare for commit. When all resource managers have responded to the prepare, a commit request is made to all resource managers if all responses to the prepare were positive. At commit time, the data base manager makes changes to the data base visible to other work units and releases the held locks.

Scenarios for SES Cache Coherency

The following scenarios outline one example of the manner in which the SES cache coherency functions described previously can be used to effect a data sharing buffer manager with data integrity and cache coherency across a sysplex configuration. First, an overview of buffer manager processing to register a data element in the SES cache and retrieve the buffer from DASD is given. A flow is then described in which a modified data element is written to DASD. This is followed by a flow in which a modified data element is written to the SES cache. Next a flow for releasing serialization of a data element is given. At the end, an overview of writing a new data element to the SES cache is given.

Read a Buffer

An overview of the flow for reading a buffer is given in FIG. 20. In this example, serialization is acquired on the buffer in which the requested data element resides. An alternative implementation, in which serialization is obtained on the specific record requested is subsequently described based on the flows shown in FIG. 27. A lock is obtained on the buffer in which the desired record resides using a locking mechanism perhaps like that described in U.S. Pat. No. 5,339,427. The buffer manager then determines if the requested buffer is already in the local cache (2001) by searching the local cache directory (2401). If the requested buffer is in the local cache, a test of the validity of the local buffer is performed (2002) using the Test Vector Entry (TVE) instruction. The integrity of the setting of the LCEN associated with the local buffer is assured through protocols described in U.S. Pat. No. 5331,673 and based on facilities which determine the correct operation of intersystem links (ISC Links) which connect the SES facility to attached CPCs. If the local buffer is valid, process concludes by returning the requested data record (2008).

If the requested buffer is not currently contained within the local cache (N path from 2001), a buffer and LCEN value are assigned (2004) according the the protocols of the buffer manager as exemplified in "Local Cache Management". If the requested data is currently contained within the local cache but is not currently valid (N path from 2003) the assigned local buffer and associated LCEN may be reused or the invalid buffer and LCEN may be made available for assignment and a new buffer and LCEN value may be assigned. If the LCEN to be used had been in use for a locally cached data element and was reclaimed based on local cache management LRU algorithms, the buffer name associated with the last use of the LCEN exists in the directory entry associated with the buffer. This previous buffer name is provided along with the new buffer name and LCEN values to the Read and Register (RAR) command (2005). The previous buffer name is used to locate the associated directory entry in SES and if the LCEN specified matches the entry for the requesting user and the directory entry is valid, the LCEN is deregistered from the directory entry for the old buffer name. The specified buffer name is used to locate the associated directory entry in SES and if the LCEN specified does not match the entry for the rquesting user and the directory entry is valid, the SES initiates an invalidate request for the old LCEN value.

Because it is possible for a SES-support facility to receive and execute a cross-invalidate command against a designated local cache vector entry after interest in the data element has been registered at the SES but before the response to the command under which the registration took place is received, the update to the local-cache vector entry by the program must be serialized with execution of the SES command. The program must ensure the local-cache vector entry is not set to one after it is set to zero by an intervening cross-invalidate command. Otherwise, invalidation of a locally cached data page may go undetected and result in the loss of data integrity.

Programming will use the SVE instruction to optimistically set the local-cache vector entry to one before initiation of a SES cache command which designates the entry for purposes of local-cache registration. If command failure is either indicated or presumed, the SVE instruction should be used to zero the local-cache vector entry.

As part of the operating system service which supports access to the SES facility, the specified LCEN is set to a valid state using the Set Vector Entry (SVE) CPU instruction. The setting of the local valid bit in the processor local storage must be serialized with the execution of the command. The following scenario must be avoided:

1. The read-and-register command is sent to the SES controller, and the directory is updated for the requestor under SES serialization.
2. A response is sent, and serialization is released.
3. A write-when-registered command is processed for the name.
4. A cross-invalidate signal is generated for the local system.
5. The cross-invalidate signal arrives first and invalidates the local valid bit.
6. The read-and-register response arrives, and the program validates the local valid bit by issuing a CPU instruction.

Figure 26:
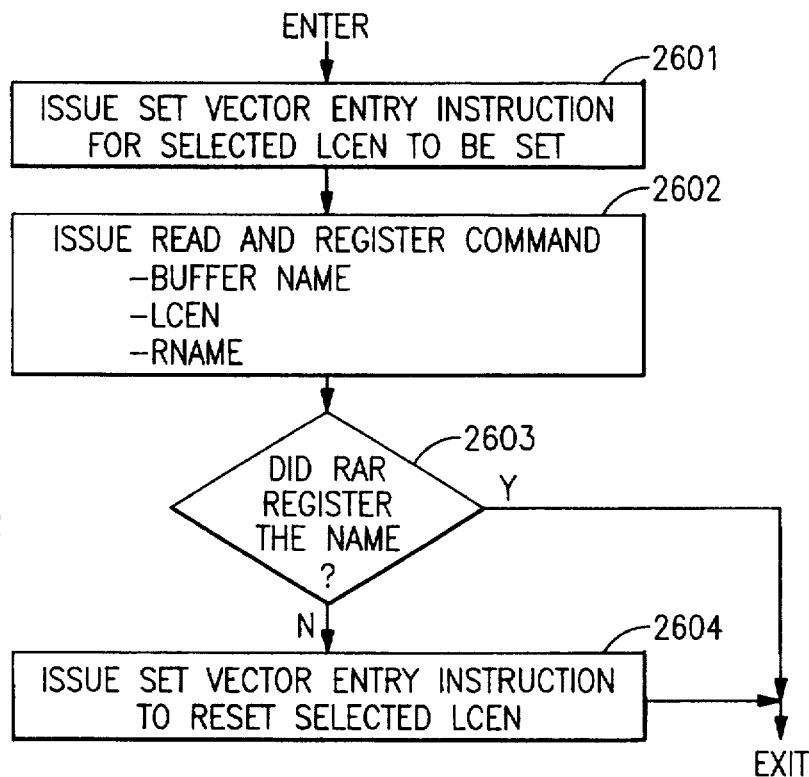
FIG. 26 is a flow diagram for set vector entry CPU instruction execution and SES command processing which registers a buffer name.

The data now appears to be valid in the local cache, when in fact it is not. This is an integrity exposure. This is avoided if the following protocol is employed (see FIG. 26):

1. The program issues a CPU instruction to set the local valid bit (2601).
2. The read-and-register command is sent to the SES controller, and the directory is updated for the requestor under SES serialization (2602).
3. The read-and-register response arrives, and the program interrogates the response code. When the response code indicates that the name was registered, processing is complete (2603 Y path).
4. Otherwise the SVE CPU instruction is issued to reset the local valid bit (2604).

If the above scenario occurs, the final state of the local valid bit will reset to zero, which reflects the correct state of the bit.

After successful completion of the RAR command the data may have been retrieved from SES if the buffer manager has chosen to cache data in SES. If the buffer manager has not chosen to cache the data element in SES, the data may be retrieved from DASD into the acquired local cache buffer (2007).

Once the data has been retrieved from DASD, the buffer manager may either place the data in the SES cache or choose not to. To cache an unchanged data element in SES, the buffer handler would use the Write When Registered (WWR) command with the change bit set to indicate an unmodified data element. The WWR will complete successfully when the request originated from an attached user which is validly registered for the data element. Because the change bit indicates the data element is not modified, other attached local caches are not invalidated.

Write a Buffer to DASD

FIG. 21 shows the overall flow for writing a buffer to DASD in a sysplex data sharing environment. In this scenario, the write of the buffer is to record the data on DASD (2104) and the SES cache is used only as a mechanism for cache coherency —that is the data is not written to the SES cache. If the data is not written to the SES cache, other local caches are invalidated through invocation of the Invalidate Complement Copies (ICC) command (2105).

From the process flow of the ICC command (FIG. 12), it is seen that all other registered local cache copies of the data element are invalidated. Considering the flow shown in FIG. 20 at 2002, it will be seen that this process will result in all other sharing instances of the data base manager retrieving the modified data element.

Write a Buffer to SES Cache

FIG. 21 shows the overall flow for writing a buffer to a SES Cache in a sysplex data sharing environment. In this scenario, the write of the buffer is to record the data on SES (2103). When the data is written to the SES cache, other local caches are invalidated through the cross invalidate processing shown in the flow diagram for Write When Registered (WWR) (FIG. 18). Considering the flow shown in FIG. 20 at 2002, it will be seen that this process will result in all other sharing instances of the data base manager retrieving the modified data element from SES as a result of the Read and Register (RAR) command executed at (2005).

Unlock a Buffer

At transaction commit time, an Unlock of all serialization points held by a transaction will occur. Using a locking mechanism perhaps like that described in U.S. Pat. No. 5,339,427, an unlock of the buffer occurs. When the buffer is unlocked, waiting request for the data or subsequent request for the data will retrieve the data element from the SES, if the SES cache is being used to cache the data, or from DASD, if the SES cache is not being used to cache the data or if the data element is not currently in the SES cache.

Write and Register

When a large volume of new data is being created, such as when a data set is being extended or first initialized, granular locking may not be needed and the data manager may recognize that there is no possibility that the data is in existence. In support of scenarios such as this, the data manager may obtain a lock which serializes access to the entire data base. However, once the data set has been extended or created, it may be desirable to share that. Therefore, it is desirable to have that data registered and resident in the SES cache. The Write and Register (WAR) command provides support for these environments. Execution of the WAR command causes recording of the data element and registration of the requesting user as shown in the WAR process flow diagram (FIGS. 16 and 17).

Write a Buffer with Record Locking

Figure 27:
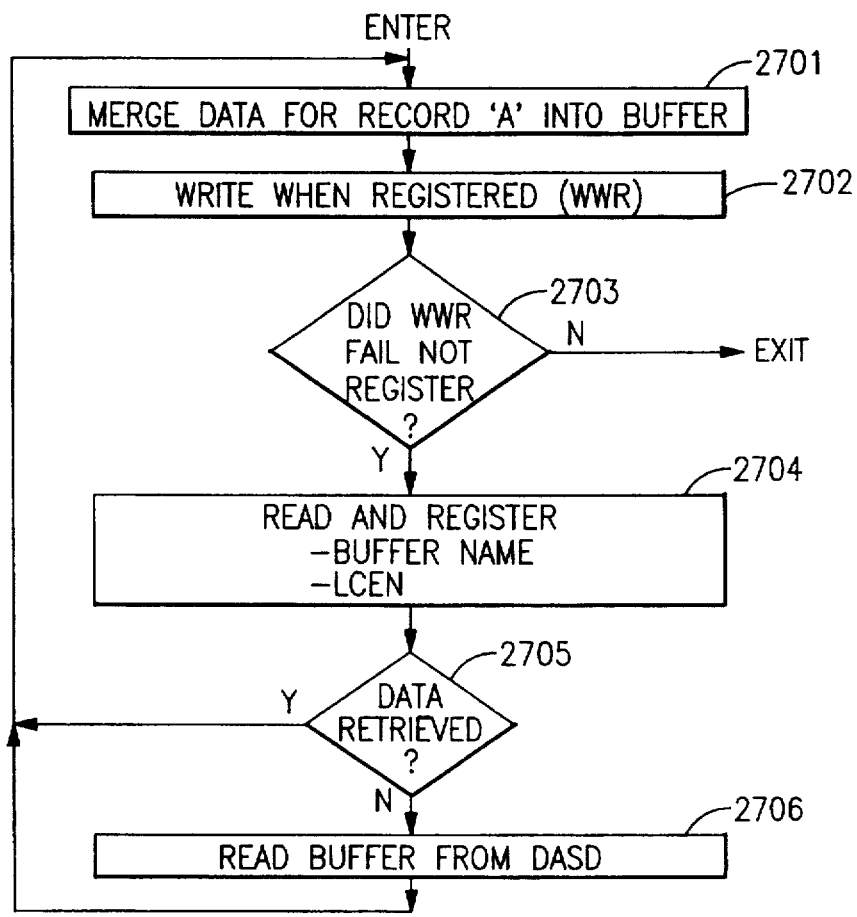
FIG. 27 is a flow diagram for a buffer manager which merges modified records into a cached data buffer.

The flow of control for record level locking is shown in FIG. 27. A choice of record or buffer locking is made by the programming which manages the data. Lock processing and unlock processing obtain serialization of a single record within a data buffer. There may be multiple records in a data buffer and the protocols for maintaining these records is described in U.S. patent application Ser. No. 07/812,677, now U.S. Pat. No. 5,355,477.

During the write process shown in FIG. 27, the modified data record is merged into the buffer in the local cache (2701). The Write When Registered (WWR) command is issued to record the changed data in the SES cache with the change bit set to indicate that the buffer is modified from the DASD version (2702). The WWR command may fail because another instance of the data manager has written the data element as modified with a changed record other than the record being updated by this instance of the data manager (Y path of 2703). If the data element is successfully written, all other local cache copies of the data element are invalidated as part of the WWR command. When the WWR command fails because the requesting instance is not registered, the data element is retrieved from the SES cache and the requesting data manager instance becomes reregistered using the Read and Register (RAR) command (2704). This RAR command retrieved the data element including any modified records recorded by other instances of the data manager. If the data is not retrieved from SES (N path of 2705), the requesting data manager instance is registered in the SES cache directory and proceeds to retrieved the data from DASD (2706). This may occur if the data has been migrated to DASD from SES as is described in U.S. patent application Ser. No. 07/860,806. Following retrieval of the current data buffer content, the data merge function (2701) is performed again and the update process is repeated.

Invalidate Name

The Invalidate Name command (FIG. 13) is generally used to purge the SES cache of directory and data elements associated with a data set or data base which is no longer being accessed. For example, when the last user of a data base stops access to that data base, a data manager may move all modified data elements from SES to DASD. This process is more full described in U.S. patent application Ser. No. 07/860/806 When all modified data elements has been migrated to DASD there remain in SES directory entries which are not associated with data elements and directory entries which are associated with data elements which are not modified. The SES cache resources in use by these directory entries and data elements may eventually be reused based on SES storage management algorithms. However, a much more efficient protocol may be employed to explicitly purge these entries from the SES cache. The Invalidate Name (IN) command is invoked with a mask enabling identification of all directory entries associated with the data base being purged from the cache. At completion of the IN command processing all directory and data resources associated with the purged data based will have been removed from the cache and available for reuse by other data based which continue to be referenced by active programs.

Non-Blocking Serialization For Caching Data Usage

In the following usage scenarios, assume data elements being referenced in the storage heirarchy are pages. Then, a page cached in the shared cache (FIG. 1 at 111) is identified by a software-assigned name. Therefore, any requests for reading or writing in the shared cache are required to specify the name of the page which is the object of a request. There is no requirement for correct execution of this protocol that the data elements are pages.

Figure 29:
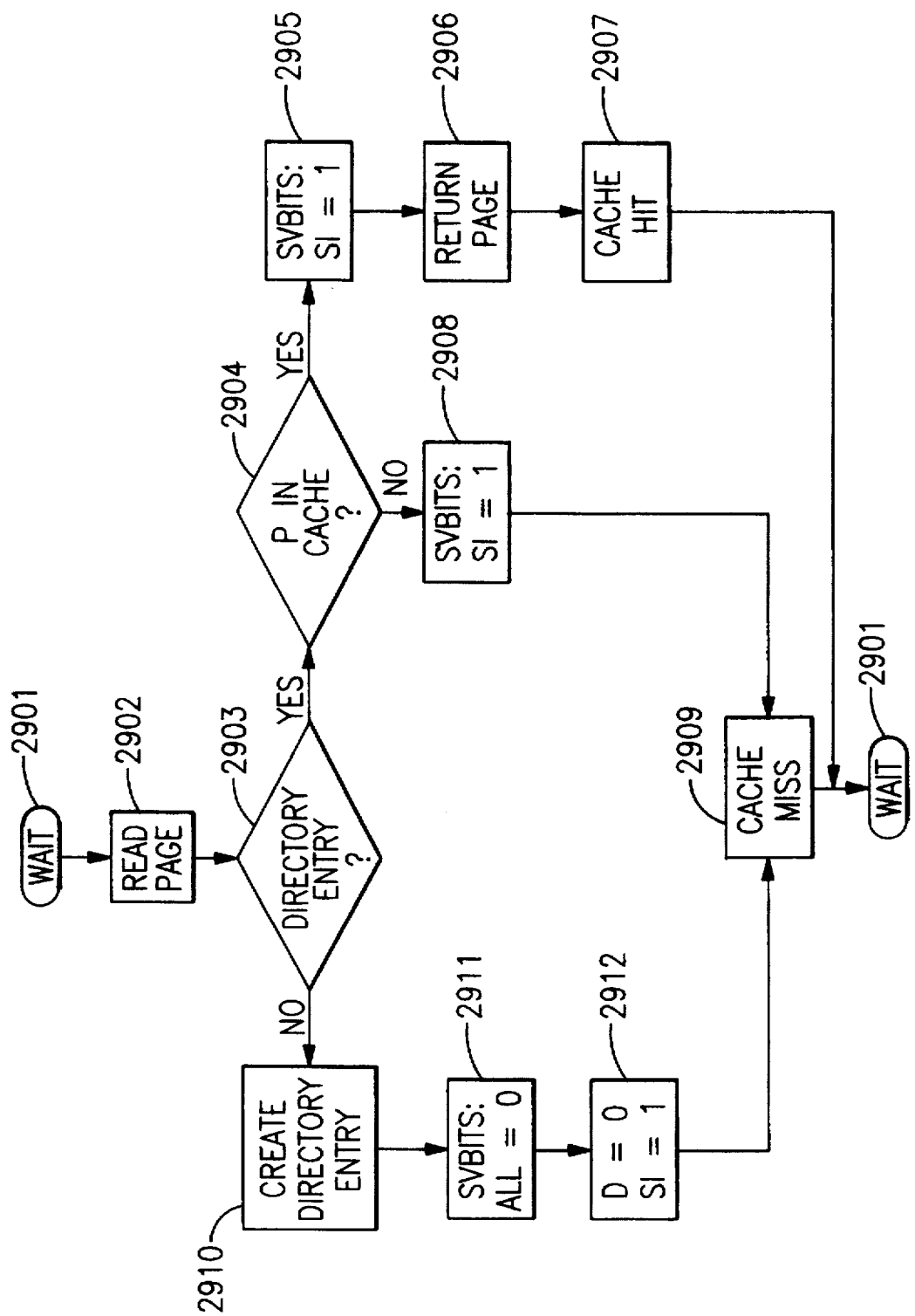
FIG. 29 is a flow diagram representing process flow for a READ command in support of non-blocking serialization for caching data in a shared cache.
Figure 30:
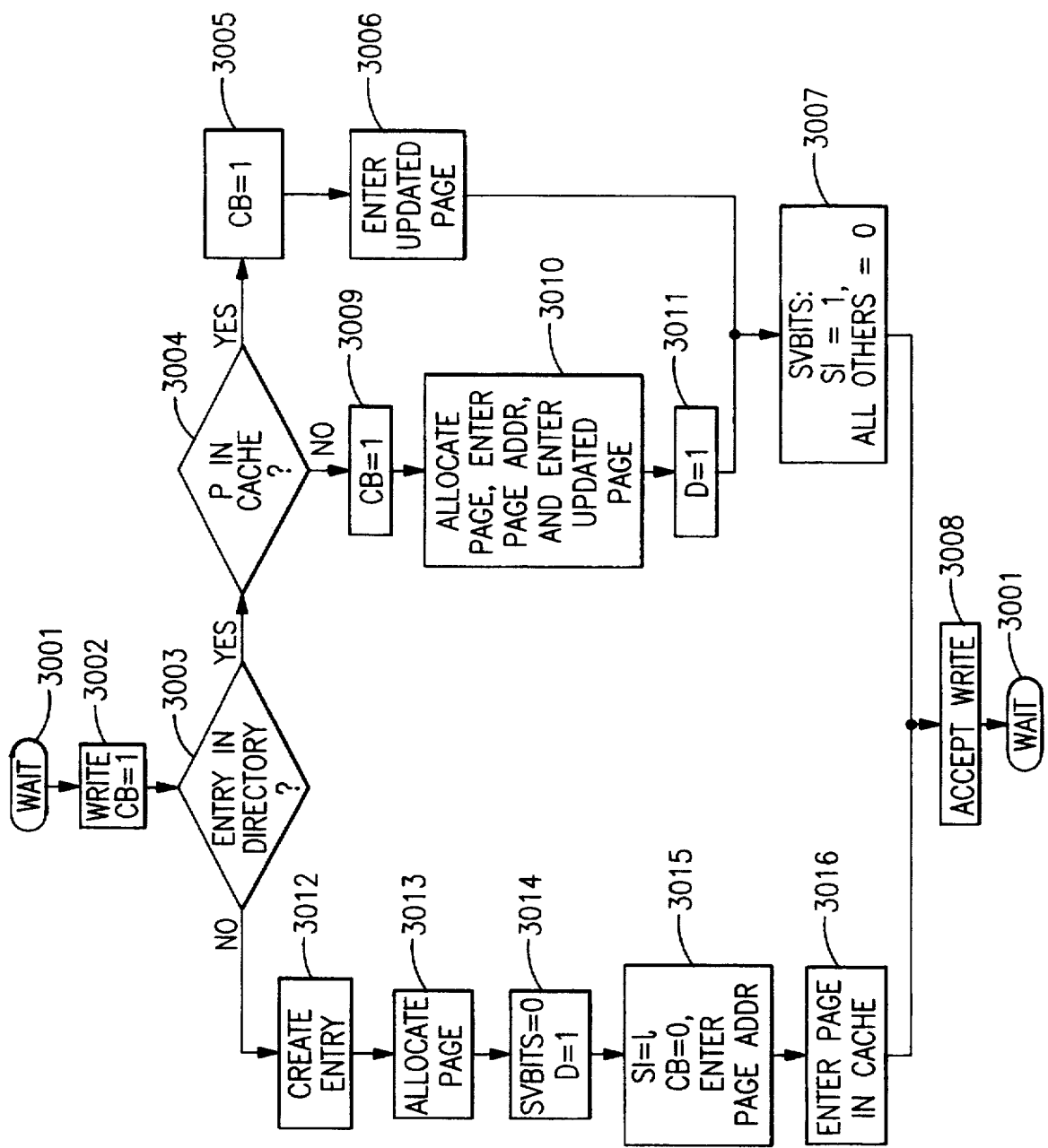
FIG. 30 is a flow diagram representing process flow for an unconditional WRITE command in support of non-blocking serialization for caching data in a shared cache.
Figure 31:
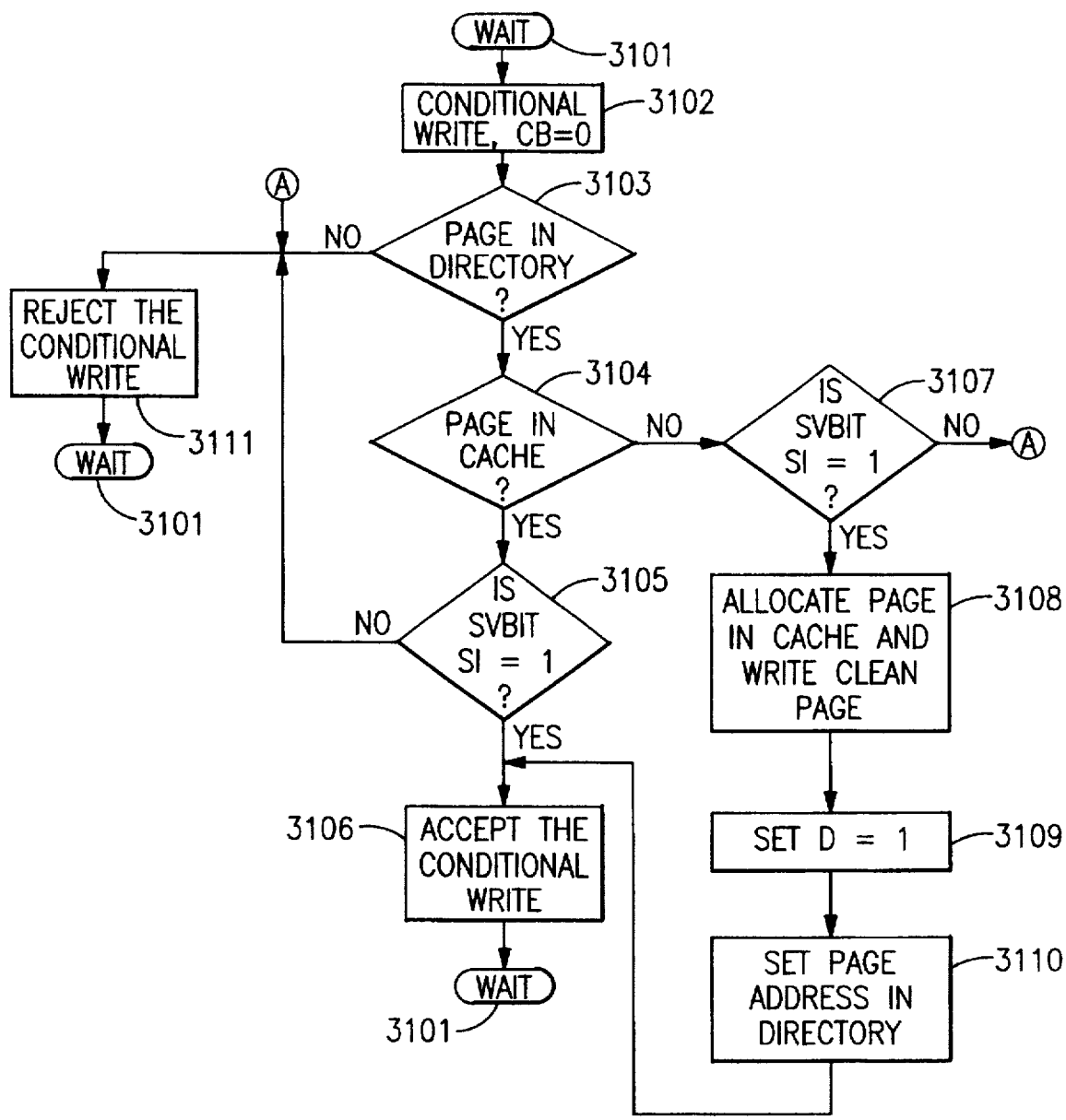
FIG. 31 is a flow diagram representing process flow for a CONDITIONAL WRITE command in support of non-blocking serialization for catching data in a shared cache.
Figure 32:
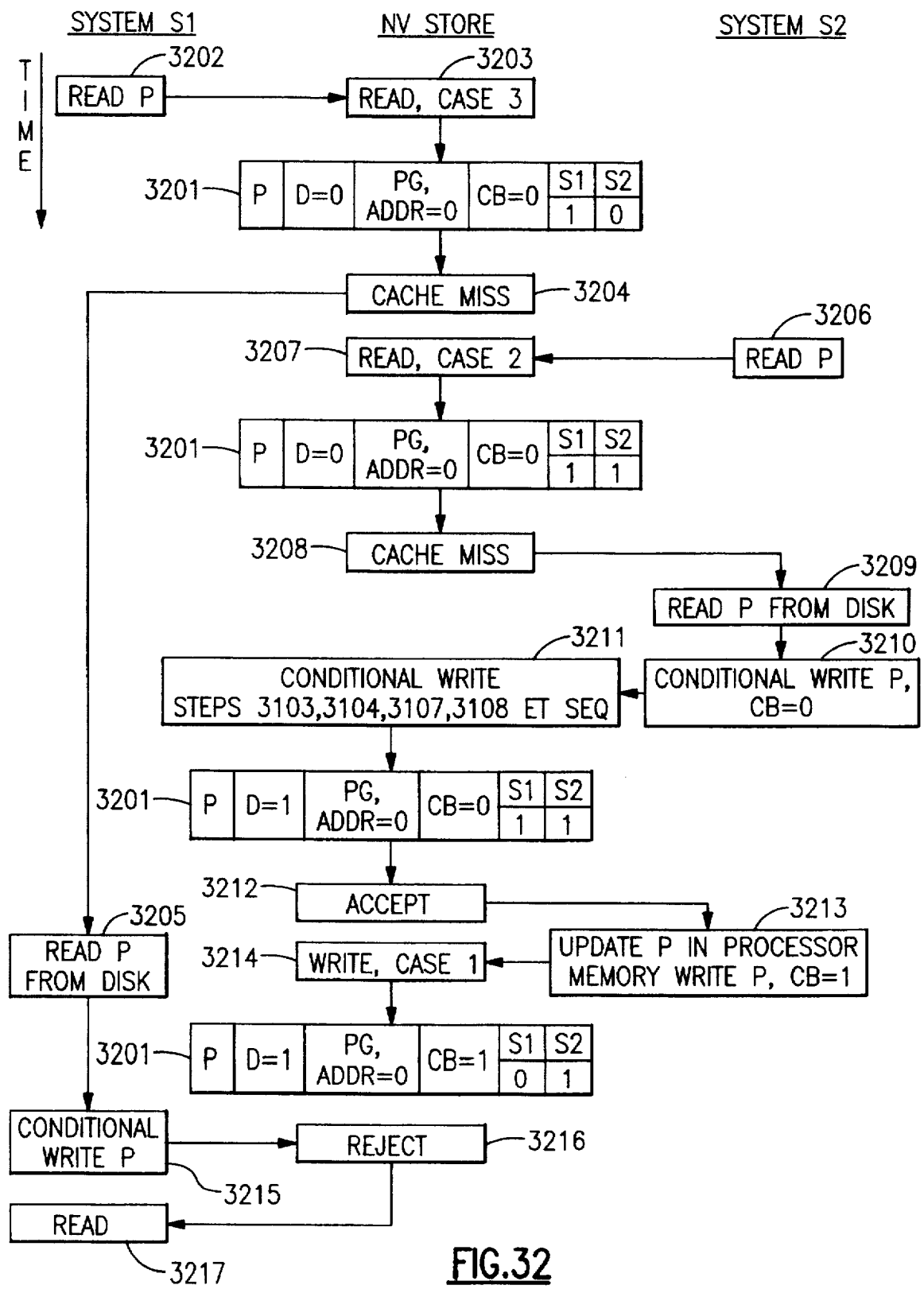
FIG. 32 is a flow diagram illustrating the method of non-blocking serialization for caching data in a shared cache.

The non-blocking serialization protocols for caching data in a shared cache are demonstrated using FIGS. 29, 30, 31, and 32. In FIG. 29, a page is read using the Read and Register (RAR) command described in FIG. 15. FIG. 30 is a diagram of usage of the Write and Register (WAR) command described in FIGS. 16 and 17. Use of the Write When Register (WWR) command described in FIG. 18 as related to non-blocking serialization for caching data in a shared cache is diagramed in FIG. 31. In FIG. 32, a flow of the protocol is diagramed.

In FIGS. 29, 30, 31, and 32, the collection of valid bits in the local cache register (FIG. 5, 501A, 501B, and 501C) are referred to as a system-valid-bit vector (SVBV). For this example, the SVBV can be viewed as being comprised of one bit per system attached to the cache.

System-Valid-Bit Vector (SVBV)

One bit per system attached to the cache. If 1, the page cached in the identified system memory is valid. If 0, the page cached in the system's memory is not valid.

Describing the collection of valid bits in the local cache register as a system valid bit vector is only a conceptual simplification for purposes of describing the following protocol. In the preferred embodiment, the individual bit entries in the system valid bit vector correspond one for one with the valid bit fields of the local cache register.

In FIGS. 29, 30, 31, and 32, the local cache identifier (LCID) is referred to as a system identifier (SI). The function of the SI is identical to the function of the LCID. For purposes of the following protocol, the SI is stored in the local cache controls and a field is provided in the SVBV of every entry currently in the directory and every entry thereafter made as the result of CONNECT command processing.

In the following protocol description, the function of the CONNECT command is fulfilled by the Attach-Local-Cache command (ALC) diagramed in FIG. 9. The function of the READ PAGE command is fulfilled by the Read-and-Register command (RAR) diagramed in FIG. 15. The function of the WRITE PAGE command is fulfilled by the Write-and-Register command (WAR) diagramed in FIGS. 16 and 17. The function of the CONDITIONAL WRITE command (WWR) if fulfilled by the Write-When-Registered command diagramed in FIG. 18.

These commands support non-blocking serialization to cache a page in the multi-system data sharing complex of FIG. 1 while maintaining the page's data integrity in the face of the potential for one system to be caching an updated page while another system is attempting to cache a down-level version of the page after a cache miss elicited by a read request. In the practice of the invention, a command whose object is a given page is serialized with other commands for the same page by the management logic (FIG. 1 at 110) in the memory (FIG. 1 at 101).

For the purposes of this protocol, the memory system of FIG. 1 supports the following commands:

an CONNECT command executed by a software system, such as an instance of a database system in the multi-system data sharing complex of FIG. 1, connecting to the NV-store 101. In response to a CONNECT command, the management logic 110 enters the identification of the connecting system into the Local Cache Controls 105 and provides a field for the connecting system in the SV bit vector of every entry currently in the directory 102 and every entry thereafter made.

READ PAGE (S, P, Buffer Address), where S identifies the system issuing the command, P identifies the requested page, and Buffer Address denotes the address in the buffer of the system where the page is to be delivered;

WRITE PAGE (S, P, C=1, Buffer Address) This command is also referred to as an "unconditional" WRITE. When a WRITE PAGE command is issued, the parameters input with the command include a C parameter corresponding to the CB field for the identified page. Updating of the page is indicated by setting the change bit to 1; and CONDITIONAL WRITE (S, P, C=0, Buffer Address) The CONDITIONAL WRITE command is used to "cast in" or enter into the NV-store a page which the conditionally writing computer system has obtained from secondary storage, and has not changed.

Read Page

In FIG. 29, the operational flow for management logic processing in response to a READ PAGE command is illustrated. Initially, the management logic 110 is in a WAIT state 2901 from which it can exit to any one of at least three processes, including the UNCONDITIONAL WRITE, CONDITIONAL WRITE, or READ PAGE processes. In FIG. 29, it is assumed that a READ command having the form illustrated above has been received. This is signified by READ process step 2902. In providing a READ PAGE command, the issuing computer system identifies itself (SI, that is, the ith system) the requested page (P), and the Buffer Address in the computer system to which the read page is to be delivered. The read process undertaken by the management logic 110 has three possible cases.

The first case occurs if an entry for the identified page P exists in the directory 102 and the page's D bit is set to 1, signifying that the requested page is in the shared cache 103. These conditions are tested in decisions 2903 and 2904, respectively. Assuming the positive exit from both decisions, the read process sets the bit corresponding to the identified ith computing system (SI) in the SV bit vector of the entry to 1 in step 2905, returns the data page at the specified Buffer Address in step 2906, and returns a cache hit indication in step 2907.

The significance of this case is that any time a read request is issued for a page which is already in the shared cache 103, the page will be unconditionally returned to the requestor with a cache hit indication. The S bit for the requestor is conditioned to a first state (1) in order to indicate that the copy of page P possessed by the system is current.

In the second case, it is assumed that an entry exists for the page P in the directory 102, but that the page has not yet been entered in the shared cache 103. In this case, following the read page step 2902, the positive exit is taken from the decision 2903 and the negative exit from the decision 2904. Now, the S bit for the requesting system is conditioned to the first state (that is, to a "1") and a cache miss is issued. In this case, a previous READ PAGE command has been received by the management logic 110 resulting in creation of a directory entry, but the page has not yet been brought up from DASD.

In the last case, a directory entry for page P does not exist, and management logic 110 follows the negative exit from the decision 2903 and executes steps 2910, 2911, and 2912 in sequence. In this regard, in step 2910, the management logic creates a directory entry for the page P (assuming available storage), initially conditions the entire SV bit vector for the created entry to a second state (preferably, "0"). Then, the D bit is set to 0 CB is set to 0, and the S bit for the requesting system is conditioned to the first state. Last, a cache miss is issued in step 2909 and the logic enters the wait state.

In this last case, system SI has lodged the first READ request for page P; any following READ request before the page is entered into the shared cache 103 will follow procedure steps 2902, 2903, 2904, 2908, 2909. Once the requested page has been moved up to the shared cache 103 from DASD, a READ request will follow steps 2902, 2903, 2904, 2905, 2906, 2907.

Write Page

The process employed in the management logic for writing an updated page to the shared cache 103 is illustrated in FIG. 30. A page may be updated after being retrieved from the shared cache 103 by a READ PAGE command. Alternately, a page may be updated after being obtained from a DASD, but before the page is ever entered into the shared cache 103. Assume that system SI has acquired the page P, has updated the page, and now must write the page into the shared cache 103. System SI will issue the WRITE command with CB=1 to write the updated page P. The processing undertaken by management logic in response to this WRITE command is illustrated in FIG. 30.

In FIG. 30, there are three possible cases: an entry for the page P exists in the directory 102 and D=1 (the page is in the shared cache 103); the entry for page P exists, but the page has not yet been entered in any form into the shared cache 103; or, an entry does not exist for the page P in the directory.

In the first case, the write process undertaken by the management logic 110 (FIG. 30) moves through the sequence 3002, 3003, 3004 and then executes steps 3005, 3006, 3007 and 3008. In step 3005, the CB field of the directory entry for page P is set to 1. Next, in step 3006, the existing version of page P is overwritten with the data at the Buffer Address provided with the WRITE command. Then, all S bits in the SV BIT VECTOR for the page's data entry are set to 0 except the S bit for the system issuing the WRITE command. Upon exiting step 3007, the management logic returns an acceptance of the command to the requesting system in step 3008 and then enters the wait state 3001.

In the second case, where there is a directory entry for the page P, but the page is not in the shared cache, the management logic process 110 moves from the wait state 3001 through steps 3002 and 3003, takes the negative exit from decision 3004, and executes steps 3009, 3010, 3011, 3007, 3008. In step 3009, the change bit in the directory entry for the requested page is set to 1. In step 3010, space is allocated for page P in the shared cache 103, the data is moved to the allocated space from the Buffer Address of system SI, and the cache address of the page is placed in the page address field of the page's directory entry. Next, in step 3011, the data bit is set to 1 in page P's directory entry and step 3007 is executed, following which the logic returns an acceptance of the command and enters the wait state 3001.

In the last case, when there is no directory entry for page P, the negative exit is taken from the decision 3003 and steps 3012–3016 and 3008 are executed, following which the logic enters the wait state 3001. In step 3012, a directory entry is created for page P, and in step 3013, space is allocated in the shared cache for entry of the page. In steps 3014 and 3015, relevant bits in the directory entry are conditioned. In step 3014, all bits in the page's SV bit vector are initialized to 0 and the D bit is set to 1. Next, in step 3015, the S bit for the requesting system (bit SI) is conditioned to a 1 and the change bit is also set to a 1, indicating that the page has been changed, and the page's address is placed in the entry. In step 3016, the directory entry for page P is entered into the directory and the page is placed into the cache at the allocated location. The logic then returns an acceptance and enters the wait state.

It is observed that the write process of FIG. 30 is unconditional in that the request is never rejected. Further, execution of any one of the WRITE cases will result in setting the change bit for the affected page and zeroing all bits of the SV bit vector for the affected page, save the bit for the writing computer system. As will be seen from the following description of the CONDITIONAL WRITE, zeroing the S bits for non-writing computer systems during a WRITE will prevent entry of down-level pages into the shared cache.

Conditional Write

Refer now to FIG. 31 for an understanding of the conditional write processing embodied in the management logic 110. In this processing, it is assumed that system SI received a cache miss from the NV-store and has then obtained a page from secondary storage, has not changed it, and is preparing to cache it in the shared cache 103. In the parameter set sent to the management logic 110, system SI sets the change bit to 0, which signifies that the page in the possession of the computer system is equivalent to the secondary storage version of the page. Again, there are three cases.

In the first case, system SI issues a CONDITIONAL WRITE command with CB equal to 0. The command is responded to in step 3102 and the directory 102 is checked for an entry corresponding to page P. Assuming the page is in the directory, the positive exit is taken from step 3103 and in step 3104 the data bit of the entry is checked to determine whether the page is in the cache. Assuming the positive exit from decision 3104, the page would be in the cache. At this point, the S bit for system SI is checked in the SV bit vector of the page entry to determine whether another system has changed the page. If bit SI is set to 1, no change to the page has occurred and the positive exit is taken from decision 3105. Now, the management logic 110 has determined that the page is in the cache, that the page submitted by SI is equivalent to the page in the cache, and that no overwriting of the page is required. Thus, the management logic 110 will return the appropriate code to signify acceptance of the CONDITIONAL WRITE in step 3106. Note, however, that no data will be transferred from the memory of the system SI to the shared cache 103. The logic then enters the wait state.

In the second case, a directory entry exists for page P and the positive exit is taken from step 3103. However, assume that in step 3104 the management logic 110 determines that the page is not in the cache and takes the negative exit from decision 3104, next encountering decision 3107. In decision 3107, bit SI of the SV bit vector for page P is checked. If the bit has been set to 1, system SI is in possession of a valid page. At this point, the positive exit is taken from the decision 3107. Space is allocated in the shared cache and the page data is moved from the Buffer Address of system SI to the allocated space. In step 3109, the D bit is set to 1. In step 3110, the page address is set in the directory entry and the entry is placed in the directory. Last, the management logic returns an acceptance of the CONDITIONAL WRITE to system SI and enters the wait state.

In this case, assume that the outcome of the decision at 3107 is negative. Now, system SI is not in possession of a valid page and the conditional write processing is terminated through step 3111, the management logic 110 returning the rejection of the CONDITIONAL WRITE command to system SI and then entering the wait state 3101.

Last, if the management logic determines in response to a received CONDITIONAL WRITE command that no entry has been made for page P in the directory 102, the negative exit is taken from decision 3103, command processing is terminated and the command is rejected in step 3111, the management logic then entering the wait state 3101.

Flow of Non-Blocking Serialization for Caching Data

Referring now to FIG. 32, an example of the operation of the invention will be explained. Given the commands and processing described above, the example will show that the invention prevents a down-level version of any page from overlaying a more recent copy of the same page when multiple systems could be reading and updating the page with non-blocking serialization at the NV-store where the commands for a page are processed serially. The non-blocking serialization exhibits a distinct advantage over blocking serialization since the latter requires queueing of requests, resuming of requests, and requires complicated recovery mechanisms.

In the example, assume that there are two systems, S1 and S2, which are involved in data sharing. In illustrating the sequence of events in the example, use is made of a representative directory entry 3201 for a page P. Assume also that the passage of time is represented by the downward-pointing arrow marked "time".

Assume first, in action 3202, that system S1 issues a READ PAGE command for page P. Assume further that the NV-store does not have a directory entry for P. In this case, management logic will execute case 3 of READ processing in action 3203, creating a directory entry 3201 for P, initializing the entry by filling the page name field, setting the data bit field to 0, setting the page address field to 0, setting the change bit field to 0, and appending S1 and S2 fields, with S1=1 and S2=0. At the end of case 3 read processing, the NV-store in action 3204 issues a cache miss indication to system S1, in which case S1 would initiate a process for reading page P from secondary storage in action 3205.

Assume, next, that S2 issues a READ PAGE command for page P in action 3206. In this case, the management logic would execute read processing case 2 in action 3207, setting S2=1 and returning a cache miss in action 3208. At this time, system S2 initiates processing in action 3209 to read page P from secondary storage.

Now assume that system S2 is the first to obtain a DASD version of page P. With this version, system S2 issues a CONDITIONAL WRITE in action 3210 to the NV-store with CB=0. Having a page entry for page P but no copy of the page in the cache, and with SV bit vector bit S2=1, the management logic 110 in action 3211 executes CONDITIONAL WRITE command processing steps 3102, 3103, 3104, 3107, 3108, 3109, and 3110, entering the page into the shared cache 103, setting the D bit to 1, entering the page's cache address in the directory entry, and then issuing an acceptance of the CONDITIONAL WRITE in action 3212.

Assume, next, that system S2 updates page P before system S1 reads it from DASD and in action 3213 issues a WRITE command with CB=1. In response, management logic 110 will execute case 1 of the WRITE processing in action 3214, resulting in the change of bit S1 in the SV BIT VECTOR to 0. This signifies that any copy of page P in the possession of system S1 is down-level.

Last, assume that the disk-read processing initiated by system S1 in action 3205 for page P is completed. Now, system S1 will attempt to put the down-level version of page P into the NV-store by a CONDITIONAL WRITE command in action 3215. The management logic 110 will traverse steps 3102–3105 of the CONDITIONAL WRITE processing, taking the negative exit from decision 3105 and rejecting the CONDITIONAL WRITE in action 3216. With rejection of the CONDITIONAL WRITE, system S1 can obtain page P from the NV-store with another READ PAGE command action 3217.

The non-blocking serialization protocol for moving a page obtained from first-level storage into a shared NV-store works well because the NV-store begins tracking caching of the page (in the SV bit vector) at the first READ PAGE command issued, even if the command results in the cache miss owing to the absence of the directory entry or data. Any unconditional WRITE command by another system will set the change bit for page P and will reset the S bits of all other systems other than the writing system in the page's SV bit vector. Processing of a subsequent CONDITIONAL WRITE command will key on: a) the writing system's S bit in the SV bit vector; or, b) absence of a directory entry for the page. The NV-store rejects the CONDITIONAL WRITE command in both cases.

The reason why the CONDITIONAL WRITE command must be rejected for case (a) is because some other system will have updated the page, or the NV-store will have stolen the entry and then recreated it. In this latter case, it is conservatively assumed that the page was updated, cast out, and then re-entered.

The reason why the CONDITIONAL WRITE command must be rejected for case (b) is explained by the following scenario: system S1 issues a READ PAGE command for page P and receives a cache miss. System S1 now read the page from secondary storage. Meanwhile, system S2 issues a READ PAGE command for page P, receives a cache miss, obtains page P from secondary storage prior to system S1. Now, system S2 issues a CONDITIONAL WRITE command to enter page P, then updates page P and issues a WRITE command with CB=1, marking the S-bit for system S1 as invalid. (This is the processing illustrated in FIG. 32.) Subsequently, system S2 removes (casts out) page P from the NV-store and writes it to secondary storage. The directory entry and shared cache allocation for page P becomes stealable and is stolen by the NV-store. Now, if the CONDITIONAL WRITE command of system S1 were to be accepted, a down-level copy of page P would be cached in the NV-store. Hence, the CONDITIONAL WRITE command must be rejected if the directory entry for the page P does not exist.

Conditional Write With CB=1

The inventors also contemplate that the CONDITIONAL WRITE command can be issued by a computer system with the change bit set to 1. In this regard, the command is still used to "cast in" to the NV-store a page obtained from secondary storage which the computer system has updated. In this case, the computer system offers the updated page to management logic 110 for entry into the cache with a CONDITIONAL WRITE command having the same parameter set as that given above, with the exception that CB=1. With this condition, global locking to serialize updates to a page can be avoided. Avoidance of such global locking is illustrated as follows:

1. System S1 issues READ PAGE for page P;
2. System S2 issues READ PAGE for page P;
3. System S2 obtains page P and updates the page in its buffer before conditionally writing it to the shared cache;
4. System S2 issues a CONDITIONAL WRITE for page P with CB=1;
5. System S1 obtains page P and updates the page in its buffer;
6. System S1 issues a CONDITIONAL WRITE for page P with CB=1;
7. The CONDITIONAL WRITE of system S1 is rejected because bit S1 in the SV bit vector for page P is marked "invalid" (it has a value of 0);

8. System S1 now issues a READ PAGE for page P;
9. In response to S1's READ PAGE command, the management logic sets bits S1 in the SV bit vector for page P to "valid" (a value of 1);
10. System S1 obtains a more recent version of page P from the shared cache or from secondary storage. This version would include the updates made by system S2;
11. System S1 updates page P in its buffer; and
12. System S1 issues a CONDITIONAL WRITE command with CB=1.

Assuming that no other system has updated page P, system S1's CONDITIONAL WRITE command would be accepted and would include the updates of system S1 and S2. Thus, this variation of the invention contemplates that in any computer system, failure of the system to conditional write to the shared cache 103 will be followed by a CONDITIONAL WRITE command, and so on, for so long as the system attempts to update the page. In this manner, updating is serialized by the CONDITIONAL WRITE command while global locking is avoided.

Many variations and modifications which do not depart from the scope and spirit of the invention will now become apparent to those of skill in the art. Thus, it should be understood that the above described embodiments have been provided by way of example rather than as a limitation.

Having thus described our invention, what we claim as new and desire to secure by Letters Patent is:

1. A method of controlling data coherence for a computer multi-system complex, comprising the steps of structuring the computer multi-system complex as a sysplex which includes a plurality of central processor complexes (CPCs), sysplex direct access storage devices (DASDs) connected to the CPCs for storing data elements permanently in the sysplex, and a shared electronic storage (SES) attached to the CPCs, command issuers which execute in the CPCs to issue commands to the SES, said SES containing a SES cache with a SES cache directory for storing names of the data elements, the same data element name being used throughout the sysplex to identify all copies of the same data element stored anywhere in the sysplex whether or not any data element copy is changed relative to the data element or any copy of the data element, communicating a registration command to the SES by a command issuer in a CPC for providing a data element name and associated CPC location information for locating in the CPC a validation indication associated with a data element copy stored in a local LCB in the CPC, the registration command controlling SES to register the data element copy for the SES cache, registering the associated CPC location information in a local cache register (LCR) associated with a SES cache directory entry storing the data element name in the SES cache directory in response to the communicating step, and accumulating all CPC location information in the LCR for all registration commands received for the same SES cache entry containing the data element name for locating all validation indicators for all copies of the data element in all connected CPCs in the sysplex for enabling coherence control for the copies of the data element among the CPCs in the sysplex.

2. A method of controlling data coherence For a computer multi-system complex as defined in claim 1, further comprising the step of performing in the SES cache a name replacement operation which is communicating a data element name and associated CPC location information for a copy of a data element to be deregistered, finding any SES directory entry having the data element name, matching the communicated CPC location information with CPC location information in the LCR associated with the directory entry, and deleting any CPC location information found in the LCR that matches the communicated CPC location information to deregister the copy of the data element.

3. A method of controlling data coherence for a computer multi-system complex as defined in claim 1, further comprising the steps of:

performing in the SES cache a re-registration operation which is communicating a data element name and associated CPC location information to be registered, finding a SES directory entry having the data element name, and replacing the currently registered associated CPC location information with the communicated CPC location information.

4. A method of controlling data coherence for a computer multi-system complex as defined in claim 1, further comprising the steps of issuing by a CPC to SES a read command for requesting registration of a data element in the SES cache, and requesting reading of a data element sent from the CPC to SES with a data element name.

5. A method of controlling data coherence for a computer multi-system complex as defined in claim 1, the registering step further comprising registering with the SES cache directory entry in the associated LCR the CPC location information for the invalidation request bit associated with the LCB containing the copy of the data item which is subject to a registration command.

6. A method of controlling data coherence for a computer multi-system complex as defined in claim 1, the registering step further comprising assigning into the SES cache directory entry of a data element name for a copy of a data element located in an LCB in response to a request from a CPC when the data element name is not found in any entry in the SES cache directory.

7. A method of controlling data coherence for a computer multi-system complex as defined in claim 5, further comprising the steps of issuing by a CPC to SES a command providing a name of a data to request invalidation of the content of all LCB(s) in the CPCs in the sysplex currently having a copy of the data element and SES responding to the CPC issuing the command with a completion signal when all invalidation signalling by SES to the CPCs is completed for the command.

8. A method of controlling data coherence for a computer multi-system complex as defined in claim 7, further comprising the steps of issuing by a command issuer in a CPC to SES a command providing a name of a data element to request invalidation of the content of all LCB(s) in the sysplex currently having the name in a SES cache directory entry found to be associated with the name except not requesting invalidation of the copy of the data element in the LCB associated with the command issuer.

9. A method of controlling data coherence for a computer multi-system complex as defined in claim 1, further comprising the steps of designating for each local cache (LC) in each CPC a set of invalidation request bits, each LC containing one or more LCBs, each invalidation request bit being associated with a respective LCB, locatinq the LCR associated with the SES cache directory entry containing the data element name readinq the associated CPC location information in the LCR for determining the locations of all invalidation request bits for all conflicting copies of the data element in all LCBs in all CPCs in the sysplex in response to a command issuer sending to SES a command that requires a determination of conflicting copies of the data element, determining each CPC indicated by the associated CPC location information read from the LCR to locate an invalidation request bit for each conflicting copy of the data element, signalling by the SES the associated CPC location information Of the LCR to each CPC determined by the determining step to locate each invalidation request bit for each conflicting copy of the data element in any LCB in any CPC in the sysplex, and requesting by the signalling step each determined CPC to set to an invalidation state each invalidation request bit located by the signalled CPC location information received by the CPC.

10. A method of controlling data coherence for a computer multi-system complex as defined in claim 9, further comprising the steps of controlling by a program in a CPC the setting and testing of states of the invalidation request bits associated with LCBs of that CPC, and invalidating by the program of a copy of a data element in an LCB for which the program tests an invalidation state for an associated invalidation request bit.

11. A method of controlling data coherence for a computer multi-system complex as defined in claim 10, further comprising the steps of executing in a CPC an instruction to determine a current state for an invalidation request bit assigned to a specified LCB.

12. A method of controlling data coherence for a computer multi-system complex as defined in claim 10, further comprising the steps of executing an instruction by CPC operating software to set to a valid state an invalidation request bit assigned to a specified LCB value for a specified LC, transmitting by the CPC to SES a registration command, and setting in the CPC the invalidation request bit to an invalid state if the registration command does not perform a registration in SES.

13. A method of controlling data coherence for a computer multi-system complex as defined in claim 1, further comprising the steps of issuing by a CPC to SES a write command for requesting registration of a copy of a data element in the SES cache, and requesting writing of the copy of the data element sent from the CPC to SES with a data element name.

14. A method of controlling data coherence for a computer multi-system complex as defined in claim 13, further comprising the steps of issuing by a CPC to SES a write command which sends a data element to SES with a data element name, and performing a write operation by writing the data element in a SES cache data area only if the data element name is found in a directory entry in the SES cache, and CPC location information for the copy in the CPC is found in the LCR associated with the directory entry.

15. A method of controlling data coherence for a computer multi-system complex as defined in claim 13, further comprising the steps of sending with the write command a change indication to be stored in the directory entry, where a first value for the change indication indicates the sent copy of the data element is not changed from a version of the same data element stored in a sysplex DASD or SES, and where a second value for the change indication indicates the sent copy of the data element is changed from a version of the same data element stored in a sysplex DASD or SES.

16. A method of controlling data coherence for a computer multi-system complex as defined in claim 15, further comprising the steps of responding by SES to the CPC issuing the command with SES refusing to write the data element in an unchanged state when the SES directory entry indicates a changed state for a SES-stored data element.

17. A method of controlling data coherence for a computer multi-system complex as defined in claim 15, further comprising the steps of writing the data element in a SES data area associated with the SES cache entry containing the data element name, and p1 signalling an invalidation request by SES to each CPC having an LCB(s) with a complement copy of the data element as identified by CPC location information associated with the SES cache directory entry which indicates a changed data element is stored in SES.

* * * * *